(12) United States Patent
Komatsu et al.

(10) Patent No.: US 10,793,219 B2
(45) Date of Patent: Oct. 6, 2020

(54) BICYCLE ELECTRIC TELESCOPIC APPARATUS, BICYCLE POWER SUPPLY SYSTEM, AND BICYCLE ELECTRIC COMPONENT SYSTEM

(71) Applicant: SHIMANO INC., Sakai (JP)

(72) Inventors: Atsushi Komatsu, Sakai (JP); Takafumi Nishino, Sakai (JP); Yuta Kurokawa, Sakai (JP)

(73) Assignee: SHIMANO INC., Sakai (JP)

( * ) Notice: Subject to any disclaimer, the term of this patent is extended or adjusted under 35 U.S.C. 154(b) by 376 days.

(21) Appl. No.: 15/453,833

(22) Filed: Mar. 8, 2017

(65) Prior Publication Data

US 2018/0257737 A1 Sep. 13, 2018

(51) Int. Cl.
*B62K 23/02* (2006.01)
*B62M 9/132* (2010.01)
(Continued)

(52) U.S. Cl.
CPC .............. *B62J 43/00* (2020.02); *B62K 23/02* (2013.01); *B62K 25/08* (2013.01); *B62M 9/122* (2013.01);
(Continued)

(58) Field of Classification Search
CPC ............ B62J 2001/085; B62J 2099/004; B62J 43/00; B62K 6/80; B62K 6/90;
(Continued)

(56) References Cited

U.S. PATENT DOCUMENTS 4,227,140 A * 10/1980 Nardella ............... H01M 10/46
320/113
4,248,942 A * 2/1981 Eby ....................... H01M 10/48
429/178

(Continued)

FOREIGN PATENT DOCUMENTS

| DE | 10 2010 035 674 | 3/2011 |
| DE | 10 2016 002 298 | 9/2016 |
| EP | 3345817 | 7/2018 |

OTHER PUBLICATIONS

Office Action issued by the U.S. Patent and Trademark Office for the U.S. Appl. No. 16/741,758, dated Mar. 20, 2020.

(Continued)

*Primary Examiner* — Kevin Hurley
*Assistant Examiner* — Maurice L Williams
(74) *Attorney, Agent, or Firm* — Mori & Ward, LLP

(57) ABSTRACT

A bicycle electric telescopic apparatus comprises a first tube, a second tube, a positioning structure, an electric positioning actuator, and a power supply. The first tube has a center axis. The second tube is telescopically received in the first tube. The positioning structure is configured to relatively position the first tube and the second tube in a telescopic direction extending along the center axis of the first tube. The electric positioning actuator is configured to actuate the positioning structure. The power supply is to supply electricity to the electric positioning actuator. The power supply is configured to be detachably connected to an electric bicycle component other than the bicycle electric telescopic apparatus.

28 Claims, 23 Drawing Sheets

(51) Int. Cl.
  *B62K 25/08* (2006.01)
  *B62M 9/122* (2010.01)
  *B62J 43/00* (2020.01)
  *B62K 25/04* (2006.01)
  *B62J 1/08* (2006.01)
  *B62M 25/08* (2006.01)
  *B62K 25/28* (2006.01)
  *B62J 45/00* (2020.01)
  *B62J 45/40* (2020.01)

(52) U.S. Cl.
  CPC ............ *B62M 9/132* (2013.01); *B62M 25/08* (2013.01); *B62J 45/00* (2020.02); *B62J 45/40* (2020.02); *B62J 2001/085* (2013.01); *B62K 25/28* (2013.01); *B62K 2025/045* (2013.01); *B62K 2025/047* (2013.01)

(58) Field of Classification Search
  CPC ........ B62K 23/02; B62K 25/08; B62K 25/10; B62K 2015/45; B62K 2015/47; B62K 2208/00; B62K 2025/045; B62K 2025/047; B62M 9/122; B62M 9/132; B62M 25/08; H01M 2/10; H01M 10/42; H01M 10/54; H01M 2220/20
  USPC ................................................. 429/96–100
  See application file for complete search history.

(56) References Cited

U.S. PATENT DOCUMENTS

| | | | | | |
|---|---|---|---|---|---|
| 4,527,110 | A | * | 7/1985 | McCarty | H02J 7/0042 320/111 |
| 4,726,661 | A | * | 2/1988 | Parker | G01D 7/005 349/199 |
| 5,188,231 | A | * | 2/1993 | Kivell | B65D 75/54 206/459.1 |
| 5,418,085 | A | * | 5/1995 | Huhndorff | G01D 7/005 429/91 |
| 5,496,658 | A | * | 3/1996 | Hein | H01M 10/488 429/93 |
| 7,205,746 | B2 | * | 4/2007 | Batson | H02J 7/0047 320/107 |
| 8,091,910 | B2 | * | 1/2012 | Hara | B62J 99/00 280/283 |
| 8,458,080 | B2 | * | 6/2013 | Shirai | B62K 25/04 280/283 |
| 2004/0115962 | A1 | * | 6/2004 | Kitamura | B62J 6/18 439/34 |
| 2005/0280244 | A1 | * | 12/2005 | Watarai | B62J 11/00 280/288.4 |
| 2011/0049945 | A1 | * | 3/2011 | Mouri | B62J 1/08 297/195.1 |
| 2011/0163712 | A1 | * | 7/2011 | Chen | H02J 7/0011 320/107 |
| 2012/0221205 | A1 | * | 8/2012 | Ichida | B62J 99/00 701/37 |
| 2012/0253601 | A1 | * | 10/2012 | Ichida | B60G 17/018 701/37 |
| 2013/0090195 | A1 | * | 4/2013 | Yamaguchi | B60T 7/102 474/80 |
| 2013/0090196 | A1 | * | 4/2013 | Yamaguchi | B62M 9/122 474/80 |
| 2013/0138302 | A1 | * | 5/2013 | Hara | B62J 1/08 701/49 |
| 2013/0145885 | A1 | * | 6/2013 | Kitamura | B62M 25/08 74/473.12 |
| 2013/0151073 | A1 | * | 6/2013 | Tetsuka | B62M 25/04 701/37 |
| 2013/0270022 | A1 | * | 10/2013 | Matsuda | B62K 11/04 180/220 |
| 2013/0334874 | A1 | * | 12/2013 | Shirai | B62M 25/08 307/9.1 |
| 2014/0087901 | A1 | * | 3/2014 | Shipman | B62M 9/132 474/82 |
| 2014/0088828 | A1 | * | 3/2014 | Wesling | B60G 17/019 701/37 |
| 2014/0102237 | A1 | * | 4/2014 | Jordan | B62K 23/02 74/473.12 |
| 2014/0318306 | A1 | * | 10/2014 | Tetsuka | B62M 25/08 74/502.2 |
| 2014/0345411 | A1 | * | 11/2014 | Miki | F16H 59/044 74/473.12 |
| 2015/0009019 | A1 | * | 1/2015 | Watarai | B62J 1/08 340/12.5 |
| 2015/0073656 | A1 | * | 3/2015 | Takamoto | B62J 1/06 701/37 |
| 2015/0111675 | A1 | * | 4/2015 | Shipman | B62M 9/122 474/82 |
| 2015/0197308 | A1 | * | 7/2015 | Butora | B62K 25/10 280/283 |
| 2015/0203169 | A1 | * | 7/2015 | Nishino | B62K 23/06 74/491 |
| 2017/0096185 | A1 | * | 4/2017 | Hara | B62J 1/08 |
| 2017/0101162 | A1 | * | 4/2017 | Tachibana | B62M 25/08 |
| 2017/0158281 | A1 | * | 6/2017 | Hara | B62J 1/08 |
| 2017/0203814 | A1 | * | 7/2017 | Kurokawa | B62K 23/00 |
| 2017/0282986 | A1 | * | 10/2017 | Jhou | B62J 1/08 |
| 2017/0297647 | A1 | * | 10/2017 | Hu | B62K 19/30 |
| 2017/0349238 | A1 | * | 12/2017 | Miyazaki | B62K 23/06 |
| 2018/0043968 | A1 | * | 2/2018 | Sala | B62K 23/06 |
| 2018/0057107 | A1 | * | 3/2018 | Yamamoto | B62M 11/16 |
| 2018/0079462 | A1 | * | 3/2018 | Shirai | B62K 25/08 |
| 2018/0186419 | A1 | | 7/2018 | Shipman et al. | |
| 2018/0237099 | A1 | * | 8/2018 | Liu | B62J 1/06 |
| 2018/0257736 | A1 | * | 9/2018 | Komatsu | B62K 23/02 |
| 2019/0092421 | A1 | | 3/2019 | Nichols | |

OTHER PUBLICATIONS

Office Action issued by the U.S. Patent and Trademark Office for the U.S. Appl. No. 16/739,113, dated Mar. 26, 2020.

* cited by examiner

BICYCLE ELECTRIC TELESCOPIC APPARATUS, BICYCLE POWER SUPPLY SYSTEM, AND BICYCLE ELECTRIC COMPONENT SYSTEM

BACKGROUND OF THE INVENTION

Field of the Invention

The present invention relates to a bicycle electric telescopic apparatus, a bicycle power supply system, and a bicycle electric component system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electric device.

SUMMARY OF THE INVENTION

In accordance with a first aspect of the present invention, a bicycle electric telescopic apparatus comprises a first tube, a second tube, a positioning structure, an electric positioning actuator, and a power supply. The first tube has a center axis. The second tube is telescopically received in the first tube. The positioning structure is configured to relatively position the first tube and the second tube in a telescopic direction extending along the center axis of the first tube. The electric positioning actuator is configured to actuate the positioning structure. The power supply is to supply electricity to the electric positioning actuator. The power supply is configured to be detachably connected to an electric bicycle component other than the bicycle electric telescopic apparatus.

With the bicycle electric telescopic apparatus according to the first aspect, it is possible to utilize the power supply for the electric bicycle component when another power supply of the electric bicycle component runs out.

In accordance with a second aspect of the present invention, a bicycle electric telescopic apparatus comprises a first tube, a second tube, a positioning structure, an electric positioning actuator, a power supply, and a connecting structure. The first tube has a center axis. The second tube is telescopically received in the first tube. The positioning structure is configured to relatively position the first tube and the second tube in a telescopic direction extending along the center axis of the first tube. The electric positioning actuator is configured to actuate the positioning structure. The power supply is to supply electricity to the electric positioning actuator. The connecting structure is configured to be detachably connected to the power supply to electrically connect the power supply to the electric positioning actuator. The connecting structure is configured to be detachably connected to an alternative power supply that is configured to be detachably connected to an electric bicycle component other than the bicycle electric telescopic apparatus.

With the bicycle electric telescopic apparatus according to the second aspect, it is possible to utilize the alternative power supply of the electric bicycle component for the bicycle electric telescopic apparatus.

In accordance with a third aspect of the present invention, the bicycle electric telescopic apparatus according to the first or second aspect further comprises a connecting structure configured to be detachably connected to the power supply to electrically connect the power supply to the electric positioning actuator.

With the bicycle electric telescopic apparatus according to the third aspect, the connecting structure allows the user to easily detach or attach the power supply from and to the bicycle electric telescopic apparatus.

In accordance with a fourth aspect of the present invention, the bicycle electric telescopic apparatus according to the second or third aspect is configured so that the connecting structure is provided at one of the first tube and the second tube.

With the bicycle electric telescopic apparatus according to the fourth aspect, it is possible to detachably attach the power supply to a movable part or a stationary part of the bicycle telescopic apparatus.

In accordance with a fifth aspect of the present invention, the bicycle electric telescopic apparatus according to any one of the second to fourth aspects is configured so that the bicycle electric telescopic apparatus includes an electric seatpost assembly.

With the bicycle electric telescopic apparatus according to the fifth aspect, it is possible to provide the electric seatpost apparatus configured to share the power supply with the electric bicycle component other than the electric seatpost apparatus.

In accordance with a sixth aspect of the present invention, the bicycle electric telescopic apparatus according to the fifth aspect is configured so that the connecting structure is provided on a front side of the one of the first tube and the second tube in a mounting state where the electric seatpost assembly is mounted to a bicycle frame.

With the bicycle electric telescopic apparatus according to the sixth aspect, it is possible to utilize an area disposed on the front side of the one of the first tube and the second tube. Thus, the power supply is less likely to interfere with other items.

In accordance with a seventh aspect of the present invention, the bicycle electric telescopic apparatus according to the fifth or sixth aspect is configured so that the connecting structure is provided at an upper end of the second tube in a mounting state where the electric seatpost assembly is mounted to a bicycle frame.

With the bicycle electric telescopic apparatus according to the seventh aspect, it is possible to reduce interference between the power supply and a body of a rider since the power supply can be disposed under a saddle.

In accordance with an eighth aspect of the present invention, the bicycle electric telescopic apparatus according to any one of the second to seventh aspects is configured so that the connecting structure includes a lock structure. The lock structure has a lock state where the power supply is secured to the connecting structure with the lock structure, and a release state where the power supply is detachable from the connecting structure.

With the bicycle electric telescopic apparatus according to the eighth aspect, the lock structure allows the user to easily detach or attach the power supply from and to the bicycle electric telescopic apparatus.

In accordance with a ninth aspect of the present invention, the bicycle electric telescopic apparatus according to the eighth aspect is configured so that the lock structure includes a latch structure.

With the bicycle electric telescopic apparatus according to the ninth aspect, the latch structure allows the user to more easily detach or attach the power supply from and to the bicycle electric telescopic apparatus.

In accordance with a tenth aspect of the present invention, the bicycle electric telescopic apparatus according to the eighth or ninth aspect is configured so that the connecting structure electrically connects the power supply to the electric positioning actuator in the lock state.

With the bicycle electric telescopic apparatus according to the tenth aspect, the connecting structure allows the user to easily connect the power supply to the electric positioning actuator simultaneously with the attachment of the power supply to the connecting structure.

In accordance with an eleventh aspect of the present invention, the bicycle electric telescopic apparatus according to the tenth aspect is configured so that the connecting structure includes a first electric contact. The power supply includes a second electric contact contactable with the first electric contact in the lock state.

With the bicycle electric telescopic apparatus according to the eleventh aspect, the connecting structure allows the user to more easily connect the power supply to the electric positioning actuator simultaneously with the attachment of the power supply to the connecting structure.

In accordance with a twelfth aspect of the present invention, the bicycle electric telescopic apparatus according to any one of the eighth to eleventh aspects further comprises a protecting cover detachably attached to the connecting structure to protect the power supply in the lock state.

With the bicycle electric telescopic apparatus according to the twelfth aspect, it is possible to improve interconnecting strength between the power supply and the connecting structure even in a case where the bicycle electric telescopic apparatus is mounted on a mountain bike which runs on a rough terrain.

In accordance with a thirteenth aspect of the present invention, the bicycle electric telescopic apparatus according to any one of the second to eleventh aspects further comprises an additional cover attachable to the connecting structure to cover the connecting structure in a state where the power supply is detached from the connecting structure.

With the bicycle electric telescopic apparatus according to the thirteenth aspect, it is possible to protect a contact of the power supply in the state where the power supply is detached from the connecting structure.

In accordance with a fourteenth aspect of the present invention, the bicycle electric telescopic apparatus according to any one of the first to thirteenth aspects further comprises a wake-up sensor and a controller. The controller has a control mode in which the controller controls the electric positioning actuator to actuate the positioning structure, and a sleep mode in which a power consumption of the controller is lower than a power consumption of the controller in the control mode. The controller is configured to change a mode of the controller between the control mode and the sleep mode based on a detection result of the wake-up sensor.

With the bicycle electric telescopic apparatus according to the fourteenth aspect, it is possible to reduce a total power consumption of the bicycle electric telescopic apparatus.

In accordance with a fifteenth aspect of the present invention, the bicycle electric telescopic apparatus according to any one of the first to fourteenth aspects further comprises a controller configured to control the electric positioning actuator based on a wireless signal.

With the bicycle electric telescopic apparatus according to the fifteenth aspect, it is possible to control the electric positioning actuator based on a program of the controller.

In accordance with a sixteenth aspect of the present invention, the bicycle electric telescopic apparatus according to the fifteenth aspect is configured so that the controller includes a wireless receiver configured to wirelessly receive the wireless signal.

With the bicycle electric telescopic apparatus according to the sixteenth aspect, it is possible to control the electric positioning actuator based on the wireless signal.

In accordance with a seventeenth aspect of the present invention, the bicycle electric telescopic apparatus according to the sixteenth aspect is configured so that the wireless receiver is provided on a rear side of one of the first tube and the second tube.

With the bicycle electric telescopic apparatus according to the seventeenth aspect, the bicycle electric telescopic apparatus can receives the wireless signal from an electric rear component.

In accordance with an eighteenth aspect of the present invention, the bicycle electric telescopic apparatus according to any one of the first to seventeenth aspects further comprises a manual operating member coupled to the positioning structure to manually actuate the positioning structure without electricity of the power supply.

With the bicycle electric telescopic apparatus according to the eighteenth aspect, it is possible to manually actuate the positioning structure using the manual operating member even when the power supply runs out.

In accordance with a nineteenth aspect of the present invention, the bicycle electric telescopic apparatus according to any one of the second to eighteenth aspects is configured so that the connecting structure is configured to be detachably connected to the alternative power supply configured to supply electricity to a bicycle electric rear derailleur provided as the electric bicycle component.

With the bicycle electric telescopic apparatus according to the nineteenth aspect, it is possible to share the power supply between the bicycle electric telescopic apparatus and the bicycle electric rear derailleur.

In accordance with a twentieth aspect of the present invention, the bicycle electric telescopic apparatus according to any one of the second to nineteenth aspects is configured so that the connecting structure is configured to be detachably connected to the alternative power supply configured to supply electricity to one of a bicycle electric suspension and an electric seatpost assembly provided as the electric bicycle component.

With the bicycle electric telescopic apparatus according to the twentieth aspect, it is possible to utilize the alternative power supply of the one of the bicycle electric suspension and the electric seatpost assembly for the bicycle electric telescopic apparatus.

In accordance with a twenty-first aspect of the present invention, a bicycle power supply system comprises a power supply configured to supply electricity to a bicycle electric actuator of an electric component. The electric component includes a bicycle electric telescopic apparatus and a bicycle electric transmission. The power supply is configured to be detachably and alternatively connected to one of a bicycle electric telescopic apparatus and a bicycle electric transmission.

With the bicycle power supply system according to the twenty-first aspect, it is possible to utilize the power supply for the electric bicycle component when another power supply of the electric bicycle component runs out.

In accordance with a twenty-second aspect of the present invention, the bicycle electric telescopic apparatus according to the twenty-first aspect further comprises a power supply cover configured to be detachably attached to the power supply in a state where the power supply is detached from the electric component.

With the bicycle power supply system according to the twenty-second aspect, it is possible to protect a contact of the power supply in the state where the power supply is detached from the electric component.

In accordance with a twenty-third aspect of the present invention, the bicycle electric telescopic apparatus according to the twenty-second aspect is configured so that the power supply includes an electric contact. The power supply cover is configured to cover the electric contact in an attachment state where the power supply cover is attached to the power supply.

With the bicycle power supply system according to the twenty-third aspect, it is possible to effectively protect the electric contact of the power supply in the state where the power supply is detached from the electric component.

In accordance with a twenty-fourth aspect of the present invention, the bicycle electric telescopic apparatus according to the twenty-second or twenty-third aspect is configured so that the power supply cover includes a charged state indicator configured to selectively indicate one of a charged state and a non-charged state of the power supply.

With the b bicycle power supply system according to the twenty-fourth aspect, the user can easily recognize a state of the power supply through the charged state indicator.

In accordance with a twenty-fifth aspect of the present invention, a bicycle electric component system comprises a bicycle electric transmission and a bicycle electric telescopic apparatus. The bicycle electric transmission comprises a base member, a movable member movable with respect to the base member to change a gear stage, a first electric actuator configured to move the movable member with respect to the base member, a first power supply to supply electricity to the first electric actuator, and a first connecting structure configured to be detachably connected to the first power supply to electrically connect the first power supply to the first electric actuator. The bicycle electric telescopic apparatus comprises a first tube, a second tube, a positioning structure, a second electric actuator, a second power supply, and a second connecting structure. The first tube has a center axis. The second tube is telescopically received in the first tube. The positioning structure is configured to relatively position the first tube and the second tube in a telescopic direction extending along the center axis of the first tube. The second electric actuator is configured to actuate the positioning structure. The second power supply is to supply electricity to the second electric actuator. The second connecting structure is configured to be detachably connected to the second power supply to electrically connect the second power supply to the second electric actuator. At least one of the first power supply and the second power supply is configured to be detachably and alternatively connected to a first connecting structure and a second connecting structure.

With the bicycle electric component system according to the twenty-fifth aspect, it is possible to utilize the first power supply of the bicycle electric transmission for the bicycle electric telescopic apparatus when the second power supply of the bicycle electric telescopic apparatus runs out. It is possible to utilize the second power supply of the bicycle electric telescopic apparatus for the bicycle electric transmission when the first power supply of the bicycle electric transmission runs out. This improves user-friendliness of the bicycle electric component system.

In accordance with a twenty-sixth aspect of the present invention, the bicycle electric telescopic apparatus according to the twenty-fifth aspect is configured so that the first power supply is configured to be detachably connected to the second connecting structure. The second power supply is configured to be detachably connected to the first connecting structure.

With the bicycle electric component system according to the twenty-sixth aspect, it is possible to effectively improve user-friendliness of the bicycle electric component system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
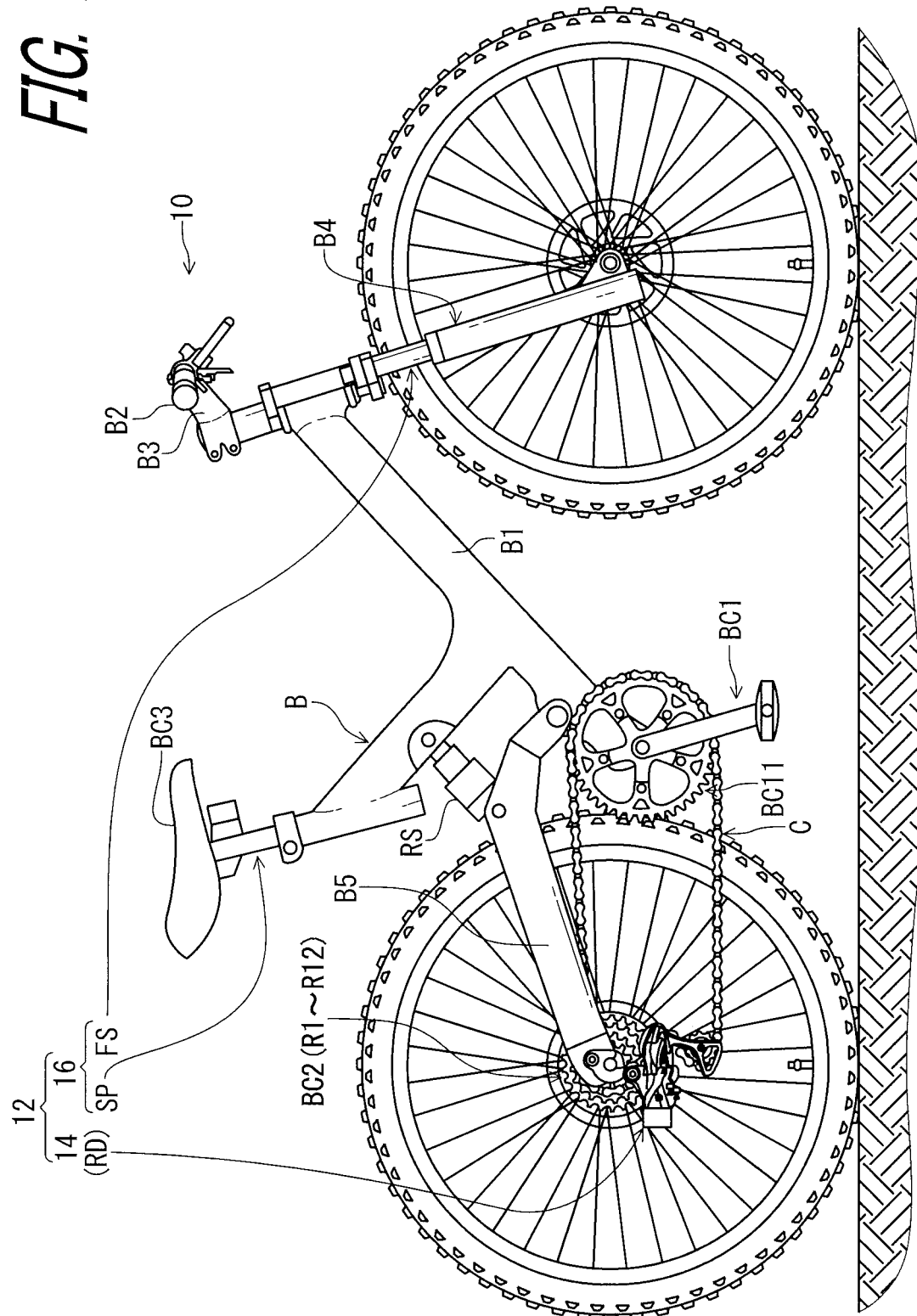
FIG. 1 is a side elevational view of a bicycle provided with a bicycle wireless control system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 includes a bicycle wireless control system or a bicycle electric component system 12 in accordance with a first embodiment. While the bicycle 10 is illustrated as a mountain bike, the bicycle wireless control system 12 can be applied to a road bike or any type of bicycle.

The bicycle wireless control system 12 comprises a bicycle electric device 14 and at least one electric telescopic apparatus 16. In this embodiment, the bicycle electric device 14 includes an electric rear derailleur (a bicycle electric transmission) RD. However, the bicycle electric device 14 can include another electric device such as an electric internal hub transmission, an electric continuously variable transmission, an electric gearbox, and an electric assist device.

The at least one electric telescopic apparatus (bicycle electric telescopic apparatus) 16 includes a bicycle electric seatpost assembly (a first electric telescopic apparatus) SP and a bicycle electric suspension (a second electric telescopic apparatus) FS. However, one of the bicycle electric seatpost assembly SP and the bicycle electric suspension FS can be omitted from the at least one electric telescopic apparatus 16. Furthermore, the at least one electric telescopic apparatus 16 can include another electric telescopic device such as a bicycle electric suspension RS instead of or in addition to at least one of the bicycle electric seatpost assembly SP and the bicycle electric suspension FS.

The bicycle electric seatpost apparatus SP can also be referred to as the bicycle electric telescopic apparatus SP. The bicycle electric suspension FS can also be referred to as the bicycle electric telescopic apparatus FS. The electric rear derailleur RD can also be referred to as the bicycle electric transmission RD. Namely, the bicycle electric component system 12 comprises the bicycle electric telescopic apparatus SP or FS and the bicycle electric transmission RD.

As seen in FIG. 1, the bicycle 10 includes a bicycle body B, a crank assembly BC1, a rear sprocket assembly BC2, a saddle BC3, and a bicycle chain C. The bicycle body B includes a bicycle frame B1, a handlebar B2, a stem B3, a front fork B4, and a rear swing arm B5. The handlebar B2 is coupled to the front fork B4 with the stem B3. The front fork B4 includes the electric front suspension FS. The rear swing arm B5 is pivotally coupled to the bicycle frame B1. The bicycle electric suspension RS is provided between the bicycle frame B1 and the rear swing arm B5.

The bicycle chain C engages with a front sprocket BC11 of the crank assembly BC1 and the rear sprocket assembly BC2. In the illustrated embodiment, the front sprocket BC11 is a single (solitary) sprocket in the crank assembly BC1 while the rear sprocket assembly BC2 has twelve speed stages. However, the crank assembly BC1 can include a plurality of front sprockets. In such an embodiment, the bicycle 10 includes a front derailleur configured to shift the bicycle chain C relative to the plurality of front sprockets. The saddle BC3 is attached to the bicycle electric seatpost assembly SP. The bicycle electric seatpost assembly SP is mounted to the bicycle body B to change a position of the saddle BC3 relative to the bicycle body B.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 with facing the handlebar B2. Accordingly, these terms, as utilized to describe the bicycle wireless control system 12, should be interpreted relative to the bicycle equipped with the bicycle wireless control system 12 as used in an upright riding position on a horizontal surface.

As seen in FIG. 1, the rear sprocket assembly BC2 includes first to twelfth rear sprockets R1 to R12. Each of the first to twelfth rear sprockets R1 to R12 has a different total number of teeth. A total number of the rear sprockets R1 to R12 are not limited to this embodiment. A total number of teeth of the first rear sprocket R1 is the largest in the rear sprocket assembly BC2. A total number of teeth of the twelfth rear sprocket R12 is the smallest in the rear sprocket assembly BC2. The first rear sprocket R1 corresponds to low gear. The twelfth rear sprocket R12 corresponds to top gear. The bicycle electric device 14 is configured to shift the bicycle chain C relative to the first to twelfth rear sprockets R1 to R12 to change a gear stage of the bicycle 10.

Figure 2:
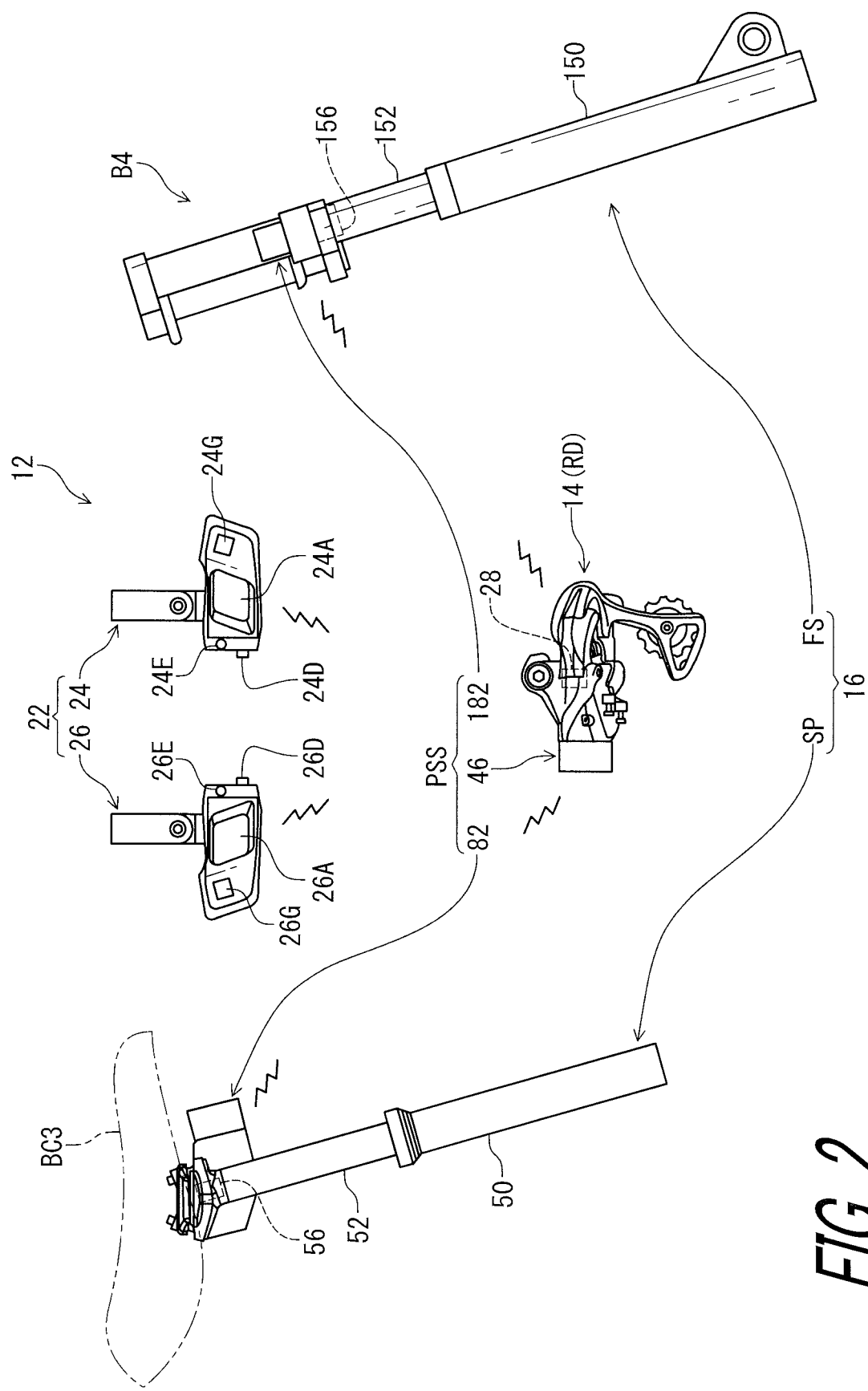
FIG. 2 is a diagrammatic view of the bicycle wireless control system illustrated in FIG. 1.

As seen in FIG. 2, the bicycle wireless control system 12 further comprises a bicycle electric operating device 22. The bicycle electric operating device 22 is mounted to the handlebar B2 (FIG. 2). The bicycle electric operating device 22 include a first operating device 24 and a second operating device 26. The first operating device 24 and the second operating device 26 are mounted to the handlebar B2 (FIG. 1). The first operating device 24 is a right-hand control device. The second operating device 26 is a left-hand control device. However, the bicycle electric operating device 22 can include another operating device instead of or in addition to the first operating device 24 and the second operating device 26. One of the first operating device 24 and the second operating device 26 can be omitted from the bicycle electric operating device 22.

In this embodiment, the bicycle electric operating device 22 is configured to operate the bicycle electric device 14 and the bicycle electric seatpost assembly SP. Thus, the bicycle electric operating device 22 can include at least one of an electric shifter and a telescopic operating device. The telescopic operating device can include a seatpost operating device, a front suspension operating device, and a rear suspension operating device. Accordingly, the bicycle electric operating device 22 can also be referred to as the electric shifter 22 and/or the telescopic operating device (the seatpost operating device, the front suspension operating device, the rear suspension operating device) 22 in accordance with a function of the bicycle electric operating device 22. Furthermore, the electric shifter, the seatpost operating device, the front suspension operating device, and the rear suspension operating device can at least partly be integrally provided as a single unit or a separate device from each other. In a case where operating devices are integrally provided with each other as a single unit, a user operation can be distinguished based on a manipulation method (long press of a switch, simultaneous press of switches).

Figure 3:
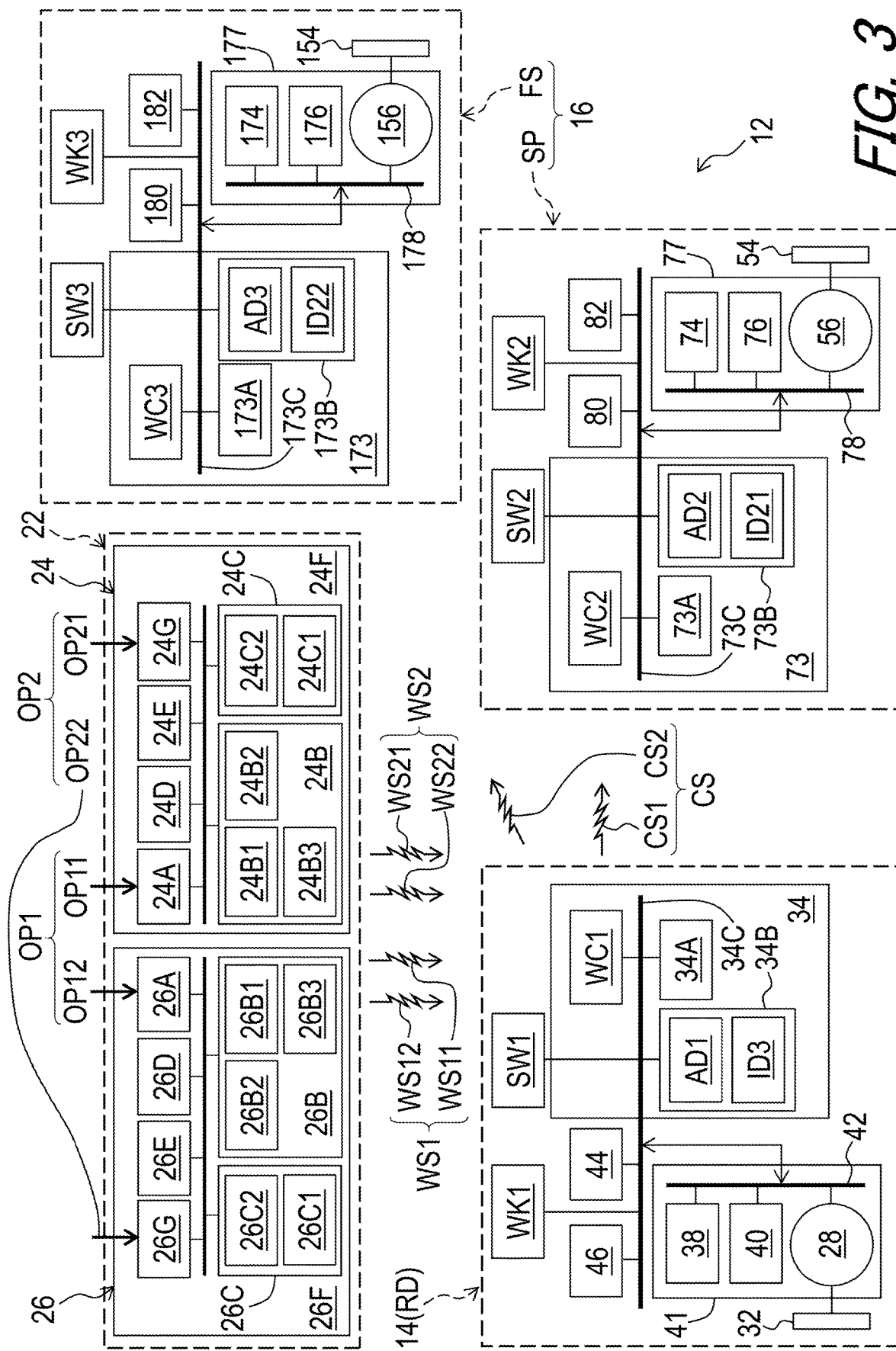
FIG. 3 is a schematic block diagram of the bicycle wireless control system illustrated in FIG. 1 (control mode).

As seen in FIG. 3, the bicycle electric operating device 22 is configured to receive a user operation OP1 from the user. In this embodiment, the user operation OP1 includes a first user operation OP11 and a second user operation OP12. The first operating device 24 is configured to receive the first user operation OP11 from the user. The second operating device 26 is configured to receive the second user operation OP12 from the user. The bicycle electric operating device 22 is configured to wirelessly transmit an operation signal WS1 to the bicycle electric device 14 in response to the user operation OP1. The operation signal WS1 includes a first wireless signal WS11 and a second wireless signal WS12. The first operating device 24 is configured to wirelessly transmit the first wireless signal WS11 to the bicycle electric device 14 in response to the first user operation OP11. The second operating device 26 is configured to wirelessly transmit the second wireless signal WS12 to the bicycle electric device 14 in response to the second user operation OP12.

In this embodiment, the operation signal WS1 is a shift operation signal to operate a shifting device such as the electric rear derailleur RD. The first wireless signal WS11 is an upshift operation signal for upshifting of the electric rear derailleur RD. The second wireless signal WS12 is a downshift operation signal for downshifting of the electric rear derailleur RD. The first wireless signal WS11 and the second wireless signal WS12 are distinguishable from each other.

The bicycle electric operating device 22 is configured to wirelessly transmit a telescopic operation signal WS2 to the bicycle electric device 14 in response to the user telescopic operation OP2. In this embodiment, the user telescopic operation OP2 includes a first user telescopic operation OP21 and a second user telescopic operation OP22. The first operating device 24 is configured to receive the first user telescopic operation OP21 from the user. The second operating device 26 is configured to receive the second user telescopic operation OP22 from the user. The bicycle electric operating device 22 is configured to wirelessly transmit a telescopic operation signal WS2 to the bicycle electric device 14 in response to the user telescopic operation OP2. The telescopic operation signal WS2 includes a first telescopic operation signal WS21 and a second telescopic operation signal WS22. The first operating device 24 is configured to wirelessly transmit the first telescopic operation signal WS21 to the bicycle electric device 14 in response to the first user telescopic operation OP21. The second operating device 26 is configured to wirelessly transmit the second telescopic operation signal WS22 to the bicycle electric device 14 in response to the second user telescopic operation OP22.

In this embodiment, the first telescopic operation signal WS21 is a wireless signal to operate the bicycle electric seatpost assembly SP. The second telescopic operation signal WS22 is a wireless signal to operate the bicycle electric suspension FS. The first telescopic operation signal WS21 and the second telescopic operation signal WS22 are distinguishable from each other. The operation signal WS1 and the telescopic operation signal WS2 are distinguishable from each other. Each of the first telescopic operation signal WS21 and the second telescopic operation signal WS22 is distinguishable from each of the first wireless signal WS11 and the second wireless signal WS12.

The bicycle electric operating device 22 is configured to wirelessly transmit identification information ID1 of the bicycle electric operating device 22. In this embodiment, the first operating device 24 is configured to wirelessly transmit identification information ID11 of the first operating device 24 to the bicycle electric device 14. The second operating device 26 is configured to wirelessly transmit identification information ID12 of the second operating device 26 to the bicycle electric device 14.

As seen in FIG. 3, the first operating device 24 includes a first electrical switch 24A, a first operating controller 24B, a first power supply 24C, a first function switch 24D, a first indicator 24E, a first circuit board 24F, and a first additional electrical switch 24G. The first electrical switch 24A, the first operating controller 24B, the first power supply 24C, the first function switch 24D, the first indicator 24E, and the first additional electrical switch 24G are electrically mounted on the first circuit board 24F. The first electrical switch 24A is configured to receive the first user operation OP11 from the user. The first additional electrical switch 24G is configured to receive the first user telescopic operation OP21 from the user. Each of the first electrical switch 24A and the first additional electrical switch 24G includes a push-button switch. The first operating controller 24B is electrically connected to the first electrical switch 24A to wirelessly transmit the first wireless signal WS11 in response to the first user operation OP11 received by the first electrical switch 24A. The first operating controller 24B is electrically connected to the first additional electrical switch 24G to wirelessly transmit the first telescopic operation signal WS21 in response to the first user telescopic operation OP21 received by the first additional electrical switch 24G.

The first power supply 24C is electrically connected to the first operating controller 24B and the first indicator 24E to supply electricity to the first operating controller 24B and the first indicator 24E. The first power supply 24C includes a first battery 24C1 and a first battery holder 24C2. The first battery 24C1 is detachably held in the first battery holder 24C2. The first battery holder 24C2 is electrically connected to the first operating controller 24B. Examples of the first battery 24C1 include a primary battery such as a lithium manganese dioxide battery, and a secondary battery such as a lithium-ion secondary battery. In this embodiment, the first battery 24C1 is a primary button battery.

In this embodiment, the first operating controller 24B includes a processor 24B1, a memory 24B2, and a first wireless communicator 24B3. The processor 24B1, the memory 24B2, and the first wireless communicator 24B3 are electrically mounted on the first circuit board 24F.

The processor 24B1 includes a central processing unit (CPU) and a memory controller. The memory 24B2 is electrically connected to the processor 24B1. The memory 24B2 includes a read only memory (ROM) and a random-access memory (RAM). The ROM includes a non-transitory computer-readable storage medium. The RAM includes a transitory computer-readable storage medium. The memory 24B2 includes storage areas each having an address in the ROM and the RAM. The processor 24B1 controls the memory 24B2 to store data in the storage areas of the memory 24B2 and reads data from the storage areas of the memory 24B2. The memory 24B2 (e.g., the ROM) stores a program. The program is read into the processor 24B1, and thereby functions of the first operating controller 24B is performed.

The memory 24B2 stores the identification information ID11 of the first operating device 24. The identification information ID11 of the first operating device 24 includes a unique device identification (ID) (e.g., a value indicative of a shifter) of the first operating device 24. The identification information ID11 of the first operating device 24 further includes a value indicative of a device type such as "right-hand side" or "left-hand side."

The first wireless communicator 24B3 includes a signal transmitting circuit, a signal receiving circuit, and an antenna. Thus, the first wireless communicator 24B3 can also be referred to as a first wireless communication circuit or circuitry 24B3. The first wireless communicator 24B3 is configured to generate the first wireless signal WS11 based on the first user operation OP11 received by the first electrical switch 24A. The first wireless communicator 24B3 is configured to generate the first telescopic operation signal WS21 based on the first user telescopic operation OP21 received by the first additional electrical switch 24G. The first wireless communicator 24B3 is configured to superimpose digital signals on carrier wave using a predetermined wireless communication protocol to generate the first wireless signal WS11 or the first telescopic operation signal WS21.

Figure 4:
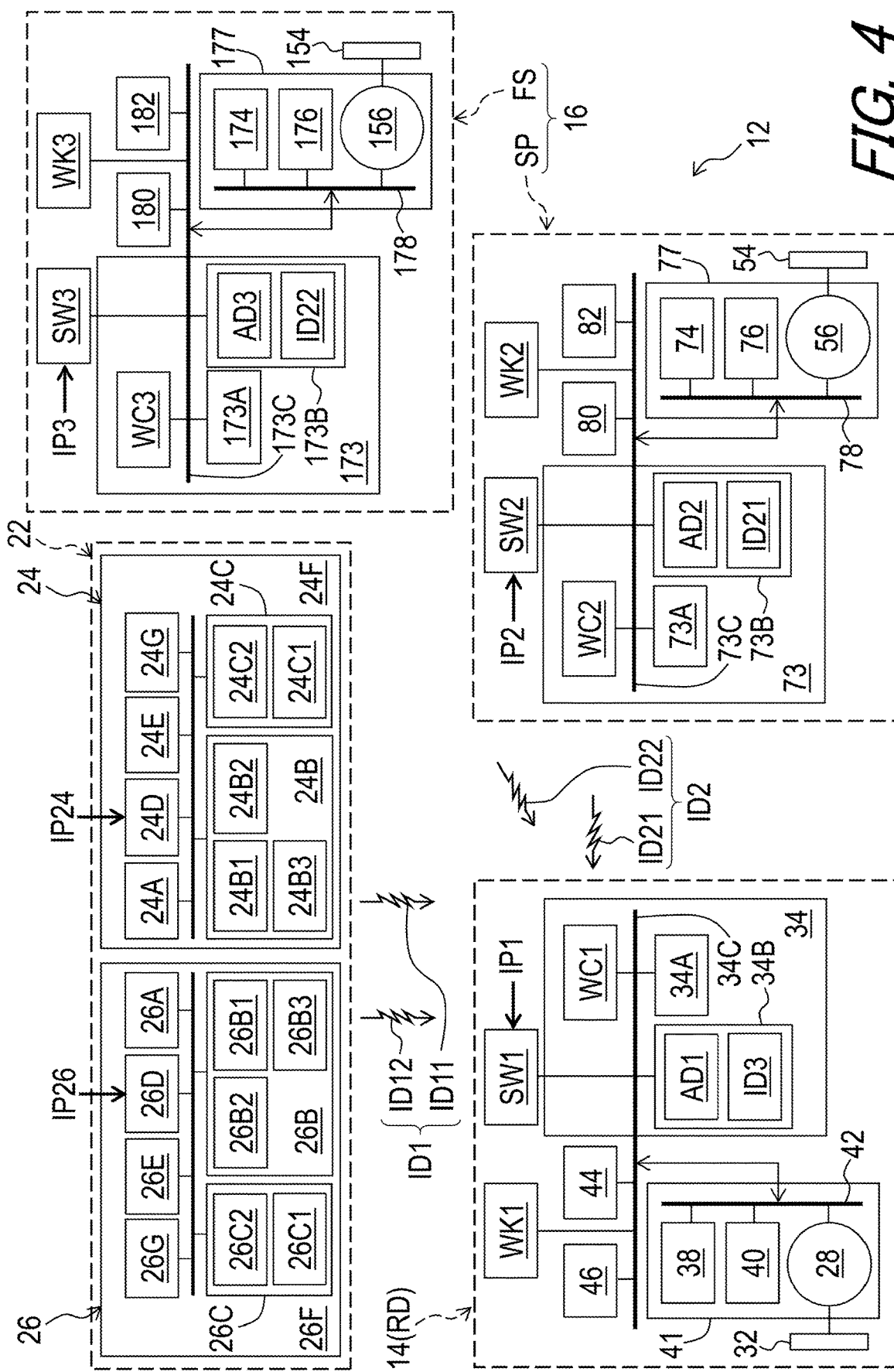
FIG. 4 is a schematic block diagram of the bicycle wireless control system illustrated in FIG. 1 (pairing mode).

As seen in FIG. 4, the first function switch 24D is configured to receive a user input IP24 from the user. The first function switch 24D is electrically connected to the first operating controller 24B to set the first operating controller 24B to a pairing signal transmission mode in which the first operating controller 24B wirelessly transmits a paring signal including the identification information ID11 of the first operating device 24 in response to the user input IP24. The first wireless communicator 24B3 is configured to wirelessly transmit the first wireless signal WS11 including the identification information ID11 and a shift command (e.g., upshift).

Further, the first wireless communicator 24B3 is configured to receive a wireless signal from other bicycle components such as the bicycle electric device 14. In this embodiment, the first wireless communicator 24B3 is configured to receive a pairing completion signal from the bicycle electric device 14. The first wireless communicator 24B3 is configured to decode the wireless signal to recognize information wirelessly transmitted from the bicycle electric device 14. The first wireless communicator 24B3 may decrypt the encrypted wireless signal using the cryptographic key.

In this embodiment, the first wireless communicator 24B3 is provided as a wireless transmitter and a wireless receiver. The first wireless communicator 24B3 is integrally provided as a single module or unit. However, the first wireless communicator 24B3 can be constituted of a wireless transmitter and a wireless receiver which are provided as separate modules or units arranged at different positions from each other. The function of the wireless receiver can be omitted from the first wireless communicator 24B3.

The first indicator 24E is connected to the first operating controller 24B to inform a user of a status of the first operating controller 24B. Examples of the status of the first operating controller 24B include a signal transmission status, a power supply status, and a mode of the first operating controller 24B. The first indicator 24E includes a light emitting element such as a light emitting diode (LED). However, the first indicator 24E can include other elements such as a buzzer instead of or in addition to the light emitting element. The first battery holder 24C2 and the first indicator 24E are electrically mounted on the first circuit board 24F. In this embodiment, the first power supply 24C includes the first battery 24C1. However, the first power supply 24C can include an electricity generation element configured to generate the electricity using pressure and/or vibration caused by an operation of the first electrical switch 24A.

As seen in FIG. 3, the second operating device 26 includes a second electrical switch 26A, a second operating controller 26B, a second power supply 26C, a second function switch 26D, a second indicator 26E, a second circuit board 26F, and a second additional electrical switch 26G. The second electrical switch 26A, the second operating controller 26B, the second power supply 26C, the second function switch 26D, the second indicator 26E, and the second additional electrical switch 26G are electrically mounted on the second circuit board 26F. The second electrical switch 26A is configured to receive the second user operation OP12 from the user. The second additional electrical switch 26G is configured to receive the second user telescopic operation OP22 from the user. Each of the second electrical switch 26A and the second additional electrical switch 26G includes a push-button switch. The second operating controller 26B is electrically connected to the second electrical switch 26A to wirelessly transmit the second wireless signal WS12 in response to the second user operation OP12 received by the second electrical switch 26A. The second operating controller 26B is electrically connected to the second additional electrical switch 26G to wirelessly transmit the second telescopic operation signal WS22 in response to the second user telescopic operation OP22 received by the second additional electrical switch 26G.

The second power supply 26C is electrically connected to the second operating controller 26B and the second indicator 26E to supply electricity to the second operating controller 26B and the second indicator 26E. The second power supply 26C includes a second battery 26C1 and a second battery holder 26C2. The second battery 26C1 is detachably held in the second battery holder 26C2. The second battery holder 26C2 is electrically connected to the second operating controller 26B. Examples of the second battery 26C1 include a primary battery such as a lithium manganese dioxide battery, and a secondary battery such as a lithium-ion secondary battery. In this embodiment, the second battery 26C1 is a primary button battery.

In this embodiment, the second operating controller 26B includes a processor 26B1, a memory 26B2, and a second wireless communicator 26B3. The processor 26B1, the memory 26B2, and the second wireless communicator 26B3 are electrically mounted on the second circuit board 26F.

The processor 26B1 includes a CPU and a memory controller. The memory 26B2 is electrically connected to the processor 26B1. The memory 26B2 includes a ROM and a RAM. The ROM includes a non-transitory computer-readable storage medium. The RAM includes a transitory computer-readable storage medium. The memory 26B2 includes storage areas each having an address in the ROM and the RAM. The processor 26B1 controls the memory 26B2 to store data in the storage areas of the memory 26B2 and reads data from the storage areas of the memory 26B2. The memory 26B2 (e.g., the ROM) stores a program. The program is read into the processor 26B1, and thereby functions of the second operating controller 26B is performed.

The memory 26B2 stores the identification information ID12 of the second operating device 26. The identification information ID12 of the second operating device 26 includes a unique device ID (e.g., a value indicative of a shifter) of the second operating device 26. The identification information ID12 of the second operating device 26 further includes a value indicative of a device type such as "right-hand side" or "left-hand side."

The second wireless communicator 26B3 includes a signal transmitting circuit, a signal receiving circuit, and an antenna. Thus, the second wireless communicator 26B3 can also be referred to as a second wireless communication circuit or circuitry 26B3. The second wireless communicator 26B3 is configured to generate the second wireless signal WS12 based on the second user operation OP12 received by the second electrical switch 26A. The second wireless communicator 26B3 is configured to generate the second telescopic operation signal WS22 based on the user telescopic operation OP3 received by the second additional electrical switch 26G. The second wireless communicator 26B3 is configured to superimpose digital signals on carrier wave using a predetermined wireless communication protocol to generate the second wireless signal WS12 and the second telescopic operation signal WS22.

The second function switch 26D is configured to receive a user input IP26 from the user. The second function switch 26D is electrically connected to the second operating controller 26B to set the second operating controller 26B to a pairing signal transmission mode in which the second operating controller 26B wirelessly transmits a pairing signal including the identification information ID12 of the second operating device 26 in response to the user input IP26. The second wireless communicator 26B3 is configured to wirelessly transmit the second wireless signal WS12 including the identification information ID12 and a shift command (e.g., downshift).

Further, the second wireless communicator 26B3 is configured to receive a wireless signal from other bicycle components such as the bicycle electric device 14. In this embodiment, the second wireless communicator 26B3 is configured to receive a pairing completion signal from the bicycle electric device 14. The second wireless communicator 26B3 is configured to decode the wireless signal to recognize information wirelessly transmitted from the bicycle electric device 14. The second wireless communicator 26B3 may decrypt the encrypted wireless signal using the cryptographic key.

In this embodiment, the second wireless communicator 26B3 is provided as a wireless transmitter and a wireless receiver. The second wireless communicator 26B3 is integrally provided as a single module or unit. However, the second wireless communicator 26B3 can be constituted of a wireless transmitter and a wireless receiver which are provided as separate modules or units arranged at different positions from each other. The function of the wireless receiver can be omitted from the second wireless communicator 26B3.

The second indicator 26E is connected to the second operating controller 26B to inform a user of a status of the second operating controller 26B. Examples of the status of the second operating controller 26B include a signal transmission status, a power supply status, and a mode of the second operating controller 26B. The second indicator 26E includes a light emitting element such as a light emitting diode (LED). However, the second indicator 26E can include other elements such as a buzzer instead of or in addition to the light emitting element. The second battery holder 26C2 and the second indicator 26E are electrically mounted on the second circuit board 26F. In this embodiment, the second power supply 26C includes the second battery 26C1. However, the second power supply 26C can include an electricity generation element configured to generate the electricity using pressure and/or vibration caused by an operation of the second electrical switch 26A.

As seen in FIG. 3, the bicycle electric device 14 comprises an electric actuator (a first electric actuator) 28. The electric actuator (the first electric actuator) 28 is configured to be operated in response to an operation of the bicycle electric operating device 22.

Figure 5:
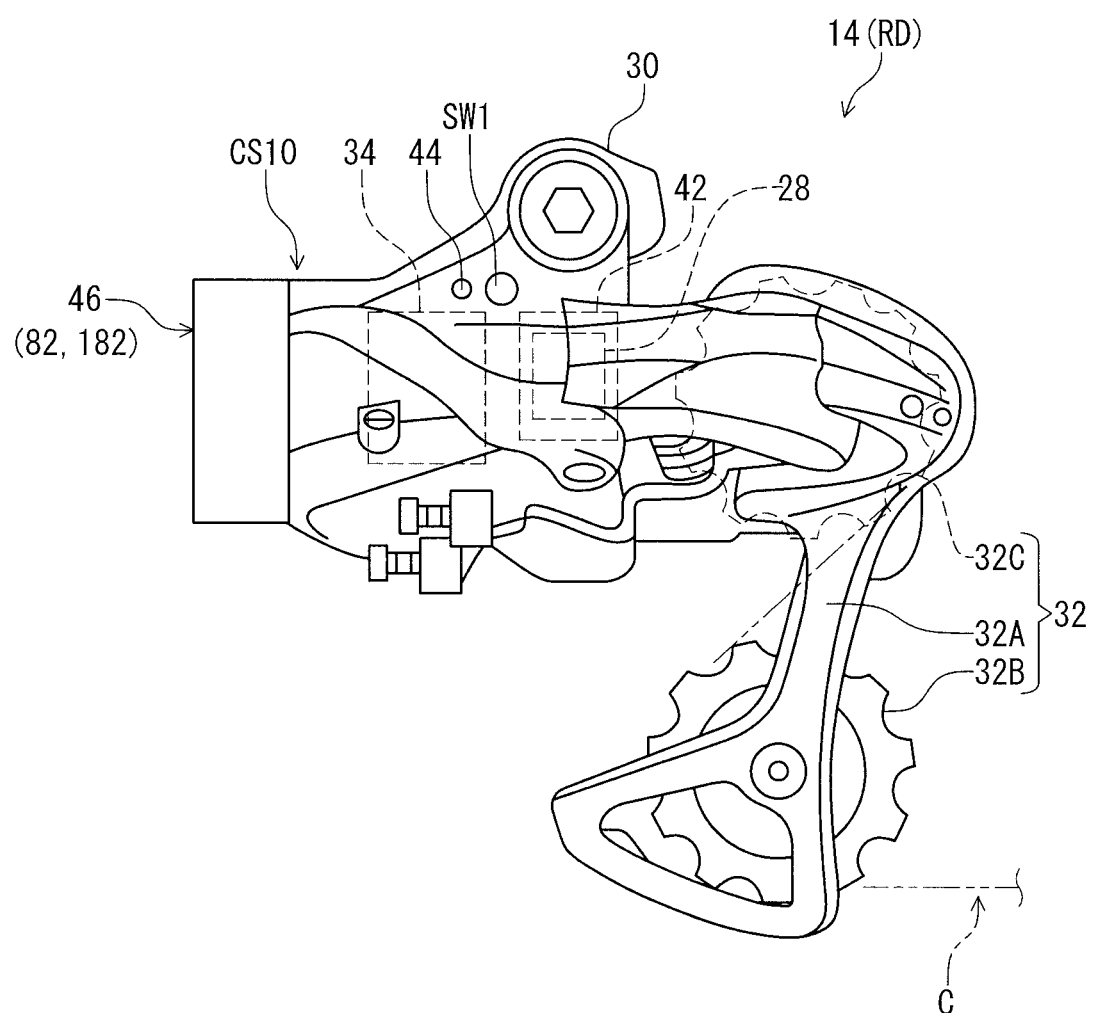
FIG. 5 is a side elevational view of a bicycle electric device of the bicycle wireless control system illustrated in FIG. 1.

As seen in FIG. 5, the bicycle electric device (a bicycle electric transmission) 14 further comprises a base member 30 and a movable member 32. The movable member 32 is movable relative to the base member 30 to change the gear stage. The first electric actuator 28 is configured to move the movable member 32 relative to the base member 30. The base member 30 is configured to be attached to the bicycle body B (FIG. 1). The electric actuator 28 is configured to move the movable member 32 relative to the base member 30 to shift the bicycle chain C relative to the rear sprocket assembly BC2. The electric actuator 28 is provided in the base member 30. However, the electric actuator 28 can be provided at the movable member 32.

In this embodiment, the movable member 32 includes a chain guide 32A, a first pulley 32B, and a second pulley 32C. The chain guide 32A is movably coupled to the base member 30. The first pulley 32B is rotatably coupled to the chain guide 32A. The second pulley 32C is rotatably coupled to the chain guide 32A. The bicycle chain C is engaged with the first pulley 32B and the second pulley 32C.

The electric actuator 28 is operatively coupled to the movable member 32 (the chain guide 32A). In this embodiment, the electric actuator 28 includes a direct-current (DC) motor having a rotational shaft mechanically coupled to the movable member 32. Other examples of the electric actuator 28 include a stepper motor and an alternating-current (AC) motor.

As seen in FIG. 3, one of the bicycle electric device 14 and the at least one electric telescopic apparatus 16 comprises a controller 34 and a switch SW1. The bicycle electric device 14 comprises the controller 34 and the switch SW1. The controller 34 has a control mode in which the controller 34 receives the operation signal WS1 and/or the telescopic operation signal WS2 from the bicycle electric operating device 22. The controller 34 is configured to control the electric actuator 28 in the control mode based on the operation signal WS1 without responding to telescopic operation signal WS2. The controller 34 is configured to control the bicycle electric seatpost assembly SP in the control mode based on the telescopic operation signal WS2 without responding to operation signal WS1.

The controller 34 is configured to control the electric actuator 28 to move the movable member 32 relative to the base member 30 based on the operation signal WS1 wirelessly transmitted from the bicycle electric operating device 22. The controller 34 is configured to control the electric actuator 28 to upshift in response to the first wireless signal WS11. The controller 34 is configured to control the electric actuator 28 to downshift in response to the second wireless signal WS12. The controller 34 is in the control mode when the bicycle electric device 14 is activated in response to supply of electricity.

As seen in FIG. 4, the controller 34 has a pairing mode in which the controller 34 receives identification information of the at least one electric telescopic apparatus 16. The identification information ID2 includes first identification information ID21 of the first electric telescopic apparatus SP and second identification information ID22 of second electric telescopic apparatus FS. The controller 34 is configured to receive the first identification information ID21 of the first electric telescopic apparatus SP. The controller 34 is configured to receive second identification information ID22 of the second electric telescopic apparatus FS. The controller 34 is configured to receive the first identification information ID21 of the first electric telescopic apparatus SP and the second identification information ID22 of the second electric telescopic apparatus FS in the pairing mode.

The controller 34 is configured to receive the identification information ID1 of the bicycle electric operating device 22 in the pairing mode. In this embodiment, the controller 34 is configured to receive the identification information ID11 of the first operating device 24 in the pairing mode. The controller 34 is configured to receive the identification information ID12 of the second operating device 26 in the pairing mode.

The controller 34 is configured to establish a wireless communication between the controller 34 and the bicycle electric operating device 22 in the pairing mode. The controller 34 is configured to establish a wireless communication between the controller 34 and the at least one electric telescopic apparatus 16 in the pairing mode. In this embodiment, the controller 34 is configured to establish a wireless communication between the controller 34 and each of the first operating devices 24 and 26 in the pairing mode. the controller 34 is configured to establish a wireless communication between the bicycle electric seatpost assembly SP and the bicycle electric suspension FS in the pairing mode. Namely, the controller 34 is configured to establish a wireless communication between the controller 34 and each of the first operating devices 24 and 26, the bicycle electric seatpost assembly SP, the bicycle electric suspension FS in the pairing mode.

The switch SW1 is electrically connected to the controller 34 to set the controller 34 to the pairing mode based on a user input IP1 received by the switch SW1. The controller 34 is configured to change a mode of the controller 34 from the control mode to the pairing mode based on the user input IP1 received by the switch SW1 in the control mode.

In this embodiment, as seen in FIG. 5, the switch SW1 is a push-button switch and is provided on the base member 30. The controller 34 is configured to enter the pairing mode when the switch SW1 is pressed in the control mode. The controller 34 is configured to return to the control mode when the switch SW1 is pressed in the pairing mode.

As seen in FIG. 3, the controller 34 is configured to wirelessly transmit a control signal CS to the at least one electric telescopic apparatus 16 based on the telescopic operation signal WS2 wirelessly transmitted from the bicycle electric operating device 22. The control signal CS includes a first control signal CS1 and a second control signal CS2. The controller 34 is configured to wirelessly transmit the first control signal CS1 to the first electric telescopic apparatus SP. The controller 34 is configured to wirelessly transmit the second control signal CS2 to the second electric telescopic apparatus FS. The control signal CS is distinguishable from the operation signal WS1 and the telescopic operation signal WS2. Each of the first control signal CS1 and the second control signal CS2 is distinguishable from each of the operation signal WS1 and the telescopic operation signal WS2 which are wirelessly transmitted from the bicycle electric operating device 22.

The controller 34 is configured to wirelessly transmit the control signal CS to the at least one electric telescopic apparatus 16 in the control mode based on the telescopic operation signal WS2 wirelessly transmitted from the bicycle electric operating device 22. In this embodiment, the controller 34 is configured to wirelessly transmit the first control signal CS1 or the second control signal CS2 based on the telescopic operation signal WS2. In this embodiment, the controller 34 is configured to wirelessly transmit the first control signal CS1 to the first electric telescopic apparatus SP based on the first telescopic operation signal WS21. The controller 34 is configured to wirelessly transmit the second control signal CS2 to the second electric telescopic apparatus FS based on the second telescopic operation signal WS22. In this embodiment, the controller 34 is configured to add the identification information ID2 to the control signal CS to control the electric telescopic apparatus 16 after the pairing is completed between the controller 34 and the electric telescopic apparatus 16. Specifically, the controller 34 is configured to add the first identification information ID21 of the first electric telescopic apparatus SP to the first control signal CS1 to control the first electric telescopic apparatus SP after the pairing is completed between the controller 34 and the telescopic controller 73. The controller 34 is configured to add the second identification information ID22 of the second electric telescopic apparatus FS to the second control signal CS2 to control the second electric telescopic apparatus FS after the pairing is completed between the controller 34 and the telescopic controller 173.

In this embodiment, the controller 34 is configured to wirelessly transmit the control signal CS to the at least one electric telescopic apparatus 16 in the control mode in response to the telescopic operation signal WS2 wirelessly transmitted from the bicycle electric operating device 22. However, the controller 34 can be configured to wirelessly transmit the control signal CS (the first control signal CS1 and/or the second control signal CS2) to the at least one electric telescopic apparatus 16 in the control mode in response to the operation signal WS1 (e.g., the first wireless signal WS11 and/or the second wireless signal WS12). For example, the controller 34 can be configured to wirelessly transmit the first control signal CS1 to the bicycle electric seatpost assembly SP in the control mode in response to the first and second wireless signals WS11 and WS12 substantially simultaneously transmitted from the bicycle electric operating device 22. The controller 34 can be configured to wirelessly transmit the second control signal CS2 to the bicycle electric suspension FS in the control mode in response to the first and second wireless signals WS11 and WS12 substantially simultaneously transmitted from the bicycle electric operating device 22. Furthermore, the controller 34 can be configured to wirelessly transmit the first control signal CS1 to the bicycle electric seatpost assembly SP in the control mode in response to a wireless signal which is wirelessly transmitted from the bicycle electric operating device 22 based on a long press of one of the first and second electrical switches 24A and 26A. The controller 34 can be configured to wirelessly transmit the second control signal CS2 to the bicycle electric suspension FS in the control mode in response to a wireless signal which is wirelessly transmitted from the bicycle electric operating device 22 based on a long press of the other of the first and second electrical switches 24A and 26A. In such embodiments, at least one of the first additional electrical switch 24G and the second additional electrical switch 26G can be omitted from the bicycle electric operating device 22.

As seen in FIG. 3, the controller 34 is constituted as a microcomputer and includes a processor 34A and a memory 34B. The processor 34A includes a CPU and a memory controller. The memory 34B includes a ROM and a RAM. The ROM includes a non-transitory computer-readable storage medium. The RAM includes a transitory computer-readable storage medium. The memory 34B includes storage areas each having an address in the ROM and the RAM. The processor 34A controls the memory 34B to store data in the storage areas of the memory 34B and reads data from the storage areas of the memory 34B.

At least one program is stored in the memory 34B (e.g., the ROM). The at least one program is read into the processor 34A, and thereby functions of the controller 34 are performed. The processor 34A and the memory 34B are mounted on a circuit board (not shown) and are connected to each other with a bus 34C.

As seen in FIG. 4, the memory 34B is configured to store the identification information ID3 of the bicycle electric device 14. The identification information ID3 of the bicycle electric device 14 includes a unique device ID (e.g., a value indicative of a derailleur) of the first operating device 24. The identification information ID3 of the bicycle electric device 14 further includes a value indicative of a device type such as "front" or "rear." The memory 34B is configured to store available device information AD1 including a value indicative of a device which can be paired with the bicycle electric device 14. In this embodiment, the available device information AD1 includes a value indicative of a seatpost, a value indicative of a right-hand shifter, and a value indicative of a left-hand shifter.

In this embodiment, the controller 34 includes a wireless communicator WC1 configured to receive a wireless signal from other bicycle components such as the at least one electric telescopic apparatus 16 and the bicycle electric operating device 22. The wireless communicator WC1 is configured to wirelessly receive a pairing signal including the identification information ID2 of the at least one electric telescopic apparatus 16 in the pairing mode. The wireless communicator WC1 is configured to wirelessly receive a pairing signal including the identification information ID1 (the first identification information ID11, the identification information ID12) of the bicycle electric operating device 22 in the pairing mode.

The wireless communicator WC1 is configured to wirelessly receive the operation signal WS1 (e.g., the first wireless signal WS11 and/or the second wireless signal WS12) and/or the telescopic operation signal WS2 (e.g., the first telescopic operation signal WS21 and/or the second telescopic operation signal WS22) from the bicycle electric operating device 22 in the control mode after the bicycle electric operating device 22 is paired with the bicycle electric device 14. The wireless communicator WC1 is configured to wirelessly transmit the control signal CS in the control mode.

The wireless communicator WC1 includes a signal receiving circuit, a signal transmitting circuit, and an antenna. Thus, the wireless communicator WC1 can also be referred to as a wireless communication circuit or circuitry WC1. The wireless communicator WC1 is electrically mounted on the circuit board (not shown) and is electrically connected to the bus 34C. The wireless communicator WC1 is configured to decode the wireless signal to recognize information wirelessly transmitted from the bicycle electric operating device 22. The wireless communicator WC1 may decrypt the encrypted wireless signal using the cryptographic key.

The wireless communicator WC1 is configured to generate the control signal CS based on the telescopic operation signal WS2. The wireless communicator WC1 is configured to superimpose digital signals on carrier wave using a predetermined wireless communication protocol to generate the control signal CS.

In this embodiment, the wireless communicator WC1 is provided as a wireless transmitter and a wireless receiver. The wireless communicator WC1 is integrally provided as a single module or unit. However, the wireless communicator WC1 can be constituted of a wireless transmitter and a wireless receiver which are provided as separate modules or units arranged at different positions from each other.

The bicycle electric device 14 comprises a shift position sensor 38 and an actuation driver 40. The electric actuator 28, the shift position sensor 38, and the actuation driver 40 are connected with each other via a bus 42. The electric actuator 28, the shift position sensor 38, and the actuation driver 40 constitute a motor unit 41. The bicycle electric device 14 has a plurality of available shift positions. In this embodiment, the bicycle electric device 14 has eleven available shift positions respectively corresponding to the first to twelfth rear sprockets R1 to R12 (FIG. 1).

The shift position sensor 38 is configured to sense a position of the electric actuator 28 as the shift position of the bicycle electric device 14. In this embodiment, the shift position sensor 38 is a contact rotational position sensor such as a potentiometer. The shift position sensor 38 is configured to sense an absolute rotational position of the rotational shaft of the electric actuator 28 as the shift position of the bicycle electric device 14. Other examples of the shift position sensor 38 include a non-contact rotational position sensor such as an optical sensor (e.g., a rotary encoder) and a magnetic sensor (e.g., a hall sensor).

The shift position sensor 38 is electrically connected to the actuation driver 40. The actuation driver 40 is configured to control the electric actuator 28 based on the shift position sensed by the shift position sensor 38. Specifically, the actuation driver 40 is electrically connected to the electric actuator 28. The actuation driver 40 is configured to control a rotational direction and a rotational speed of the rotational shaft based on the shift position and each of the first and second wireless signals WS11 and WS12.

Furthermore, the actuation driver 40 is configured to stop rotation of the rotational shaft to position the chain guide 32A at one of the low to top gear positions based on the shift position and each of the first and second wireless signals WS11 and WS12. The actuation driver 40 transmits the shift position sensed by the shift position sensor 38 to the controller 34. The controller 34 stores the shift position transmitted from the actuation driver 40 as a latest rear shift position. For example, the actuation driver 40 includes an electric circuit configured to perform the above functions of the actuation driver 40.

The bicycle electric device 14 further comprises an indicator 44. The indicator 44 is electrically connected to the controller 34 to indicate that the controller 34 is in the pairing mode. The indicator 44 is configured to indicate completion of reception of identification information ID2 (FIG. 4) of the at least one electric telescopic apparatus 16. The indicator 44 is connected to the controller 34 to inform a user of a status of the controller 34. Examples of the status of the controller 34 include a signal transmission status, a power supply status, and a mode of the controller 34. The indicator 44 is electrically mounted on the circuit board (not shown).

As seen in FIG. 5, the indicator 44 includes a light emitting element such as a light emitting diode (LED). However, the indicator 44 can include other elements such as a buzzer instead of or in addition to the light emitting element. The indicator 44 is provided on the base member 30. However, the indicator 44 can be provided at other positions in the bicycle electric device 14.

As seen in FIG. 3, the bicycle electric device (the bicycle electric transmission) 14 further comprises a power supply (a first power supply) 46 configured to supply electricity to the electric actuator (a first electric actuator) 28. The power supply 46 is electrically connected to the controller 34 and the indicator 44 to supply electricity to the controller 34 and the indicator 44. Examples of the power supply 46 include a primary battery such as a lithium manganese dioxide battery, and a secondary battery such as a lithium-ion secondary battery. In this embodiment, the power supply 46 is the secondary battery.

The bicycle electric device 14 further comprises a wake-up sensor WK1. The wake-up sensor WK1 is attached to the base member 30. Examples of the wake-up sensor WK1 include a vibration sensor, an accelerate sensor, and a non-contact sensor such as a magnetic sensor. In this embodiment, the wake-up sensor WK1 is configured to sense vibration of the bicycle electric device 14.

The controller 34 has the control mode in which the controller 34 controls the electric actuator 28 to actuate the movable member 32. The controller 34 has a sleep mode in which a power consumption of the controller 34 is lower than a power consumption of the controller 34 in the control mode. The controller 34 is configured to change a mode of the controller 34 between the control mode and the sleep mode based on a detection result of the wake-up sensor WK1. The controller 34 is configured to change the mode of the controller 34 from the control mode to the sleep mode when the wake-up sensor WK1 does not sense the vibration of the bicycle electric device 14 during a sleep determination time in the control mode. The controller 34 is configured to change the mode of the controller 34 from the sleep mode to the control mode when the wake-up sensor WK1 senses the vibration of the bicycle electric device 14 in the sleep mode.

The controller 34 is configured to change the mode of the bicycle electric device 14 between the control mode and the sleep mode based on a detection result of the wireless communicator WC1 in addition to the detection result of the wake-up sensor WK1. The controller 34 is configured to change the mode of the bicycle electric device 14 from the control mode to the sleep mode when the wake-up sensor WK1 does not sense the vibration of the bicycle electric device 14 and the wireless communicator WC1 does not sense a wireless signal during the sleep determination time in the control mode. The controller 34 is configured to change the mode of the bicycle electric device 14 from the sleep mode to the control mode when the wake-up sensor WK1 senses the vibration of the bicycle electric device 14 and/or the wireless communicator WC1 senses a wireless signal in the sleep mode. The wake-up sensor WK1 can be omitted from the controller 34. In such an embodiment, the controller 34 can be configured to enter one of the control mode and the sleep mode when an actuation switch is pressed.

Figure 6:
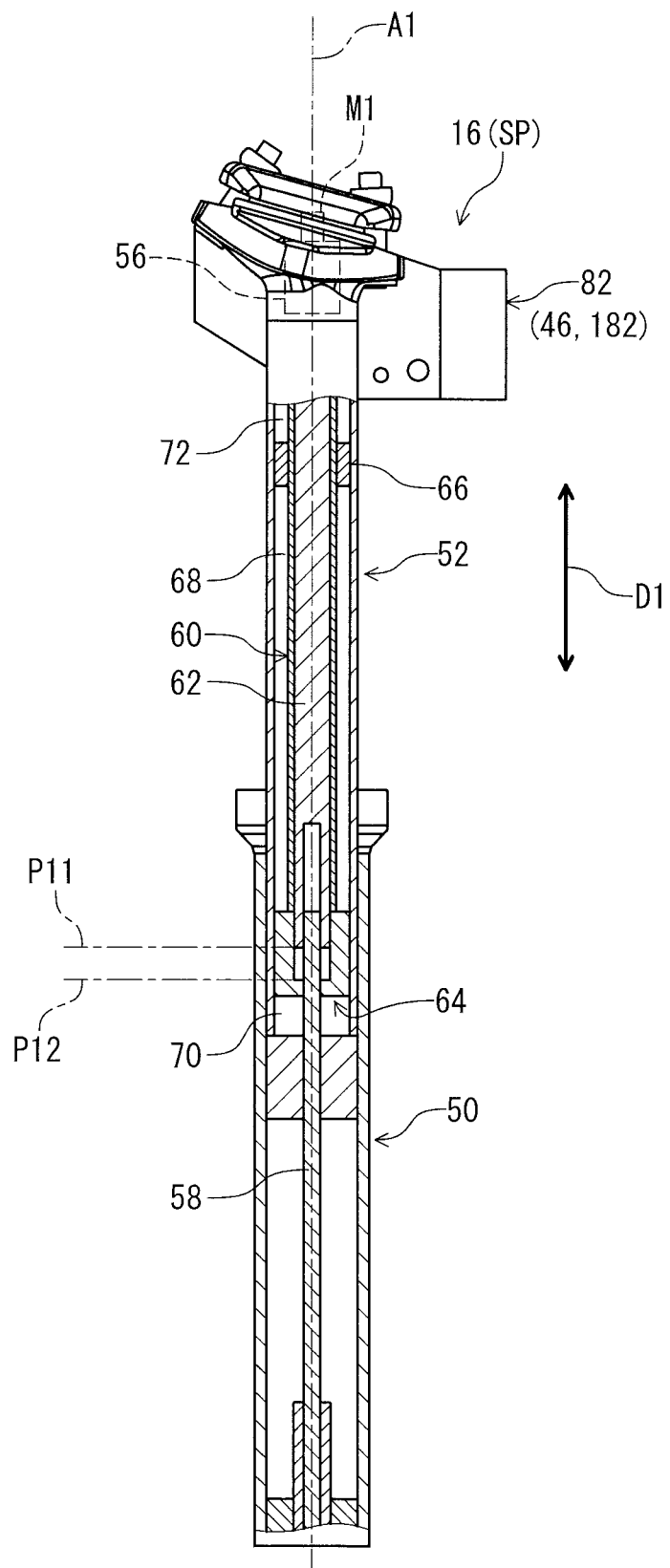
FIG. 6 is a cross-sectional view of an electric telescopic apparatus of the bicycle wireless control system illustrated in FIG. 1.

As seen in FIG. 6, the at least one electric telescopic apparatus (the bicycle electric telescopic apparatus) 16 comprises a first tube 50, a second tube 52, a positioning structure 54, and a second electric actuator (an electric positioning actuator) 56. In this embodiment, the bicycle electric seatpost assembly SP comprises the first tube 50, the second tube 52, the positioning structure 54, and the second electric actuator 56.

The first tube 50 has a center axis A1. The second tube 52 is telescopically received in the first tube 50. The positioning structure 54 is configured to relatively position the first tube 50 and the second tube 52 in a telescopic direction D1 parallel to the center axis A1 of the first tube 50. The second electric actuator (the electric positioning actuator) 56 is configured to actuate the positioning structure 54. The second electric actuator 56 is coupled to the positioning structure 54 to actuate the positioning structure 54. In this embodiment, the second electric actuator 56 is mounted on an upper end 52A of the second tube 52. However, the second electric actuator 56 can be provided at other positions in the bicycle electric seatpost assembly SP. For example, the second electric actuator 56 can be provided at a lower end of an interior of the first tube 50 or an upper end of the first tube 50.

The positioning structure 54 includes a rod 58, a guide member 60, a flow control part 62, and a valve unit 64. The first tube 50 and the second tube 52 are telescopically arranged with the amount of insertion of the first tube 50 into the second tube 52 being adjustable. The first tube 50 is secured to the bicycle frame B1 (FIG. 1) by a conventional clamping arrangement (not shown). The bicycle electric seatpost assembly SP comprises a floating piston 66 movably provided in the second tube 52.

The valve unit 64 divides an interior bore of the first tube 50 into a first fluid chamber 68 and a second fluid chamber 70. The flow control part 62 is provided in the guide member 60 to move relative to the valve unit 64 between a closed position P11 and an open position P12 in the telescopic direction D1. The flow control part 62 is biased by a biasing element (not shown) toward the closed position P11.

The valve unit 64 is closed when the flow control part 62 is positioned at the closed position P11. The valve unit 64 is open when the flow control part 62 is positioned at the open position P12. The valve unit 64 is coupled to the second tube 52 via the guide member 60 to move together relative to the first tube 50. The first fluid chamber 68 is disposed between the valve unit 64 and the floating piston 66. The second fluid chamber 70 is disposed between the valve unit 64 and a lower end of the first tube 50. The flow control part 62 cooperates with the guide member 60 and the valve unit 64 to control flow of fluid between the first fluid chamber 68 and the second fluid chamber 70 to change a position of the first tube 50 relative to the second tube 52.

When the valve unit 64 is closed, the first tube 50 and the second tube 52 are relatively positioned relative to each other in the telescopic direction D1. When the valve unit 64 is open, the first tube 50 and the second tube 52 are relatively movable relative to each other in the telescopic direction D1. The floating piston 66 is disposed in the interior bore of the second tube 52 and forms a gas chamber 72 disposed between the floating piston 66 and an upper end of the second tube 52. The shorter total length of the bicycle electric seatpost assembly SP increases an inner pressure of the gas chamber 72. The bicycle electric seatpost assembly SP includes structures which have been known in the bicycle field, they will not be described and/or illustrated in detail here for the sake of brevity.

As seen in FIG. 6, the second electric actuator 56 moves the flow control part 62 from the closed position P11 to the open position P12 in response to the first control signal CS1 wirelessly transmitted from the bicycle electric device 14. The second electric actuator 56 keeps the flow control part 62 at the open position P12 for a valve open time after receipt of the first control signal CS1. The second electric actuator 56 returns the flow control part 62 to the closed position P11 when the valve open time is elapsed. However, the second electric actuator 56 can be configured to keep the flow control part 62 at the open position P12 during a receipt of the first control signal CS1 (e.g., during an operation of the bicycle electric operating device 22).

The second electric actuator 56 is mechanically coupled to the flow control part 62 to move the flow control part 62 between the closed position P11 and the open position P12. In this embodiment, the second electric actuator 56 includes a DC motor. The second electric actuator 56 includes a rotational shaft (not shown) to output a rotational force. The rotational shaft is coupled to the flow control part 62 with a gear reducer (not shown). Other examples of the second electric actuator 56 include a stepper motor, an AC motor, and an electromagnetic solenoid.

As seen in FIG. 3, the bicycle electric telescopic apparatus (the bicycle electric seatpost assembly) SP further comprises a telescopic controller 73, a valve position sensor 74, and a valve actuator driver 76. The second electric actuator 56, the valve position sensor 74, and the valve actuator driver 76 are connected with each other via a bus 78. The second electric actuator 56, the valve position sensor 74, and the valve actuator driver 76 constitute a seatpost motor unit 77. The telescopic controller 73 is configured to control the second electric actuator 56 based on the first control signal CS1 wirelessly transmitted from the bicycle electric device 14 without responding to the operation signal WS1 the telescopic operation signal WS2. The second electric actuator 56, the telescopic controller 73, the valve position sensor 74, and the valve actuator driver 76 are connected to each other with a bus 78.

The telescopic controller 73 has a control mode in which the telescopic controller 73 receives the first control signal CS1 from the controller 34. The telescopic controller 73 is configured to recognize a control signal including the first identification information ID21 and to ignore another control signal free of the first identification information ID21. Thus, the telescopic controller 73 is configured to recognize the first control signal CS1 including the first identification information ID21 and to ignore the second control signal CS2 free of the first identification information ID21. The telescopic controller 73 is configured to control the second electric actuator 56 in the control mode based on the first control signal CS1. The telescopic controller 73 is in the control mode when the bicycle electric seatpost assembly SP is activated in response to supply of electricity.

The valve position sensor 74 is configured to sense a valve position of the flow control part 62 via the second electric actuator 56. In this embodiment, the valve position sensor 74 is a contact rotational position sensor such as a potentiometer. The valve position sensor 74 is configured to sense an absolute rotational position of the rotational shaft of the second electric actuator 56 as the valve position of the flow control part 62. Other examples of the valve position sensor 74 include a non-contact rotational position sensor such as an optical sensor (e.g., a rotary encoder) and a magnetic sensor (e.g., a hall sensor).

The valve position sensor 74 is electrically connected to the valve actuator driver 76. The valve actuator driver 76 is configured to control the second electric actuator 56 based on the first control signal CS1 and the position sensed by the valve position sensor 74. Specifically, the valve actuator driver 76 is electrically connected to the second electric actuator 56. The valve actuator driver 76 is configured to control a rotational direction and a rotational speed of the rotational shaft based on the valve position and the first control signal CS1 wirelessly transmitted from the controller 34. Furthermore, the valve actuator driver 76 is configured to stop rotation of the rotational shaft to position the flow control part 62 at one of the closed position P11 and the open position P12 based on the valve position and the first control signal CS1 wirelessly transmitted from the controller 34.

The valve actuator driver 76 controls the second electric actuator 56 to keep the flow control part 62 at the closed position P11 while the valve actuator driver 76 does not receive the first control signal CS1. The valve actuator driver 76 controls the second electric actuator 56 to move the flow control part 62 from the closed position P11 to the open position P12 when the valve actuator driver 76 receives the first control signal CS1. The valve actuator driver 76 controls the second electric actuator 56 to move the flow control part 62 from the open position P12 to the closed position P11 when the set time is elapsed.

As seen in FIG. 4, the telescopic controller 73 has a pairing signal transmission mode in which the telescopic controller 73 transmits a pairing signal including the first identification information ID21 of the bicycle electric seatpost assembly SP. The bicycle electric seatpost assembly SP comprises a seatpost switch SW2. The seatpost switch SW2 is electrically connected to the telescopic controller 73 to set the telescopic controller 73 to the pairing signal transmission mode based on a user input IP2 received by the seatpost switch SW2. The telescopic controller 73 is configured to change a mode of the telescopic controller 73 from the control mode to the pairing signal transmission mode based on the user input IP2 received by the seatpost switch SW2 in the control mode. In a state where the controller 34 is in the paring mode, the telescopic controller 73 transmits the paring signal in the paring signal transmission mode to establish a wireless communication between the telescopic controller 73 and the controller 34.

Figure 7:
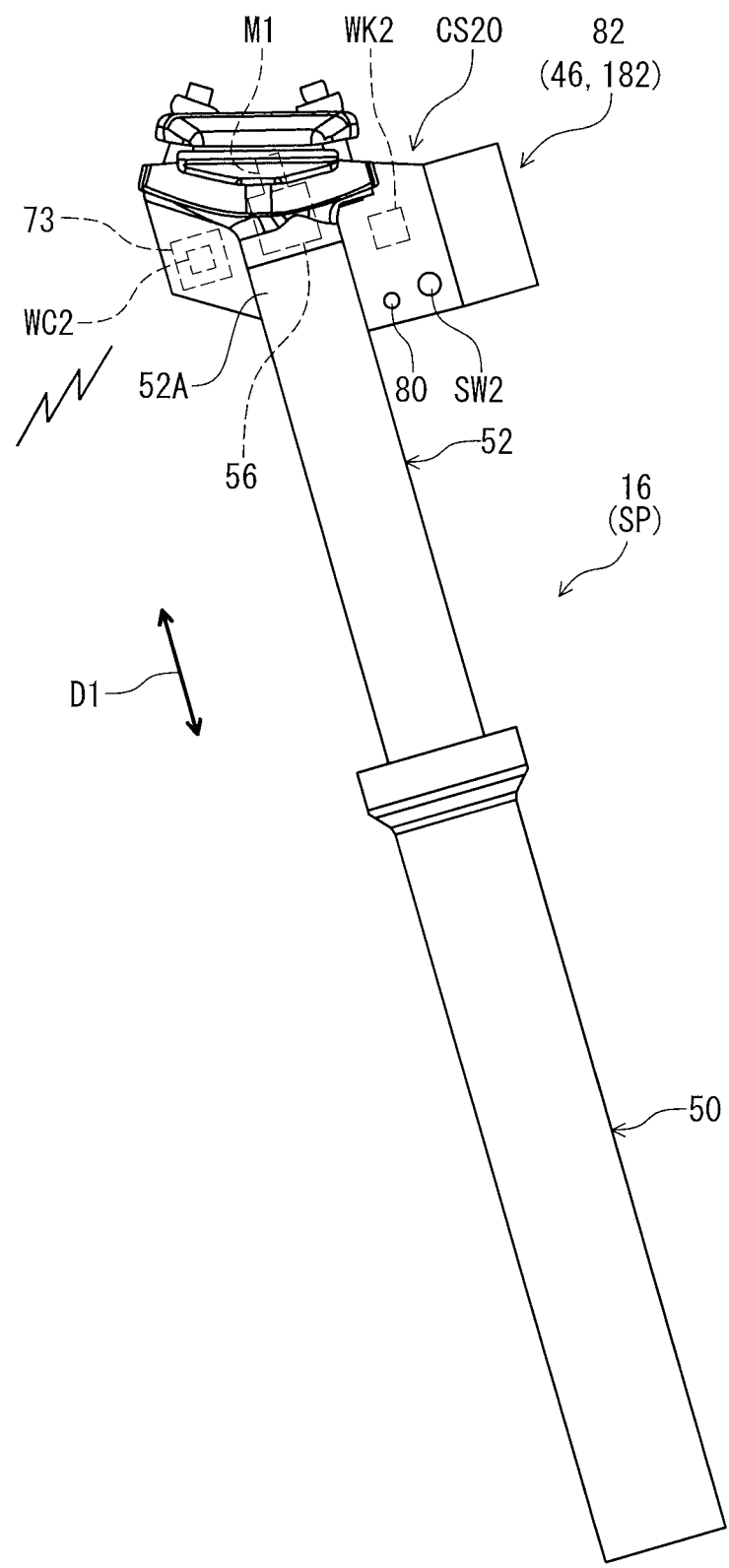
FIG. 7 is a side elevational view of the electric telescopic apparatus of the bicycle wireless control system illustrated in FIG. 1.

In this embodiment, as seen in FIG. 7, the seatpost switch SW2 is a push-button switch and is attached to the second tube 52. The seatpost switch SW2 and the seatpost motor unit 77 are provided at the upper end 52A of the second tube 52. The telescopic controller 73 is configured to enter the pairing signal transmission mode when the seatpost switch SW2 is pressed in the control mode. The telescopic controller 73 is configured to return to the control mode when the seatpost switch SW2 is pressed in the pairing signal transmission mode.

As seen in FIG. 3, the telescopic controller 73 is constituted as a microcomputer and includes a processor 73A and a memory 73B. The processor 73A includes a CPU and a memory controller. The memory 73B includes a ROM and a RAM. The ROM includes a non-transitory computer-readable storage medium. The RAM includes a transitory computer-readable storage medium. The memory 73B includes storage areas each having an address in the ROM and the RAM. The processor 73A controls the memory 73B to store data in the storage areas of the memory 73B and reads data from the storage areas of the memory 73B.

At least one program is stored in the memory 73B (e.g., the ROM). The at least one program is read into the processor 73A, and thereby functions of the telescopic controller 73 are performed. The processor 73A and the memory 73B are mounted on a circuit board (not shown) and are connected to each other with a bus 73C.

The memory 73B is configured to store the first identification information ID21 of the bicycle electric seatpost assembly SP. The first identification information ID21 of the bicycle electric seatpost assembly SP includes a unique device ID (e.g., a value indicative of a seatpost) of the bicycle electric seatpost assembly SP. The first identification information ID21 of the bicycle electric seatpost assembly SP further includes a value indicative of a device type such as "hydraulic" or "motorized." The memory 73B is configured to store available device information AD2 including a value indicative of a device which can be paired with the bicycle electric seatpost assembly SP. In this embodiment, the available device information AD2 includes a value indicative of a rear derailleur.

The telescopic controller 73 is configured to control the electric positioning actuator 56 based on a wireless signal. In this embodiment, the telescopic controller 73 includes a wireless communicator WC2 configured to wirelessly receive the wireless signal from the bicycle electric device 14. The wireless communicator WC2 is configured to wirelessly transmit the pairing signal including the first identification information ID21 in the pairing signal transmission mode. The wireless communicator WC2 is configured to wirelessly receive the first control signal CS1 from the bicycle electric device 14 in the control mode after the bicycle electric seatpost assembly SP is paired with the bicycle electric device 14.

The wireless communicator WC2 includes a signal receiving circuit, a signal transmitting circuit, and an antenna. Thus, the wireless communicator WC2 can also be referred to as a wireless communication circuit or circuitry WC2. The wireless communicator WC2 is electrically mounted on the circuit board (not shown) and is electrically connected to the bus 73C. The wireless communicator WC2 is configured to decode the wireless signal to recognize information wirelessly transmitted from the bicycle electric device 14. The wireless communicator WC2 may decrypt the encrypted wireless signal using the cryptographic key.

The wireless communicator WC2 is configured to generate the pairing signal including the first identification information ID21 of the bicycle electric seatpost assembly SP. In this embodiment, the wireless communicator WC2 is configured to generate the pairing signal based on the user input IP2. The wireless communicator WC2 is configured to superimpose digital signals on carrier wave using a predetermined wireless communication protocol to generate the pairing signal.

In this embodiment, the wireless communicator WC2 is provided as a wireless transmitter and a wireless receiver. The wireless communicator WC2 is integrally provided as a single module or unit. However, the wireless communicator WC2 can be constituted of a wireless transmitter and a wireless receiver which are provided as separate modules or units arranged at different positions from each other.

As seen in FIG. 7, the wireless communicator WC2 is at least partly provided on a rear side of one of the first tube 50 and the second tube 52. In this embodiment, the wireless communicator WC2 is provided on the rear side of the second tube 52. The wireless communicator WC2 includes an antenna. The antenna of the wireless communicator WC2 is provided on a rear side of the second tube 52.

As seen in FIG. 3, the bicycle electric seatpost assembly SP further comprises an indicator 80. The indicator 80 is electrically connected to the telescopic controller 73 to indicate that the telescopic controller 73 is in the pairing signal transmission mode. The indicator 80 is connected to the telescopic controller 73 to inform a user of a status of the telescopic controller 73. Examples of the status of the telescopic controller 73 include a signal transmission status, a power supply status, and a mode of the telescopic controller 73. The indicator 80 is electrically mounted on the circuit board (not shown).

As seen in FIG. 7, the indicator 80 includes a light emitting element such as a light emitting diode (LED). However, the indicator 80 can include other elements such as a buzzer instead of or in addition to the light emitting element. The indicator 80 is provided at the upper end 52A of the second tube 52. However, the indicator 80 can be provided at other positions in the bicycle electric seatpost assembly SP.

As seen in FIG. 3, the bicycle electric telescopic apparatus 16 comprises a power supply 82 configured to supply electricity to the electric positioning actuator 156. In this embodiment, the bicycle electric seatpost assembly SP comprises a power supply 82. The power supply 82 is electrically connected to the telescopic controller 73 and the indicator 80 to supply electricity to the telescopic controller 73 and the indicator 80. Examples of the power supply 82 include a primary battery such as a lithium manganese dioxide battery, and a secondary battery such as a lithium-ion secondary battery. In this embodiment, the power supply 82 is the secondary battery.

The bicycle electric telescopic apparatus SP further comprises a wake-up sensor WK2. The wake-up sensor WK2 is attached to one of the first tube 50 and the second tube 52. In this embodiment, the wake-up sensor WK2 is attached to the second tube 52. However, the wake-up sensor WK2 can be attached to the first tube 50. Examples of the wake-up sensor WK2 include a vibration sensor, an accelerate sensor, and a non-contact sensor such as a magnetic sensor. In this embodiment, the wake-up sensor WK2 is configured to sense vibration of the bicycle electric telescopic apparatus SP.

The telescopic controller 73 has the control mode in which the telescopic controller 73 controls the electric positioning actuator 56 to actuate the positioning structure 54. The telescopic controller 73 has a sleep mode in which a power consumption of the telescopic controller 73 is lower than a power consumption of the telescopic controller 73 in the control mode. The telescopic controller 73 is configured to change a mode of the telescopic controller 73 between the control mode and the sleep mode based on a detection result of the wake-up sensor WK2. The telescopic controller 73 is configured to change the mode of the telescopic controller 73 from the control mode to the sleep mode when the wake-up sensor WK2 does not sense the vibration of the bicycle electric telescopic apparatus SP during a sleep determination time in the control mode. The telescopic controller 73 is configured to change the mode of the telescopic controller 73 from the sleep mode to the control mode when the wake-up sensor WK2 senses the vibration of the bicycle electric telescopic apparatus SP in the sleep mode.

The telescopic controller 73 is configured to change the mode of the bicycle electric telescopic apparatus SP between the control mode and the sleep mode based on a detection result of the wireless communicator WC2 in addition to the detection result of the wake-up sensor WK2. The telescopic controller 73 is configured to change the mode of the bicycle electric telescopic apparatus SP from the control mode to the sleep mode when the wake-up sensor WK2 does not sense the vibration of the bicycle electric telescopic apparatus SP and the wireless communicator WC2 does not sense a wireless signal during the sleep determination time in the sleep mode. The telescopic controller 73 is configured to change the mode of the bicycle electric telescopic apparatus SP from the sleep mode to the control mode when the wake-up sensor WK2 senses the vibration of the bicycle electric telescopic apparatus SP and/or the wireless communicator WC2 senses a wireless signal in the sleep mode. The wake-up sensor WK2 can be omitted from the telescopic controller 73.

Figure 8:
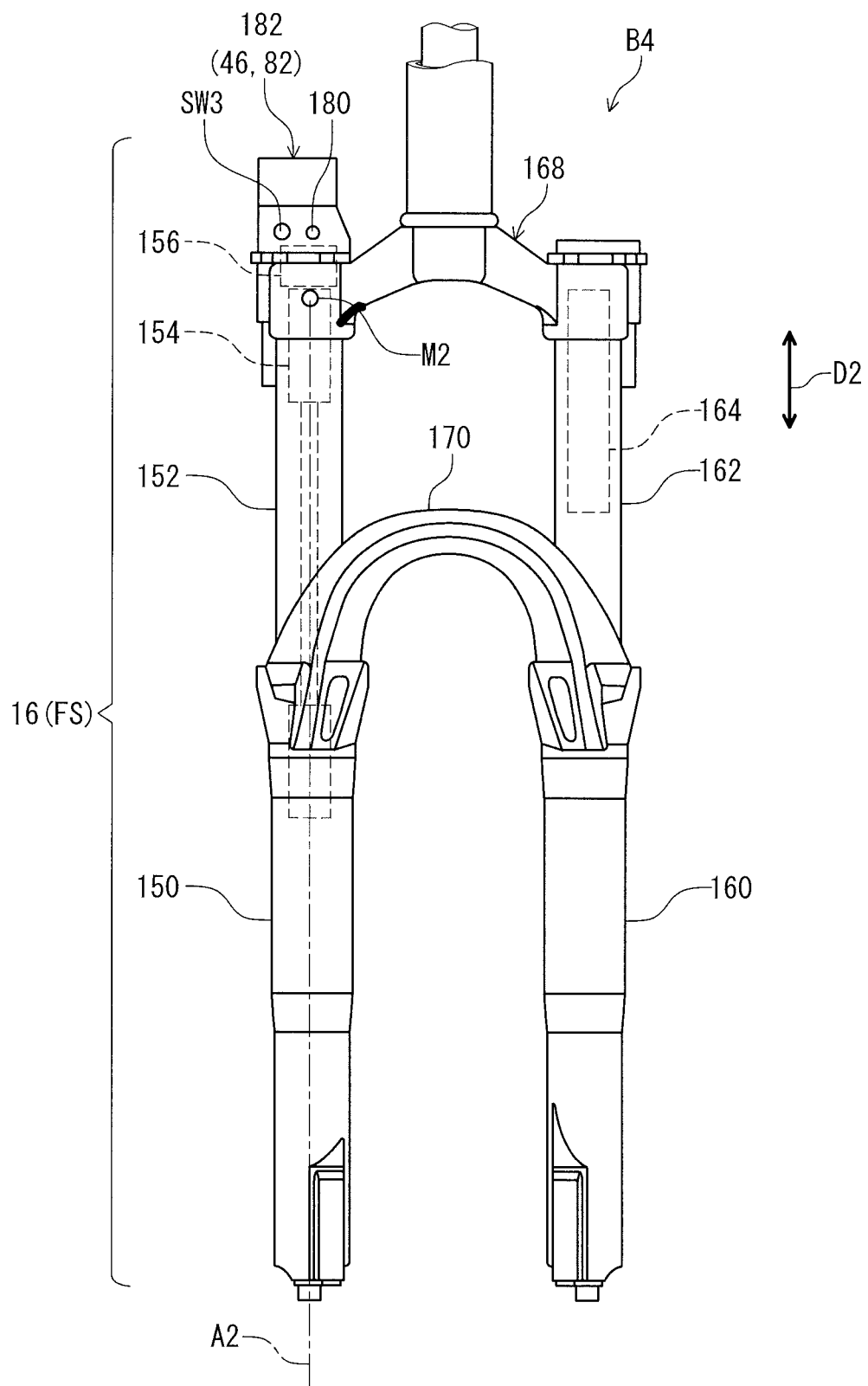
FIG. 8 is a front view of another electric telescopic apparatus of the bicycle wireless control system illustrated in FIG. 1.

As seen in FIG. 8, the at least one electric telescopic apparatus (a bicycle electric telescopic apparatus) 16 comprises a first tube 150, a second tube 152, a positioning structure 154, and a second electric actuator (an electric positioning actuator) 156. In this embodiment, the bicycle electric suspension FS comprises the first tube 150, the second tube 152, the positioning structure 154, and the second electric actuator 156.

The first tube 150 has a center axis A21. The second tube 152 is telescopically received in the first tube 150. The positioning structure 154 is configured to relatively position the first tube 150 and the second tube 152 in a telescopic direction D2 parallel to the center axis A21 of the first tube 150. The second electric actuator (the electric positioning actuator) 156 is configured to actuate the positioning structure 154. The second electric actuator 156 is coupled to the positioning structure 154 to actuate the positioning structure 154. The second electric actuator 156 is mounted on an upper end 152A of the second tube 152. However, the second electric actuator 156 can be provided at other positions in the bicycle electric suspension FS.

In this embodiment, the positioning structure 154 has a lockout position and an unlocked position. In the lockout position of the positioning structure 154, the first tube 150 is locked relative to the second tube 152 in the telescopic direction D2. In the unlocked position of the positioning structure 154, the first tube 150 and the second tube 152 are movable relative to each other in the telescopic direction D2 to absorb shocks from rough terrain. The second electric actuator 156 is operatively coupled to the positioning structure 154 to switch a position of the positioning structure 154 between the lockout position and the unlocked position. The lockout devices for bicycle suspensions are well known in the bicycle field. Thus, the positioning structure 154 can be any type of suitable lockout device as needed and/or desired.

Similarly, the bicycle electric suspension FS comprises a third tube 160, a fourth tube 162, and a height adjustment structure 164. The third tube 160 has a center axis A22. The fourth tube 162 is telescopically received in the third tube 160. The height adjustment structure 164 is configured to change a relative position between the fourth tube 162 and the third tube 160 in the telescopic direction D2 parallel to the center axis A22 of the third tube 160.

In this embodiment, the height adjustment structure 164 is configured to change a relative position between the third tube 160 and the fourth tube 162 in the telescopic direction D2. The height adjustment structure 164 is manually operated by the user to change the relative position between the third tube 160 and the fourth tube 162 in the telescopic direction D2. The height adjustment devices for bicycle suspensions are well known in the bicycle field. Thus, the height adjustment structure 164 can be any type of suitable height adjustment device as needed and/or desired.

The second and fourth tubes 152 and 162 are coupled to a crown 168. The first tube 150 is coupled to the third tube 160 with a coupling arm 170. The first tubes 150 and 160 are integrally movable relative to the second tubes 152 and 162 to absorb shocks. In the unlocked position of the positioning structure 154, the first tube 150 and the third tube 160 are respectively movable relative to the second tube 152 and the fourth tube 162 in the telescopic direction D2 to absorb shocks from rough terrain.

As seen in FIG. 3, the bicycle electric telescopic apparatus (the bicycle electric suspension) FS further comprises a telescopic controller 173, a lock position sensor 174 and a lock actuator driver 176. The second electric actuator 156, the lock position sensor 174, and the lock actuator driver 176 are connected with each other via a bus 178. The second electric actuator 156, the lock position sensor 174, and the lock actuator driver 176 constitute a suspension motor unit 177. The telescopic controller 173 is configured to control the second electric actuator 156 based on the second control signal CS2 wirelessly transmitted from the bicycle electric device 14. The second electric actuator 156, the telescopic controller 173, the lock position sensor 174, and the lock actuator driver 176 are connected with each other via a bus 178.

The telescopic controller 173 has a control mode in which the telescopic controller 173 receives the second control signal CS2 from the controller 34. The telescopic controller 173 is configured to recognize a control signal including the second identification information ID22 and to ignore another control signal free of the second identification information ID22. Thus, the telescopic controller 173 is configured to recognize the second control signal CS2 including the second identification information ID22 and to ignore the first control signal CS1 free of the second identification information ID22. The telescopic controller 173 is configured to control the second electric actuator 156 in the control mode based on the second control signal CS2. The telescopic controller 173 is in the control mode when the bicycle electric suspension FS is activated in response to supply of electricity.

The lock position sensor 174 is configured to sense the position of the positioning structure 164 via the second electric actuator 156. In this embodiment, the lock position sensor 174 is a contact rotational position sensor such as a potentiometer. The lock position sensor 174 is configured to sense an absolute rotational position of the rotational shaft of the second electric actuator 156 as the position of the positioning structure 164. Other examples of the lock position sensor 174 include a non-contact rotational position sensor such as an optical sensor (e.g., a rotary encoder) and a magnetic sensor (e.g., a hall sensor).

The lock position sensor 174 is electrically connected to the lock actuator driver 176. The lock actuator driver 176 is configured to control the second electric actuator 156 based on the second control signal CS2 and the position sensed by the lock position sensor 174. Specifically, the lock actuator driver 176 is electrically connected to the second electric actuator 156. The lock actuator driver 176 is configured to control a rotational direction and a rotational speed of the rotational shaft based on the position and the second control signal CS2 wirelessly transmitted from the controller 34. Furthermore, the lock actuator driver 176 is configured to stop rotation of the rotational shaft to position the positioning structure 164 at one of the lockout position and the unlocked position based on the position and the second control signal CS2 wirelessly transmitted from the controller 34.

The lock actuator driver 176 controls the second electric actuator 156 to change the position of the positioning structure 164 between the lockout position and the unlocked position in response to the second control signal CS2. The lock actuator driver 176 controls the second electric actuator 156 to move the positioning structure 164 from the lockout position to the unlocked position in response to the second control signal CS2 in a lockout state where the positioning structure 164 is in the lockout position. The lock actuator driver 176 controls the second electric actuator 156 to move the positioning structure 164 from the unlocked position to the lockout position in response to the second control signal CS2 in an unlocked state where the positioning structure 164 is in the unlocked position.

As seen in FIG. 4, the telescopic controller 173 has a pairing signal transmission mode in which the telescopic controller 173 transmits a pairing signal including the second identification information ID22 of the bicycle electric suspension FS. The bicycle electric suspension FS comprises a suspension switch SW3. The suspension switch SW3 is electrically connected to the telescopic controller 173 to set the telescopic controller 173 to the pairing signal transmission mode based on a user input IP3 received by the suspension switch SW3. The telescopic controller 173 is configured to change a mode of the telescopic controller 173 from the control mode to the pairing signal transmission mode based on the user input IP3 received by the suspension switch SW3 in the control mode. In a state where the controller 34 is in the paring mode, the telescopic controller 173 transmits the paring signal in the paring signal transmission mode to establish a wireless communication between the telescopic controller 173 and the controller 34.

In this embodiment, as seen in FIG. 7, the suspension switch SW3 is a push-button switch and is attached to the second tube 152. The suspension switch SW3 and the suspension motor unit 177 are provided at the upper end 152A of the second tube 152. The telescopic controller 173 is configured to enter the pairing signal transmission mode when the suspension switch SW3 is pressed in the control mode. The telescopic controller 173 is configured to return to the control mode when the suspension switch SW3 is pressed in the pairing signal transmission mode.

As seen in FIG. 3, the telescopic controller 173 is constituted as a microcomputer and includes a processor 173A and a memory 173B. The processor 173A includes a CPU and a memory controller. The memory 173B includes a ROM and a RAM. The ROM includes a non-transitory computer-readable storage medium. The RAM includes a transitory computer-readable storage medium. The memory 173B includes storage areas each having an address in the ROM and the RAM. The processor 173A controls the memory 173B to store data in the storage areas of the memory 173B and reads data from the storage areas of the memory 173B.

At least one program is stored in the memory 173B (e.g., the ROM). The at least one program is read into the processor 173A, and thereby functions of the telescopic controller 173 are performed. The processor 173A and the memory 173B are mounted on a circuit board (not shown) and are connected to each other with a bus 173C.

The memory 173B is configured to store the second identification information ID22 of the bicycle electric suspension FS. The second identification information ID22 of the bicycle electric suspension FS includes a unique device ID (e.g., a value indicative of a suspension) of the bicycle electric suspension FS. The second identification information ID22 of the bicycle electric suspension FS further includes a value indicative of a device type such as "front" or "rear." The memory 173B is configured to store available device information AD3 including a value indicative of a device which can be paired with the bicycle electric suspension FS. In this embodiment, the available device information AD3 includes a value indicative of a rear derailleur.

The telescopic controller 173 is configured to control the electric positioning actuator 56 based on a wireless signal. In this embodiment, the telescopic controller 173 includes a wireless communicator WC3 configured to wirelessly receive the wireless signal from the bicycle electric device 14. The wireless communicator WC3 is configured to wirelessly transmit the pairing signal including the second identification information ID22 in the pairing signal transmission mode. The wireless communicator WC3 is configured to wirelessly receive the second control signal CS2 from the bicycle electric device 14 in the control mode after the bicycle electric suspension FS is paired with the bicycle electric device 14.

The wireless communicator WC3 includes a signal receiving circuit, a signal transmitting circuit, and an antenna. Thus, the wireless communicator WC3 can also be referred to as a wireless communication circuit or circuitry WC3. The wireless communicator WC3 is electrically mounted on the circuit board (not shown) and is electrically connected to the bus 173C. The wireless communicator WC3 is configured to decode the wireless signal to recognize information wirelessly transmitted from the bicycle electric device 14. The wireless communicator WC3 may decrypt the encrypted wireless signal using the cryptographic key.

The wireless communicator WC3 is configured to generate the pairing signal including the second identification information ID22 of the bicycle electric suspension FS. In this embodiment, the wireless communicator WC3 is configured to generate the pairing signal based on the user input IP3. The wireless communicator WC3 is configured to superimpose digital signals on carrier wave using a predetermined wireless communication protocol to generate the pairing signal.

In this embodiment, the wireless communicator WC3 is provided as a wireless transmitter and a wireless receiver. The wireless communicator WC3 is integrally provided as a single module or unit. However, the wireless communicator WC3 can be constituted of a wireless transmitter and a wireless receiver which are provided as separate modules or units arranged at different positions from each other.

As seen in FIG. 8, the wireless communicator WC3 is at least partly provided on a rear side of one of the first tube 150 and the second tube 152. In this embodiment, the wireless communicator WC3 is provided on the rear side of the second tube 152. The wireless communicator WC3 includes an antenna. The antenna of the wireless communicator WC3 is provided on a rear side of the second tube 152.

As seen in FIG. 3, the bicycle electric suspension FS further comprises an indicator 180. The indicator 180 is electrically connected to the telescopic controller 173 to indicate that the telescopic controller 173 is in the pairing signal transmission mode. The indicator 180 is connected to the telescopic controller 173 to inform a user of a status of the telescopic controller 173. Examples of the status of the telescopic controller 173 include a signal transmission status, a power supply status, and a mode of the telescopic controller 173. The indicator 180 is electrically mounted on the circuit board (not shown).

As seen in FIG. 8, the indicator 180 includes a light emitting element such as a light emitting diode (LED). However, the indicator 180 can include other elements such as a buzzer instead of or in addition to the light emitting element. The indicator 180 is provided at the upper end 152A of the second tube 152. However, the indicator 180 can be provided at other positions in the bicycle electric suspension FS.

As seen in FIG. 3, the bicycle electric telescopic apparatus 16 comprises a power supply 182 configured to supply electricity to the electric positioning actuator 156. In this embodiment, the bicycle electric suspension FS comprises a power supply 182. The power supply 182 is electrically connected to the telescopic controller 173 and the indicator 180 to supply electricity to the telescopic controller 173 and the indicator 180. Examples of the power supply 182 include a primary battery such as a lithium manganese dioxide battery, and a secondary battery such as a lithium-ion secondary battery. In this embodiment, the power supply 182 is the secondary battery.

The bicycle electric telescopic apparatus FS further comprises a wake-up sensor WK3. The wake-up sensor WK3 is attached to one of the first tube 150 and the second tube 152. In this embodiment, the wake-up sensor WK3 is attached to the second tube 152. However, the wake-up sensor WK3 can be attached to the first tube 150. Examples of the wake-up sensor WK3 include a vibration sensor, an accelerate sensor, and a non-contact sensor such as a magnetic sensor. In this embodiment, the wake-up sensor WK3 is configured to sense vibration of the bicycle electric suspension FS.

The telescopic controller 173 has the control mode in which the telescopic controller 173 controls the electric positioning actuator 156 to actuate the positioning structure 154. The telescopic controller 173 has a sleep mode in which a power consumption of the telescopic controller 173 is lower than a power consumption of the telescopic controller 173 in the control mode. The telescopic controller 173 is configured to change a mode of the telescopic controller 173 between the control mode and the sleep mode based on a detection result of the wake-up sensor WK3. The telescopic controller 173 is configured to change the mode of the telescopic controller 173 from the control mode to the sleep mode when the wake-up sensor WK3 does not sense the vibration of the bicycle electric telescopic apparatus FS during a sleep determination time in the control mode. The telescopic controller 173 is configured to change the mode of the telescopic controller 173 from the sleep mode to the control mode when the wake-up sensor WK3 senses the vibration of the bicycle electric telescopic apparatus FS in the sleep mode.

The telescopic controller 173 is configured to change the mode of the bicycle electric telescopic apparatus FS between the control mode and the sleep mode based on a detection result of the wireless communicator WC3 in addition to the detection result of the wake-up sensor WK3. The telescopic controller 173 is configured to change the mode of the bicycle electric telescopic apparatus FS from the control mode to the sleep mode when the wake-up sensor WK3 does not sense the vibration of the bicycle electric telescopic apparatus FS and the wireless communicator WC3 does not sense a wireless signal during the sleep determination time in the sleep mode. The telescopic controller 173 is configured to change the mode of the bicycle electric telescopic apparatus FS from the sleep mode to the control mode when the wake-up sensor WK3 senses the vibration of the bicycle electric telescopic apparatus FS and/or the wireless communicator WC3 senses a wireless signal in the sleep mode. The wake-up sensor WK3 can be omitted from the telescopic controller 173.

As seen in FIG. 2, the bicycle 10 includes a bicycle power supply system PSS comprising a power supply configured to supply electricity to a bicycle electric actuator of an electric component. In this embodiment, the electric component includes the bicycle electric telescopic apparatus SP or FS and the bicycle electric transmission RD. Thus, the bicycle electric transmission RD comprises the power supply (the first power supply) 46 configured to supply electricity to the bicycle electric actuator (the first electric actuator) 28 of the electric component RD. The bicycle electric telescopic apparatus SP comprises the power supply (the second power supply) 82 configured to supply electricity to the bicycle electric actuator (the electric positioning actuator, the second electric actuator) 56 of the electric component SP. The bicycle electric telescopic apparatus FS comprises the power supply (the second power supply) 182 is configured to supply electricity to the bicycle electric actuator (the electric positioning actuator, the second electric actuator) 156 of the electric component FS. The power supplies 46, 82, and 182 have substantially the same structures as each other to be replaced with each other. However, at least one of the power supplies 46, 82, and 182 can have a structure different from that of another power supply. The power supplies 46, 82, and 182 are exclusive goods for the bicycle power supply system PSS. However, the power supplies 46, 82, and 182 can have a structure identical to general-purpose products.

As seen in FIGS. 5, 7, and 8, the power supply 46 is configured to be detachably connected to the electric component SP and/or FS other than the electric bicycle component 14. The power supply 46 is configured to be detachably and alternatively connected to each of the bicycle electric telescopic apparatuses SP and FS.

Figure 9:
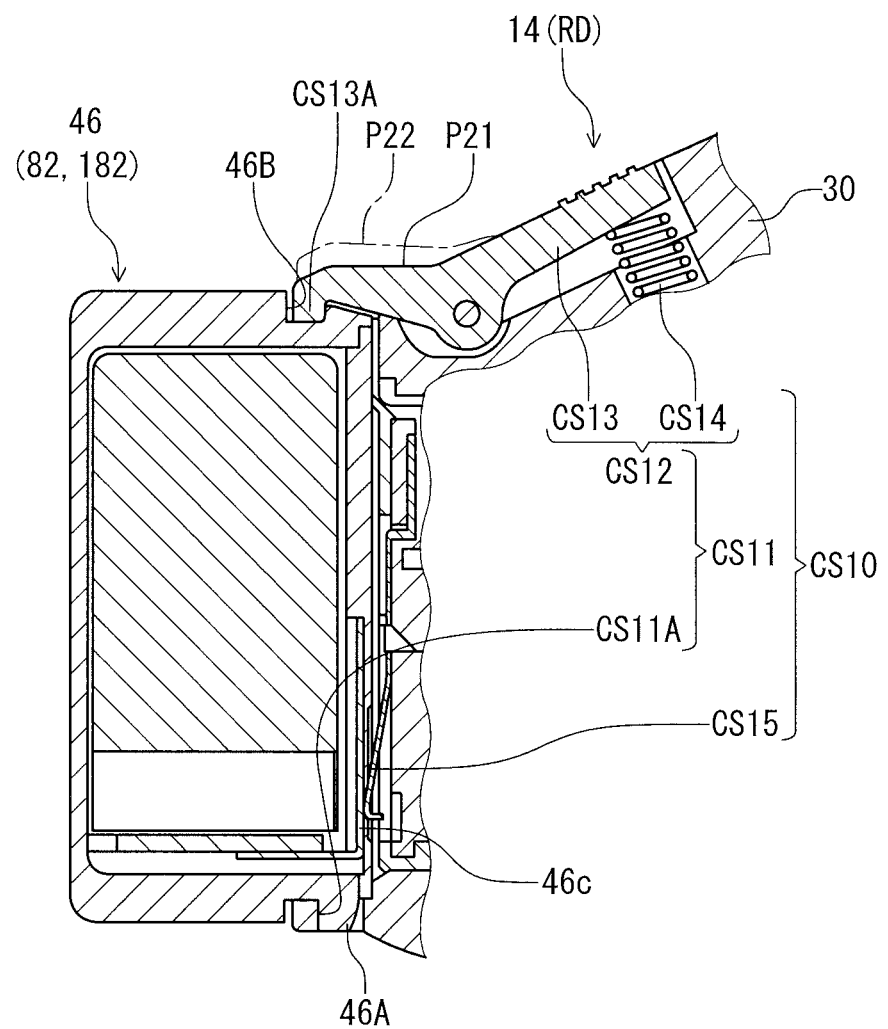
FIG. 9 is a cross-sectional view of a power supply and a connecting structure of the bicycle electric device illustrated in FIG. 5.

As seen in FIG. 9, the bicycle electric transmission RD comprises a connecting structure (a first connecting structure) CS10 configured to be detachably connected to the power supply (a first power supply) 46 to electrically connect the power supply 46 to the electric positioning actuator (a first electric actuator) 56. The connecting structure CS10 is configured to be detachably connected to the alternative power supply 82 and/or 182 configured to supply electricity to at least one of the bicycle electric suspension FS and the bicycle electric seatpost assembly SP. In this embodiment, the connecting structure CS10 is configured to be detachably connected to each of the alternative power supplies 82 and 182.

The connecting structure CS10 includes a lock structure CS11. The lock structure CS11 has a lock state where the power supply 46 is secured to the connecting structure CS10 with the lock structure CS11. The lock structure CS11 has a release state where the power supply 46 is detachable from the connecting structure CS10.

The lock structure CS11 includes a latch structure CS12. The latch structure CS12 includes a latch CS13 and a latch spring CS14. The latch CS13 is pivotally coupled to the base member 30. The latch CS13 is pivotable relative to the base member 30 between a lock position P21 and an unlock position P22. The latch spring CS14 is mounted to the base member 30 to bias the latch CS13 toward the lock position P21. The latch CS13 is at the lock position P21 in the lock state of the lock structure CS11. The latch CS13 is at the unlock position P22 in the unlock state of the lock structure CS11.

The power supply 46 includes an attachment pawl 46A and an attachment recess 46B. The lock structure CS11 includes an attachment opening CS11A. The latch CS13 includes a latch pawl CS13A. The attachment pawl 46A is fitted in the attachment opening CS11A in the lock state to couple the power supply 46 to the base member 30. The latch pawl CS13A is fitted in the attachment recess 46B in the lock state to couple the power supply 46 to the base member 30. The power supply 46 is detachable from the connecting structure CS10 in a state where the latch CS13 is at the unlock position P22.

The connecting structure CS10 electrically connects the power supply 46 to the electric positioning actuator 56 in the lock state. The connecting structure CS10 includes a first electric contact CS15. The power supply 46 includes a second electric contact (an electric contact) 46C contactable with the first electric contact CS15 in the lock state.

Figure 10:
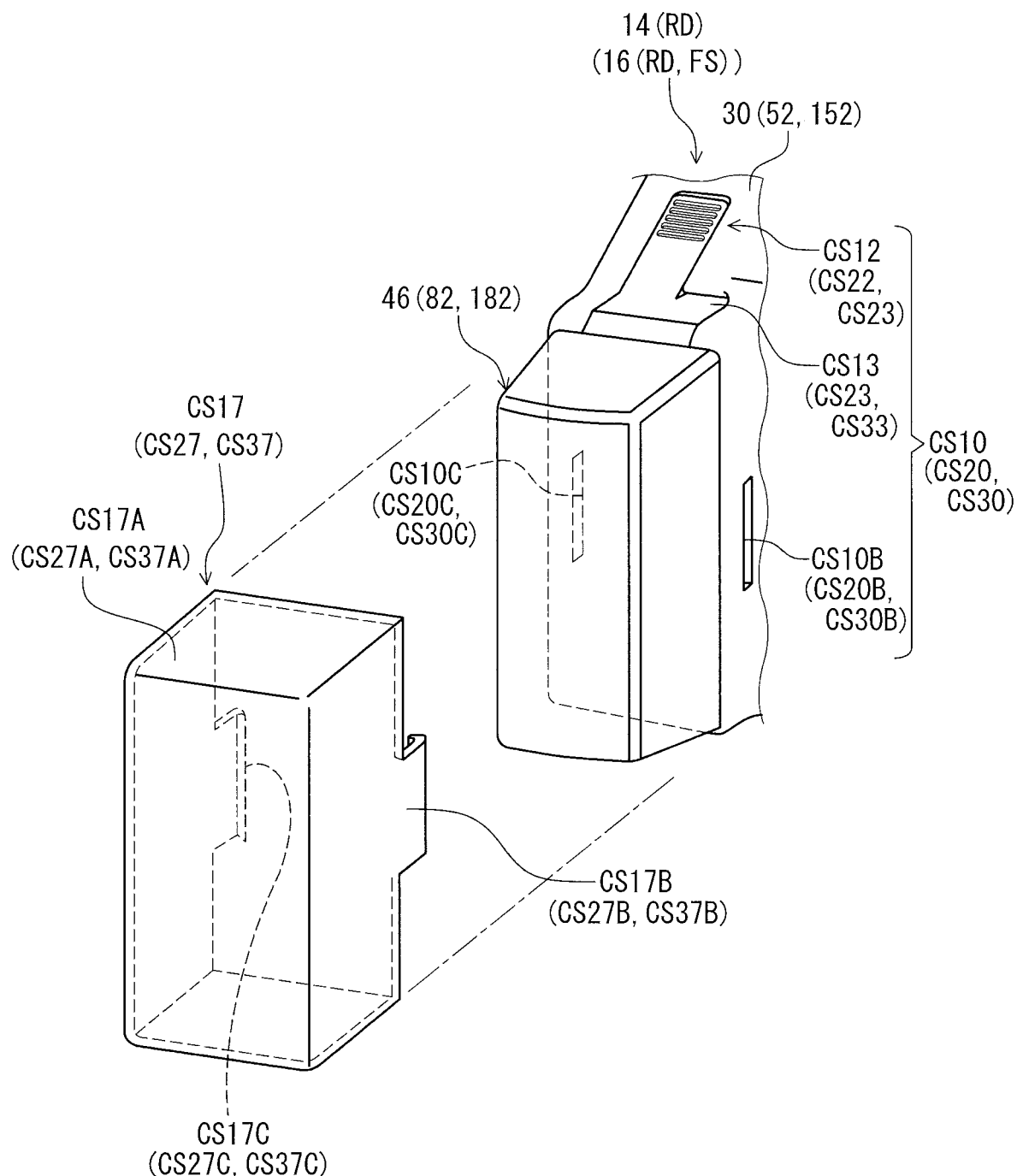
FIG. 10 is a perspective view of the power supply and the connecting structure illustrated in FIG. 5, with a protecting cover.

As seen in FIG. 10, the bicycle electric device (the bicycle electric rear derailleur) RD can comprise a protecting cover CS17 detachably attached to the connecting structure CS10 to protect the power supply 46 in the lock state. For example, the protecting cover CS17 includes a cover body CS17A, an attachment pawl CS17B, and an attachment pawl CS17C. The cover body CS17A at least party covers the power supply 46 in a state where the protecting cover CS17 is attached to the connecting structure CS10. The connecting structure CS10 includes a first receiving recess CS10B and a second receiving recess CS10C. The first pawl CS17B is fitted in the first receiving recess CS10B to couple the protecting cover CS17 to the connecting structure CS10. The second pawl CS17C is fitted in the second receiving recess CS10C to couple the protecting cover CS17 to the connecting structure CS10. The cover body CS17A covers the power supply 46 in a state where the first and second pawl CS17B and CS17C are fitted in the first and second receiving recesses CS10B and CS10C. The protecting cover CS17 can be omitted from the bicycle electric device 14 (the bicycle electric rear derailleur RD).

Figure 11:
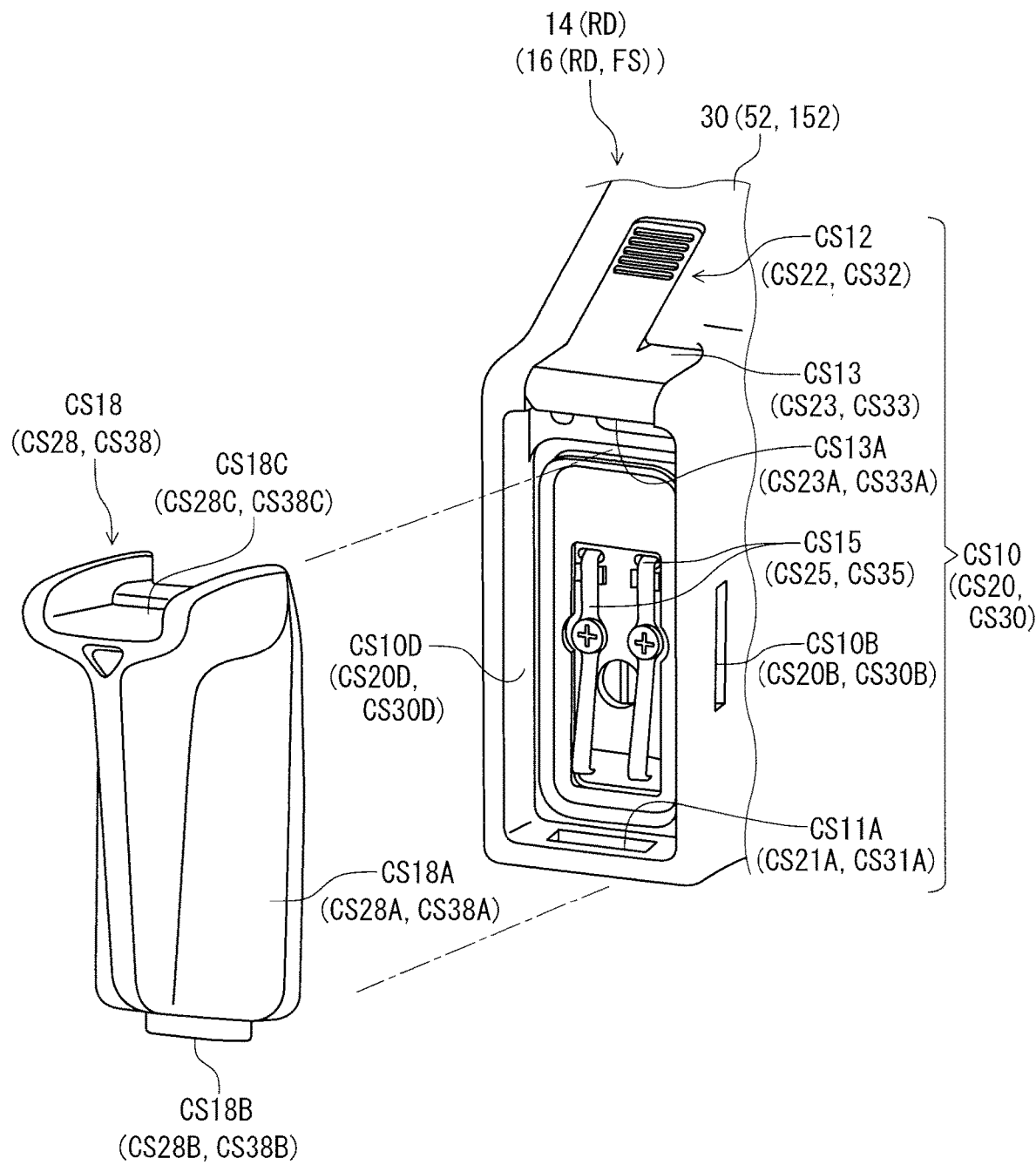
FIG. 11 is a perspective view of the connecting structure illustrated in FIG. 5, with an additional cover.

As seen in FIG. 11, the bicycle electric device 14 (the bicycle electric rear derailleur RD) further comprises an additional cover CS18 attachable to the connecting structure CS10 to cover the connecting structure CS10 in a state where the power supply 46 is detached from the connecting structure CS10. The additional cover CS18 includes a cover body CS18A, an attachment pawl CS18B, and an attachment recess CS18C. The attachment pawl CS18B is fitted in the attachment opening CS11A to detachably couple the additional cover CS18 to the connecting structure CS10. The latch pawl CS13A is fitted in the attachment recess CS18C to detachably couple the additional cover CS18 to the connecting structure CS10. The cover body CS18A is fitted in an accommodation opening CS10D to cover the first electric contact CS15 of the connecting structure CS10 in a state where the additional cover CS18 is attached to the connecting structure CS10. The additional cover CS18 can be omitted from the bicycle electric device 14 (the bicycle electric rear derailleur RD).

Figure 12:
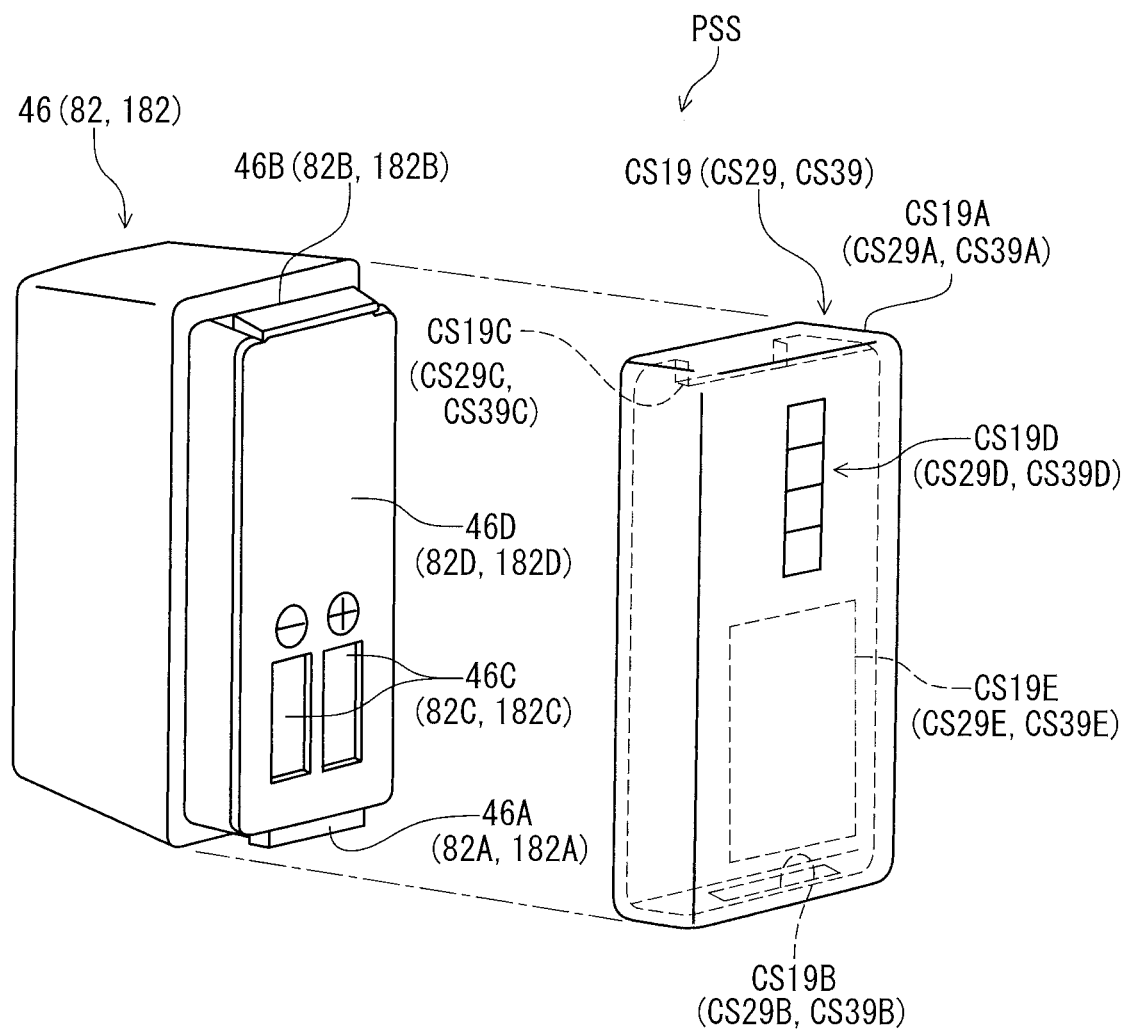
FIG. 12 is a perspective view of the power supply illustrated in FIG. 5, with an additional cover.

As seen in FIG. 12, the bicycle power supply system PSS further comprises a power supply cover CS19 configured to be detachably attached to the power supply 46 in a state where the power supply 46 is detached from the electric component SP. The power supply cover CS19 is configured to cover the electric contact CS16 in an attachment state where the power supply cover CS19 is attached to the power supply 46. The power supply cover CS19 includes a cover body CS19A, an attachment opening CS19B, and an attachment pawl CS19C. The cover body CS19A at least partly covers an attachment surface 46D of the power supply 46 in a state where the power supply cover CS19 is attached to the power supply 46. The attachment pawl 46A is fitted in the attachment opening CS19B to detachably couple the power supply cover CS19 to the power supply 46. The attachment pawl CS19C is fitted in the attachment recess 46B to detachably couple the power supply cover CS19 to the power supply 46. The power supply cover CS19 can be omitted from the bicycle power supply system PSS.

The power supply cover CS19 includes a charged state indicator CS19D configured to selectively indicate one of a charged state and a non-charged state of the power supply 46. In this embodiment, the charged state indicator CS19D includes LED lights to indicate a charged level of the power supply 46 in a state where the power supply cover CS19 is attached to the power supply 46. The power supply cover CS19 includes an indication circuit CS19E configured to sense the charged state or the non-charged state of the power supply 46. The indication circuit CS19E includes a contact (not shown) to contact the second electrical contact 46C. The indication circuit CS19E is electrically connected to the charged state indicator CS19D to control an indication state of the charged state indicator CS19D based on the sensing result of the charged state or the non-charged state of the power supply 46. The charged state indicator CS19D and the indication circuit CS19E can be omitted from the power supply cover CS19. Furthermore, an operation element can be movably mounted to the power supply cover CS19. In such an embodiment, the indication circuit CS19E can be configured to control the indication state of the charged state indicator CS19D based on an operation of the operation element. Examples of the operation element include a lever, a dial, and a push button. For example, the operation element is movably mounted to the power supply cover CS19 between an indication position and a non-indication position. The indication circuit CS19E controls the charged state indicator CS19D to indicate the charged level of the power supply 46 when the operation element is in the indication position. The indication circuit CS19E turns the charged state indicator CS19D off when the operation element is in the non-indication position.

As seen in FIGS. 5, 7, and 8, the power supply 82 is configured to be detachably connected to an electric bicycle component other than the bicycle electric telescopic apparatus SP. In this embodiment, the electric bicycle component includes the bicycle electric telescopic apparatus FS and the bicycle electric transmission RD. The power supply 82 is configured to be detachably and alternatively connected to one of the bicycle electric telescopic apparatus FS and the bicycle electric transmission RD. The power supply 82 is configured to be detachably and alternatively connected to each of the bicycle electric telescopic apparatus FS and the bicycle electric transmission RD.

Figure 13:
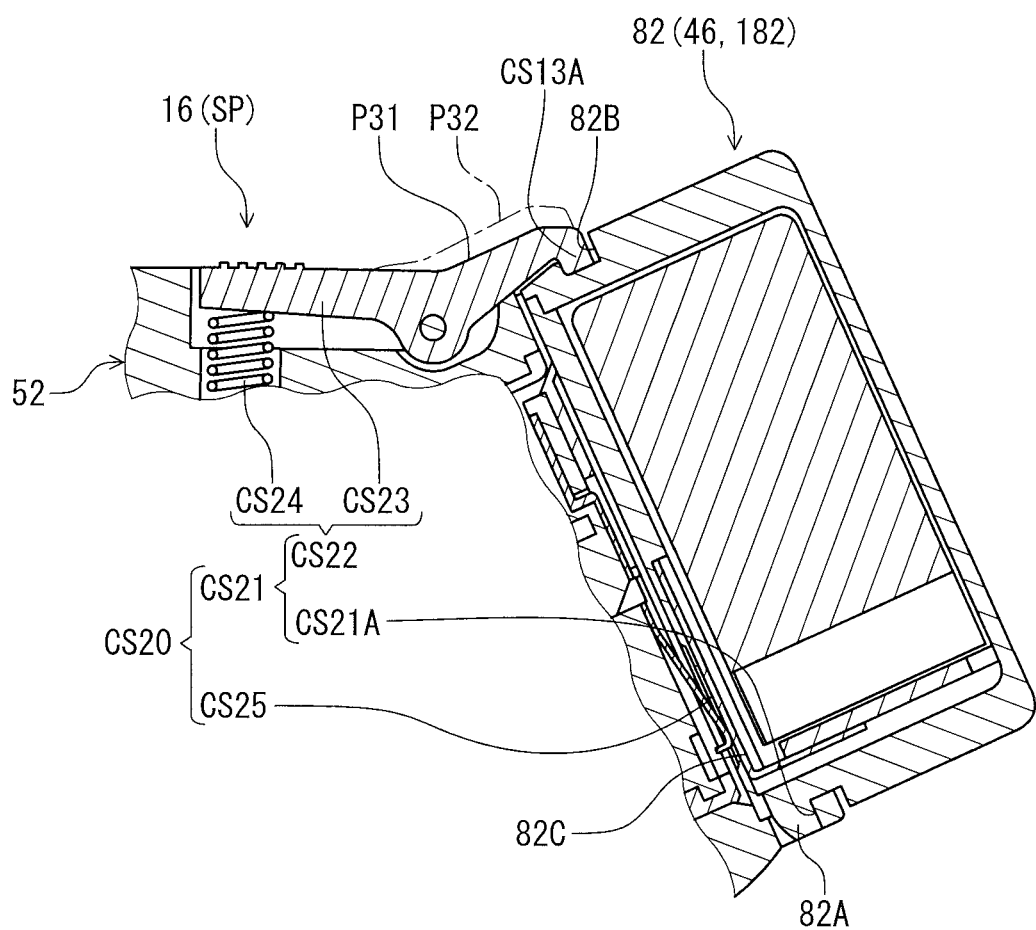
FIG. 13 is a cross-sectional view of a power supply and a connecting structure of the bicycle electric telescopic apparatus illustrated in FIG. 6.

As seen in FIG. 13, the bicycle electric telescopic apparatus SP comprises a connecting structure (a second connecting structure) CS20 configured to be detachably connected to the power supply (a second power supply) 82 to electrically connect the power supply 82 to the electric positioning actuator (a first electric actuator) 56. The connecting structure CS20 is configured to be detachably connected to an alternative power supply that is configured to be detachably connected to the electric bicycle component other than the bicycle electric telescopic apparatus SP. The connecting structure CS20 is configured to be detachably connected to the alternative power supply 182 configured to supply electricity to one of the bicycle electric suspension FS and the bicycle electric seatpost assembly SP.

In this embodiment, the connecting structure CS20 is configured to be detachably connected to the alternative power supply 46 configured to supply electricity to the electric rear derailleur RD provided as the electric bicycle component. The connecting structure CS20 is configured to be detachably connected to the alternative power supply 182 configured to supply electricity to the bicycle electric suspension FS.

As seen in FIG. 7, the connecting structure CS20 is provided at one of the first tube 50 and the second tube 52. The connecting structure CS20 is provided at the upper end 52A of the second tube 52 in a mounting state where the bicycle electric seatpost assembly SP is mounted to the bicycle frame B1. The connecting structure CS20 is provided on a front side of the one of the first tube 50 and the second tube 52 in a mounting state where the bicycle electric seatpost assembly SP is mounted to the bicycle frame B1. In this embodiment, the connecting structure CS20 is provided on the front side of the second tube 52 in the mounting state where the bicycle electric seatpost assembly SP is mounted to the bicycle frame B1 (FIG. 1). However, the connecting structure CS20 can be provided at the second tube 52. The connecting structure CS20 can be provided on the front side of the first tube 50 in the mounting state where the bicycle electric seatpost assembly is mounted to the bicycle frame B1.

As seen in FIG. 13, the connecting structure CS20 includes a lock structure CS21. The lock structure CS21 has a lock state where the power supply 82 is secured to the connecting structure CS20 with the lock structure CS21. The lock structure CS21 has a release state where the power supply 82 is detachable from the connecting structure CS20.

The lock structure CS21 includes a latch structure CS22. The latch structure CS22 includes a latch CS23 and a latch spring CS24. The latch CS23 is pivotally coupled to the second tube 52. The latch CS23 is pivotable relative to the second tube 52 between a lock position P31 and an unlock position P32. The latch spring CS24 is mounted to the base member 30 to bias the latch CS23 toward the lock position P31. The latch CS23 is at the lock position P31 in the lock state of the lock structure CS21. The latch CS23 is at the unlock position P32 in the unlock state of the lock structure CS21.

The power supply 82 includes an attachment pawl 82A and an attachment recess 82B. The lock structure CS21 includes an attachment opening CS21A. The latch CS23 includes a latch pawl CS23A. The attachment pawl 82A is fitted in the attachment opening CS21A in the lock state. The latch pawl CS23A is fitted in the attachment recess 82B in the lock state. The power supply 82 is detachable from the connecting structure CS20 in a state where the latch CS23 is at the unlock position P32.

The connecting structure CS20 electrically connects the power supply 82 to the electric positioning actuator 56 in the lock state. The connecting structure CS20 includes a first electric contact CS25. The power supply 82 includes a second electric contact (an electric contact) 82C contactable with the first electric contact CS25 in the lock state.

As seen in FIG. 10, the bicycle electric telescopic apparatus (the bicycle electric seatpost assembly) SP further comprises a protecting cover CS27 detachably attached to the connecting structure CS20 to protect the power supply 82 in the lock state. For example, the protecting cover CS27 includes a cover body CS27A, an attachment pawl CS27B, and an attachment pawl CS27C. The cover body CS27A at least party covers the power supply 82 in a state where the protecting cover CS27 is attached to the connecting structure CS20. The connecting structure CS20 includes a first receiving recess CS20B and a second receiving recess CS20C. The first pawl CS27B is fitted in the first receiving recess CS20B to couple the protecting cover CS27 to the connecting structure CS20. The second pawl CS27C is fitted in the second receiving recess CS20C to couple the protecting cover CS27 to the connecting structure CS20. The cover body CS27A covers the power supply 46 in a state where the first and second pawl CS27B and CS27C are fitted in the first and second receiving recesses CS20B and CS20C. The protecting cover CS27 can be omitted from the bicycle electric telescopic apparatus (the bicycle electric seatpost assembly) SP.

As seen in FIG. 11, the bicycle electric telescopic apparatus (the bicycle electric seatpost assembly) SP further comprises an additional cover CS28 attachable to the connecting structure CS20 to cover the connecting structure CS20 in a state where the power supply 82 is detached from the connecting structure CS20. The additional cover CS28 includes a cover body CS28A, an attachment pawl CS28B, and an attachment recess CS28C. The attachment pawl CS28B is fitted in the attachment opening CS21A to detachably couple the additional cover CS28 to the connecting structure CS20. The latch pawl CS23A is fitted in the attachment recess CS28C to detachably couple the additional cover CS28 to the connecting structure CS20. The cover body CS28A is fitted in an accommodation opening CS2D to cover the first electric contact CS25 of the connecting structure CS20 in a state where the additional cover CS28 is attached to the connecting structure CS20. The additional cover CS28 can be omitted from the bicycle electric telescopic apparatus (the bicycle electric seatpost assembly) SP.

As seen in FIG. 12, the bicycle power supply system PSS further comprises a power supply cover CS29 configured to be detachably attached to the power supply 82 in a state where the power supply 82 is detached from the electric component SP. The power supply cover CS29 is configured to cover the electric contact CS26 in an attachment state where the power supply cover CS29 is attached to the power supply 82. The power supply cover CS29 includes a cover body CS29A, an attachment opening CS29B, and an attachment pawl CS29C. The cover body CS29A at least partly covers an attachment surface 82D of the power supply 82 in a state where the power supply cover CS29 is attached to the power supply 82. The attachment pawl 82A is fitted in the attachment opening CS29B to detachably couple the power supply cover CS29 to the power supply 82. The attachment pawl CS29C is fitted in the attachment recess 82B to detachably couple the power supply cover CS29 to the power supply 82. The power supply cover CS29 can be omitted from the bicycle power supply system PSS.

The power supply cover CS29 includes a charged state indicator CS29A configured to selectively indicate one of a charged state and a non-charged state of the power supply 82. In this embodiment, the charged state indicator CS29D includes LED lights to indicate a charged level of the power supply 82 in a state where the power supply cover CS29 is attached to the power supply 82. The power supply cover CS29 includes an indication circuit CS29E configured to sense the charged state or the non-charged state of the power supply 82. The indication circuit CS29E includes a contact (not shown) to contact the second electrical contact 82C. The indication circuit CS29E is electrically connected to the charged state indicator CS29D to control an indication state of the charged state indicator CS29D based on the sensing result of the charged state or the non-charged state of the power supply 82. The charged state indicator CS29D and the indication circuit CS29E can be omitted from the power supply cover CS29.

As seen in FIGS. 5, 7, and 8, the power supply 182 is configured to be detachably connected to an electric bicycle component other than the bicycle electric telescopic apparatus FS. In this embodiment, the electric bicycle component includes the bicycle electric telescopic apparatus SP and the bicycle electric transmission RD. The power supply 182 is configured to be detachably and alternatively connected to one of the bicycle electric telescopic apparatus SP and the bicycle electric transmission RD. The power supply 182 is configured to be detachably and alternatively connected to each of the bicycle electric telescopic apparatus SP and the bicycle electric transmission RD.

Figure 14:
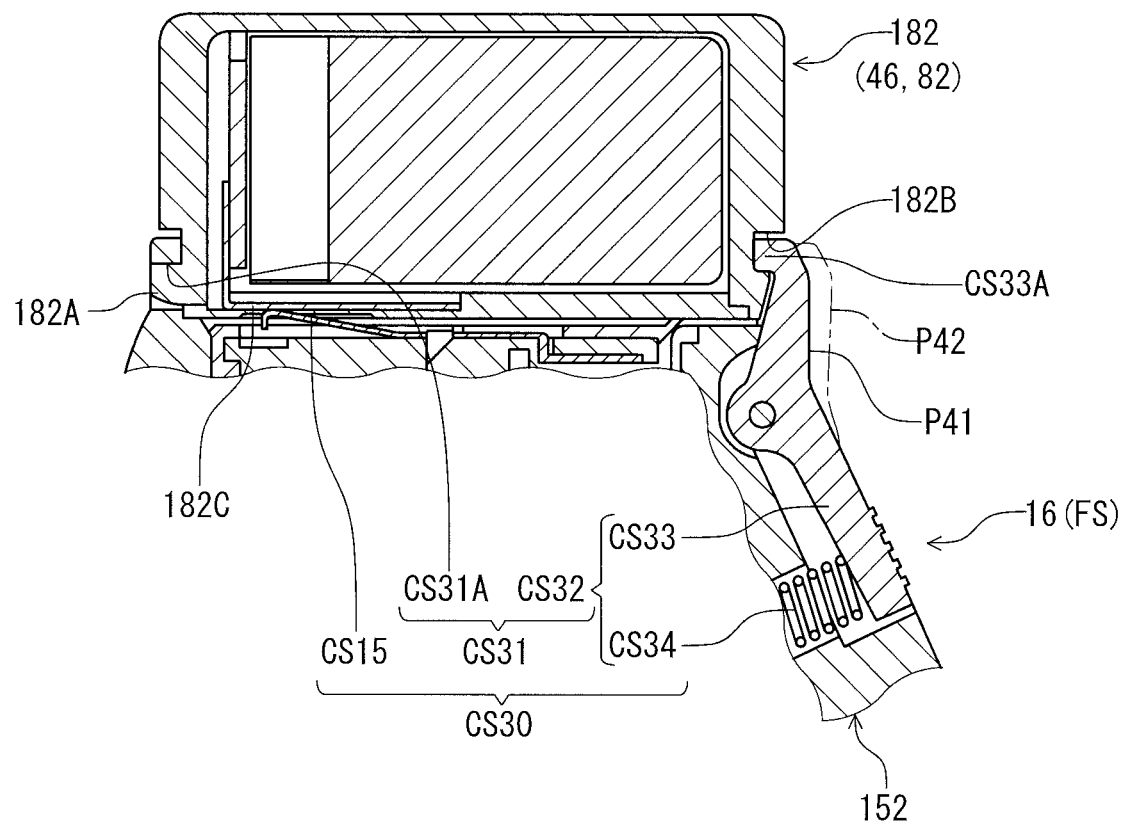
FIG. 14 is a cross-sectional view of a power supply and a connecting structure of the bicycle electric telescopic apparatus illustrated in FIG. 8.

As seen in FIG. 14, the bicycle electric telescopic apparatus FS comprises a connecting structure (a second connecting structure) CS30 configured to be detachably connected to the power supply (a second power supply) 182 to electrically connect the power supply 182 to the electric positioning actuator (a first electric actuator) 156. The connecting structure CS30 is configured to be detachably connected to an alternative power supply that is configured to be detachably connected to the electric bicycle component other than the bicycle electric telescopic apparatus FS. The connecting structure CS30 is configured to be detachably connected to the alternative power supply 82 configured to supply electricity to one of the bicycle electric suspension FS and the bicycle electric seatpost assembly SP.

In this embodiment, the connecting structure CS30 is configured to be detachably connected to the alternative power supply 46 configured to supply electricity to the electric rear derailleur RD provided as the electric bicycle component. The connecting structure CS30 is configured to be detachably connected to the alternative power supply 82 configured to supply electricity to the bicycle electric seatpost assembly SP.

As seen in FIG. 8, the connecting structure CS30 is provided at one of the first tube 150 and the second tube 152. The connecting structure CS30 is provided at the upper end 152A of the second tube 152 in a mounting state where the bicycle electric suspension FS is mounted to the bicycle frame B1. The connecting structure CS30 is provided on a front side of the one of the first tube 150 and the second tube 152 in a mounting state where the bicycle electric seatpost assembly SP is mounted to the bicycle frame B1. In this embodiment, the connecting structure CS30 is provided at the second tube 152 in the mounting state where the bicycle electric suspension FS is mounted to the bicycle frame B1 (FIG. 1). However, the connecting structure CS30 can be provided at the first tube 150. The connecting structure CS30 can be provided on the front side of the second tube 152 in the mounting state where the bicycle electric seatpost assembly is mounted to the bicycle frame B1.

As seen in FIG. 14, the connecting structure CS30 includes a lock structure CS31. The lock structure CS31 has a lock state where the power supply 182 is secured to the connecting structure CS30 with the lock structure CS31. The lock structure CS31 has a release state where the power supply 182 is detachable from the connecting structure CS30.

The lock structure CS31 includes a latch structure CS32. The latch structure CS32 includes a latch CS33 and a latch spring CS34. The latch CS33 is pivotally coupled to the second tube 152. The latch CS33 is pivotable relative to the second tube 52 between a lock position P41 and an unlock position P42. The latch spring CS34 is mounted to the base member 30 to bias the latch CS33 toward the lock position P41. The latch CS33 is at the lock position P41 in the lock state of the lock structure CS31. The latch CS33 is at the unlock position P42 in the unlock state of the lock structure CS31.

The power supply 182 includes an attachment pawl 182A and an attachment recess 182B. The lock structure CS31 includes an attachment opening CS31A. The latch CS33 includes a latch pawl CS33A. The attachment pawl 182A is fitted in the attachment opening CS31A in the lock state. The latch pawl CS33A is fitted in the attachment recess 182B in the lock state. The power supply 182 is detachable from the connecting structure CS30 in a state where the latch CS33 is at the unlock position P42.

The connecting structure CS30 electrically connects the power supply 182 to the electric positioning actuator 156 in the lock state. The connecting structure CS30 includes a first electric contact CS35. The power supply 182 includes a second electric contact (an electric contact) 182C contactable with the first electric contact CS35 in the lock state.

As seen in FIG. 10, the bicycle electric telescopic apparatus (the bicycle electric suspension) FS further comprises a protecting cover CS37 detachably attached to the connecting structure CS30 to protect the power supply 182 in the lock state. For example, the protecting cover CS37 includes a cover body CS37A, an attachment pawl CS37B, and an attachment pawl CS37C. The cover body CS37A at least partly covers the power supply 182 in a state where the protecting cover CS37 is attached to the connecting structure CS30. The connecting structure CS30 includes a first receiving recess CS30B and a second receiving recess CS30C. The first pawl CS37B is fitted in the first receiving recess CS30B to couple the protecting cover CS37 to the connecting structure CS30. The second pawl CS37C is fitted in the second receiving recess CS30C to couple the protecting cover CS37 to the connecting structure CS30. The cover body CS37A covers the power supply 46 in a state where the first and second pawl CS37B and CS37C are fitted in the first and second receiving recesses CS30B and CS30C. The protecting cover CS37 can be omitted from the bicycle electric telescopic apparatus (the bicycle electric suspension) FS.

As seen in FIG. 11, the bicycle electric telescopic apparatus (the bicycle electric suspension) FS further comprises an additional cover CS38 attachable to the connecting structure CS30 to cover the connecting structure CS30 in a state where the power supply 182 is detached from the connecting structure CS30. The additional cover CS38 includes a cover body CS38A, an attachment pawl CS38B, and an attachment recess CS38C. The attachment pawl CS38B is fitted in the attachment opening CS31A to detachably couple the additional cover CS38 to the connecting structure CS30. The latch pawl CS33A is fitted in the attachment recess CS38C to detachably couple the additional cover CS38 to the connecting structure CS30. The cover body CS38A is fitted in an accommodation opening CS3D to cover the first electric contact CS35 of the connecting structure CS30 in a state where the additional cover CS38 is attached to the connecting structure CS30. The additional cover CS38 can be omitted from the bicycle electric telescopic apparatus (the bicycle electric suspension) FS.

As seen in FIG. 12, the bicycle power supply system PSS further comprises a power supply cover CS39 configured to be detachably attached to the power supply 182 in a state where the power supply 182 is detached from the electric component SP. The power supply cover CS39 is configured to cover the electric contact CS36 in an attachment state where the power supply cover CS39 is attached to the power supply 182. The power supply cover CS39 includes a cover body CS39A, an attachment opening CS39B, and an attachment pawl CS39C. The cover body CS39A at least partly covers an attachment surface 182D of the power supply 182 in a state where the power supply cover CS39 is attached to the power supply 182. The attachment pawl 182A is fitted in the attachment opening CS39B to detachably couple the power supply cover CS39 to the power supply 182. The attachment pawl CS39C is fitted in the attachment recess 182B to detachably couple the power supply cover CS39 to the power supply 182. The power supply cover CS39 can be omitted from the bicycle power supply system PSS.

The power supply cover CS39 includes a charged state indicator CS39A configured to selectively indicate one of a charged state and a non-charged state of the power supply 182. In this embodiment, the charged state indicator CS39D includes LED lights to indicate a charged level of the power supply 182 in a state where the power supply cover CS39 is attached to the power supply 182. The power supply cover CS39 includes an indication circuit CS39E configured to sense the charged state or the non-charged state of the power supply 182. The indication circuit CS39E includes a contact (not shown) to contact the second electrical contact 182C. The indication circuit CS39E is electrically connected to the charged state indicator CS39D to control an indication state of the charged state indicator CS39D based on the sensing result of the charged state or the non-charged state of the power supply 182. The charged state indicator CS39D and the indication circuit CS39E can be omitted from the power supply cover CS39.

As seen in FIGS. 5, 7, and 8, at least one of the first power supply 46 and the second power supply 82 or 182 is configured to be detachably and alternatively connected to the first connecting structure CS10 and the second connecting structure CS20 or CS3. The first power supply 82 is configured to be detachably connected to the second connecting structure CS20 and/or CS3. The second power supply 82 and/or 182 is configured to be detachably connected to the first connecting structure CS10. However, the structure of the first connecting structure CS10 can be different from the structure of the second connecting structure CS20 and/or CS30. For example, at least one of the first connecting structure CS10 and the second connecting structures CS20 and CS30 can include a structure inside which a power supply is accommodated.

As seen in FIG. 7, the bicycle electric telescopic apparatus (the bicycle electric seatpost assembly) SP further comprises a manual operating member M1 coupled to the positioning structure 54 to manually actuate the positioning structure 54 without electricity of the power supply 82. The manual operating member M1 is coupled to the rotational shaft of the second electric actuator 56 and includes a tool engagement part such as a hexagonal hole. The flow control part 62 (FIG. 6) is manually moved relative to the first tube 50 in the telescopic direction D1 by rotating the manual operating member M1 with a tool such as a hexagonal wrench.

As seen in FIG. 8, the bicycle electric telescopic apparatus (the bicycle electric suspension) FS further comprises a manual operating member M2 coupled to the positioning structure 154 to manually actuate the positioning structure 154 without electricity of the power supply 82. The manual operating member M2 is mechanically coupled to the positioning structure 154 and includes a tool engagement part such as a hexagonal hole. The positioning structure 154 (FIG. 6) is manually actuated between the lockout position and the unlocked position by rotating the manual operating member M2 with a tool such as a hexagonal wrench.

Figure 15:
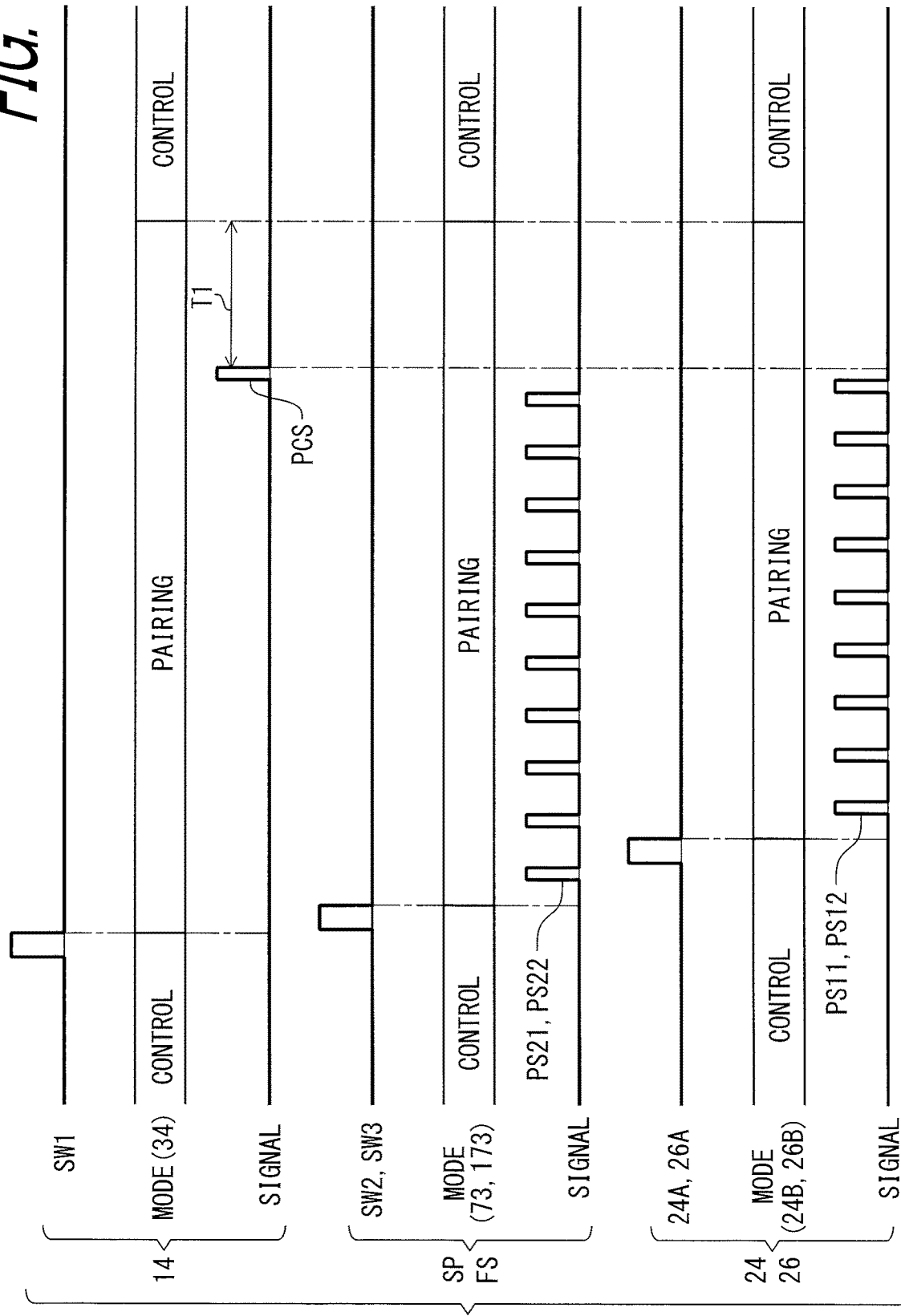
FIG. 15 is a timing chart of a pairing mode of the bicycle wireless control system illustrated in FIG. 1.

As seen in FIG. 15, the controller 34 enters the pairing mode when the switch SW1 is pressed in the control mode of the bicycle electric device 14. The telescopic controller 73 enters the pairing signal transmission mode when the seatpost switch SW2 is pressed in the control mode of the bicycle electric seatpost assembly SP. The telescopic controller 173 enters the pairing signal transmission mode when the suspension switch SW3 is pressed in the control mode of the bicycle electric suspension FS. The first operating controller 24B enters the pairing signal transmission mode when the first function switch 24D is pressed in the control mode of the first operating device 24. The second operating controller 26B enters the pairing signal transmission mode when the second function switch 26D is pressed in the control mode of the second operating device 26. In the pairing mode and the paring signal transmission mode, for example, the indicators 44, 80, 24E, and 26E slowly blink.

The telescopic controller 73 periodically transmits pairing signals PS21 including the first identification information ID21 of the bicycle electric seatpost assembly SP in the pairing signal transmission mode of the bicycle electric seatpost assembly SP. The telescopic controller 173 periodically transmits pairing signals PS22 including the second identification information ID22 of the bicycle electric suspension FS in the pairing signal transmission mode of the bicycle electric suspension FS. The first operating controller 24B periodically transmits pairing signals PS11 including the identification information ID11 of the first operating device 24 in the pairing signal transmission mode of the first operating device 24. The second operating controller 26B periodically transmits pairing signals PS12 including the identification information ID12 of the second operating device 26 in the pairing signal transmission mode of the second operating device 26.

The controller 34 wirelessly receives the pairing signals PS21, PS22, PS11, and PS12 wirelessly transmitted from the telescopic controller 73, the telescopic controller 173, the first operating controller 24B, and the second operating controller 26B. The controller 34 extracts the first identification information ID21, the second identification information ID22, the identification information ID11, and the identification information ID12 from the pairing signals PS21, PS22, PS11, and PS12. The controller 34 compares the first identification information ID21, the second identification information ID22, the identification information ID11, and the identification information ID12 with the available device information AD1. The available device information AD1 includes a value indicative of the seatpost such as the bicycle electric seatpost assembly SP, a value indicative of the suspension such as the bicycle electric suspension FS, a value indicative of the right-hand side sifter such as the first operating device 24, and a value indicative of the left-hand side shifter such as the second operating device 26. Thus, the controller 34 stores the first identification information ID21, the second identification information ID22, the identification information ID11, and the identification information ID12 in the memory 34B. In the control mode, the controller 34 recognizes a wireless signal transmitted from a device paired with the controller 34 based on the first identification information ID21, the second identification information ID22, the identification information ID11, and the identification information ID12 stored in the memory 34B. However, the controller 34 does not respond to other wireless signals transmitted from other devices. For example, the indicator 44 quickly blinks when the pairing succeeded.

The controller 34 wirelessly transmits a pairing completion signal PCS indicative of completion of the pairing to the bicycle electric seatpost assembly SP, the bicycle electric suspension FS, the first operating device 24, and the second operating device 26. The telescopic controller 73, the first operating controller 24B, and the second operating controller 26B wirelessly receive the pairing completion signal PCS and recognize that the pairing succeeded. For example, the indicators 80, 180, 24E, and 26E quickly blinks after reception of the pairing completion signal PCS.

The controller 34 returns to the control mode when a time T1 is elapsed from sending of the pairing completion signal PCS. The telescopic controller 73 returns to the control mode after the specific time when the time T1 is elapsed after the telescopic controller 73 wirelessly receives the pairing completion signal PCS. The telescopic controller 173 returns to the control mode from the paring signal transmission mode after the specific time when the time T1 is elapsed after the telescopic controller 173 wirelessly receives the pairing completion signal PCS. The first operating controller 24B returns to the control mode from the paring signal transmission mode when the time T1 is elapsed after the first operating controller 24B wirelessly receives the pairing completion signal PCS. The second operating controller 26B returns to the control mode from the paring signal transmission mode when the time T1 is elapsed after the second operating controller 26B wirelessly receives the pairing completion signal PCS. For example, each of the indicators 44, 80, 180, 24E, and 26E turns off when the mode is switched from the pairing mode and the paring signal transmission mode to the control mode.

The controller 34 can be configured to keep the pairing mode for a preset time (e.g., 60 seconds) and to return to the control mode when the preset time is elapsed from a start of the pairing mode. Furthermore, the controller 34 can be configured to keep the pairing mode until the switch SW1 is pressed again. The same modifications can be applied to at least one of the telescopic controllers 73 and 173.

In the control mode after the pairing, the controller 34 controls the bicycle electric device 14 and other bicycle components based on a wireless signal including the first identification information ID21, a wireless signal including the second identification information ID22, a wireless signal including the identification information ID11, and a wireless signal including the identification information ID12.

The controller 34 can be configured to wirelessly transmit the identification information ID3 of the bicycle electric device 14 in the pairing mode. In such an embodiment, the telescopic controller 73 can be configured to wirelessly receive identification information such as the identification information ID3 in the pairing signal transmission mode. The telescopic controller 73 can have a pairing mode which is different from the pairing signal transmission mode and in which the telescopic controller 73 wirelessly receives identification information such as the identification information ID3. Similarly, the telescopic controller 173 can be configured to wirelessly receive identification information such as the identification information ID3 in the pairing signal transmission mode. The telescopic controller 173 can have a pairing mode which is different from the pairing signal transmission mode and in which the telescopic controller 173 wirelessly receives identification information such as the identification information ID3.

Second Embodiment

A bicycle wireless control system 212 in accordance with a second embodiment will be described below referring to FIGS. 16 and 17. The bicycle wireless control system 212 has the same structure and/or configuration as those of the bicycle wireless control system 12 except for the bicycle electric device 14 and the bicycle electric operating device 22. Thus, elements having substantially the same function as those in the first embodiment will be numbered the same here, and will not be described and/or illustrated again in detail here for the sake of brevity.

Figure 16:
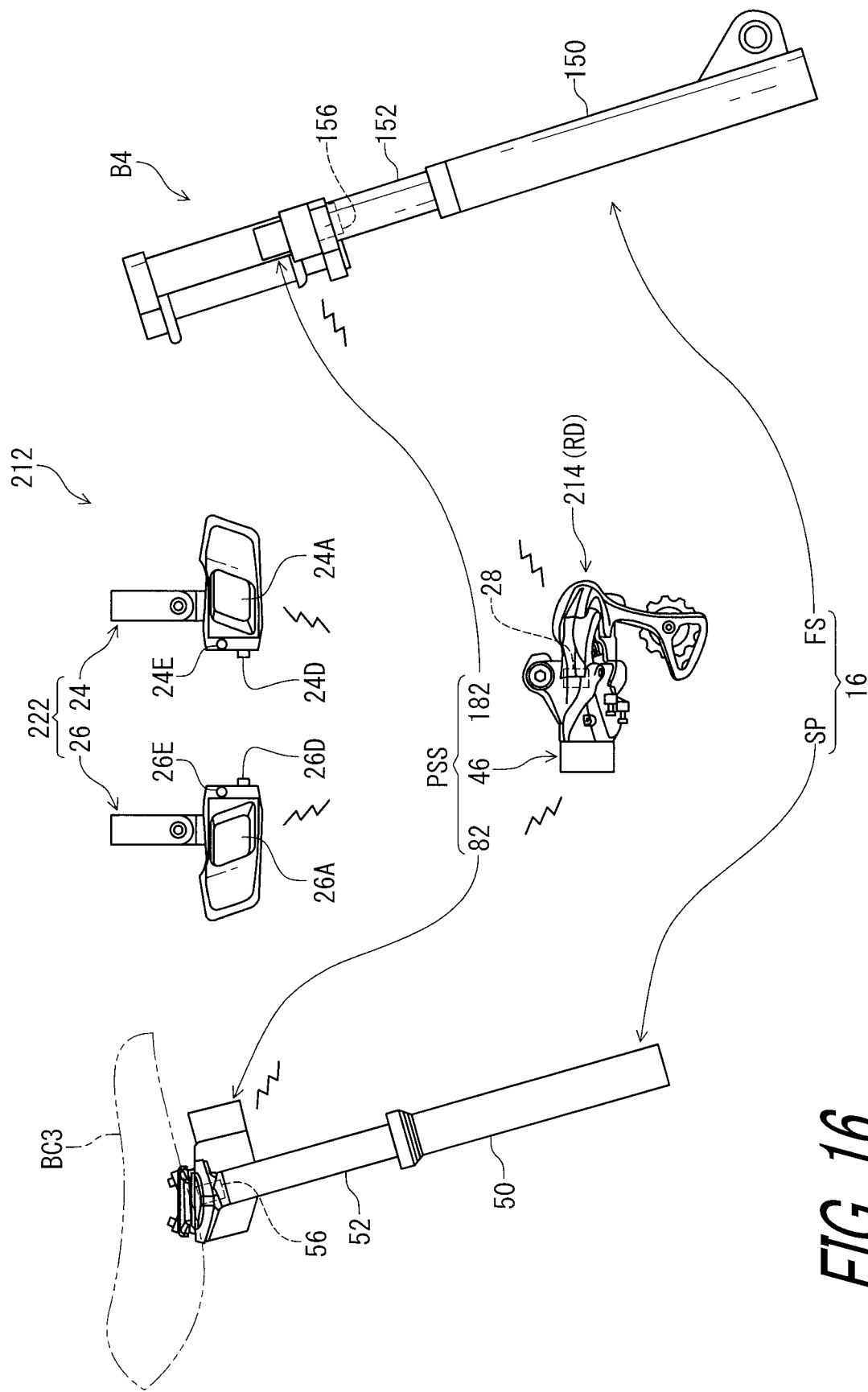
FIG. 16 is a diagrammatic view of a bicycle wireless control system in accordance with a second embodiment.
Figure 17:
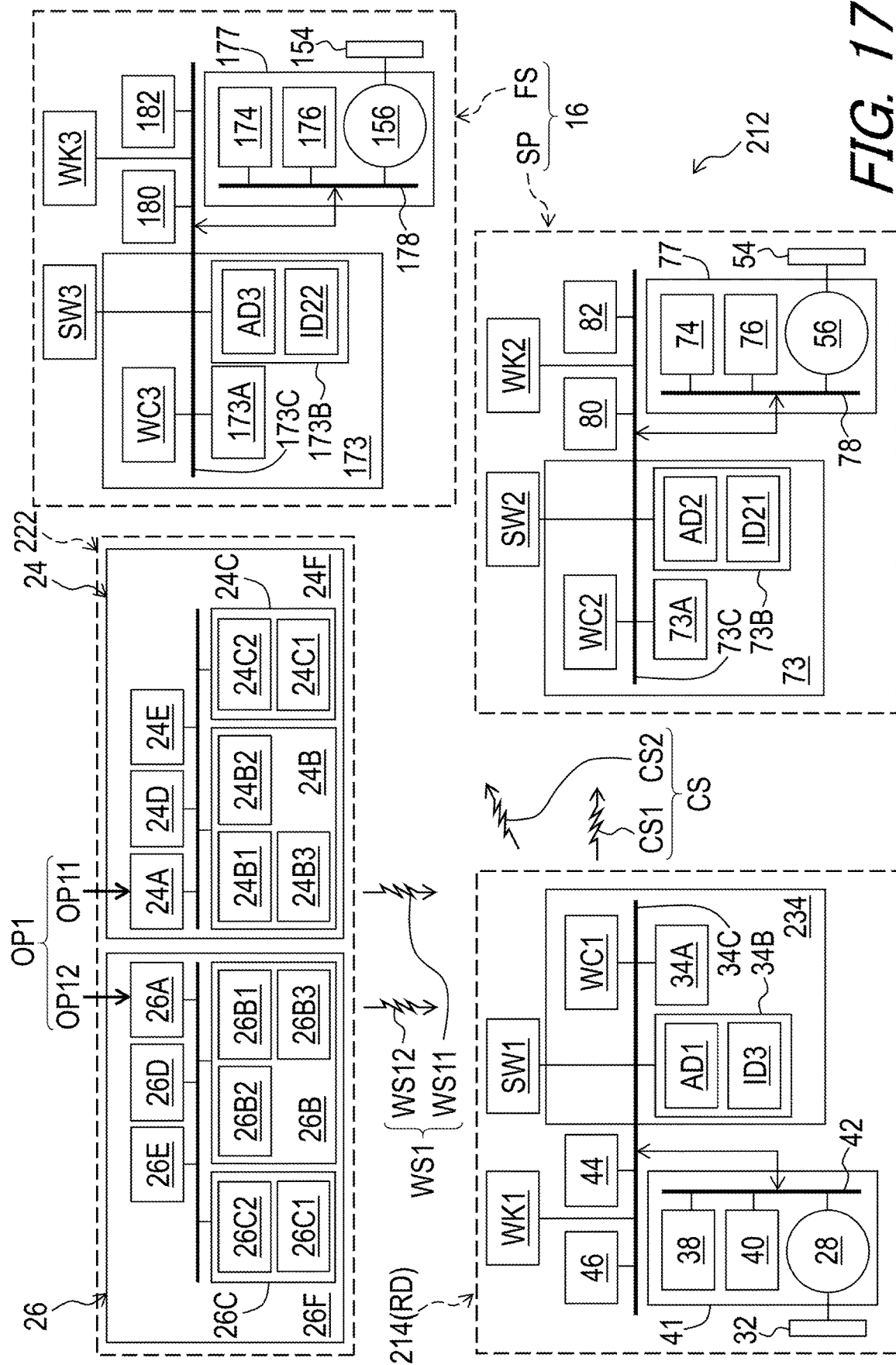
FIG. 17 is a schematic block diagram of the bicycle wireless control system illustrated in FIG. 16 (control mode).

As seen in FIGS. 16 and 17, the bicycle wireless control system 212 comprises a bicycle electric device 214, the at least one electric telescopic apparatus 16, and a bicycle electric operating device 222. A controller 234 of the bicycle electric device 214 has substantially the same configuration as that of the controller 34 of the bicycle electric device 14. For example, the controller 234 is configured to control the electric actuator 28 to upshift in response to the first wireless signal WS11. The controller 234 is configured to control the electric actuator 28 to downshift in response to the second wireless signal WS12.

In this embodiment, as seen in FIG. 17, the bicycle electric device 214 and the at least one electric telescopic apparatus 16 synchronize in response to the operation signal WS1. The controller 234 is configured to wirelessly transmit the control signal CS to the at least one electric telescopic apparatus 16 based on the operation signal WS1 wirelessly transmitted from the bicycle electric operating device 222. The first electrical switch 24A and the second electrical switch 26A are used for operating the at least one electric telescopic apparatus 16 (the bicycle electric seatpost assembly SP and the bicycle electric suspension FS). Thus, the first additional electrical switch 24G and the second additional electrical switch 26G are omitted from the bicycle electric operating device 222. Thus, the bicycle electric operating device 222 does not transmit the telescopic operation signal WS2.

The first control signal CS1 is transmitted from the controller 234 to the first electric telescopic apparatus SP based on the operation signal WS1. The second control signal CS2 is transmitted from the controller 234 to the second electric telescopic apparatus FS based on the operation signal WS1. In this embodiment, the controller 234 is configured to wirelessly transmit the first control signal CS1 to the bicycle electric seatpost assembly SP based on one of the first wireless signal WS11 and the second wireless signal WS12. The controller 234 is configured to wirelessly transmit the second control signal CS2 to the bicycle electric suspension FS based on one of the first wireless signal WS11 and the second wireless signal WS12.

In this embodiment, for example, the controller 234 is configured to wirelessly transmit the first control signal CS1 to the bicycle electric seatpost assembly SP based on the second wireless signal WS12 and a current gear stage. The controller 234 controls the electric actuator 28 to downshift and wirelessly transmits the first control signal CS1 to the bicycle electric seatpost assembly SP in response to the second wireless signal WS12 (the downshift operation signal) when the current gear stage is within a specific gear range (e.g., from the second to sixth gear stages). The downshifting between the first and sixth gear stages is likely to occur when the bicycle runs on an upslope. Thus, the rider can adjust the height of the saddle BC3 (e.g., lower the saddle BC3) while the bicycle runs on the upslope. Furthermore, the controller 234 controls the electric actuator 28 to upshift and wirelessly transmits the first control signal CS1 to the bicycle electric seatpost assembly SP in response to the first wireless signal WS11 (the upshift operation signal) when the current gear stage is within a specific gear range (e.g., from the ninth to eleventh gear stages). The upshifting between the ninth and twelfth gear stages is likely to occur when the bicycle runs on a downslope. Thus, the rider can adjust the height of the saddle BC3 (e.g., raise the saddle BC3) while the bicycle runs on the downslope.

Furthermore, the controller 234 is configured to wirelessly transmit the second control signal CS2 to the bicycle electric suspension FS based on the second wireless signal WS12, the current gear stage, and a current lock position of the bicycle electric suspension FS. The controller 234 controls the first electric actuator 28 to upshift or downshift and controls the second electric actuator 156 to keep the unlocked position of the positioning structure 154 when the current gear stage changes within a specific gear range (e.g., between the seventh and twelfth gear stages). Thus, the controller 234 does not transmit the second control signal CS2 regardless of the first and second wireless signals WS11 and WS12 when the current gear stage changes between the seventh and twelfth gear stages in the unlocked state of the bicycle electric suspension FS. The controller 234 controls the first electric actuator 28 to upshift or downshift and controls the second electric actuator 156 to keep the lockout position of the positioning structure 154 when the current gear stage changes within a specific gear range (e.g., between the first and sixth gear stages). Thus, the controller 234 does not transmit the second control signal CS2 regardless of the first and second wireless signals WS11 and WS12 when the current gear stage changes between the first and sixth gear stages in the lockout state of the bicycle electric suspension FS.

The controller 234 controls the first electric actuator 156 to downshift in response to the second wireless signal WS12 and controls the second electric actuator 156 to move the positioning structure 164 from the unlocked position to the lockout position in response to the second control signal CS2 when the current gear stage changes from the seventh gear stage to the sixth gear stage. The controller 234 controls the first electric actuator 156 to upshift in response to the first wireless signal WS11 and controls the second electric actuator 156 to move the positioning structure 164 from the lockout position to the unlocked position in response to the second control signal CS2 when the current gear stage changes from the sixth gear stage to the seventh gear stage. Thus, shocks can be absorbed by the bicycle electric suspension FS when the bicycle runs on the downslope in the current gear stage is between the first and sixth gear stages.

Third Embodiment

A bicycle wireless control system 312 in accordance with a third embodiment will be described below referring to FIGS. 18 to 20. The bicycle wireless control system 312 has the same structure and/or configuration as those of the bicycle wireless control system 12 except that the electric rear derailleur RD is omitted from the bicycle electric device 14. Thus, elements having substantially the same function as those in the above embodiments will be numbered the same here, and will not be described and/or illustrated again in detail here for the sake of brevity.

Figure 18:
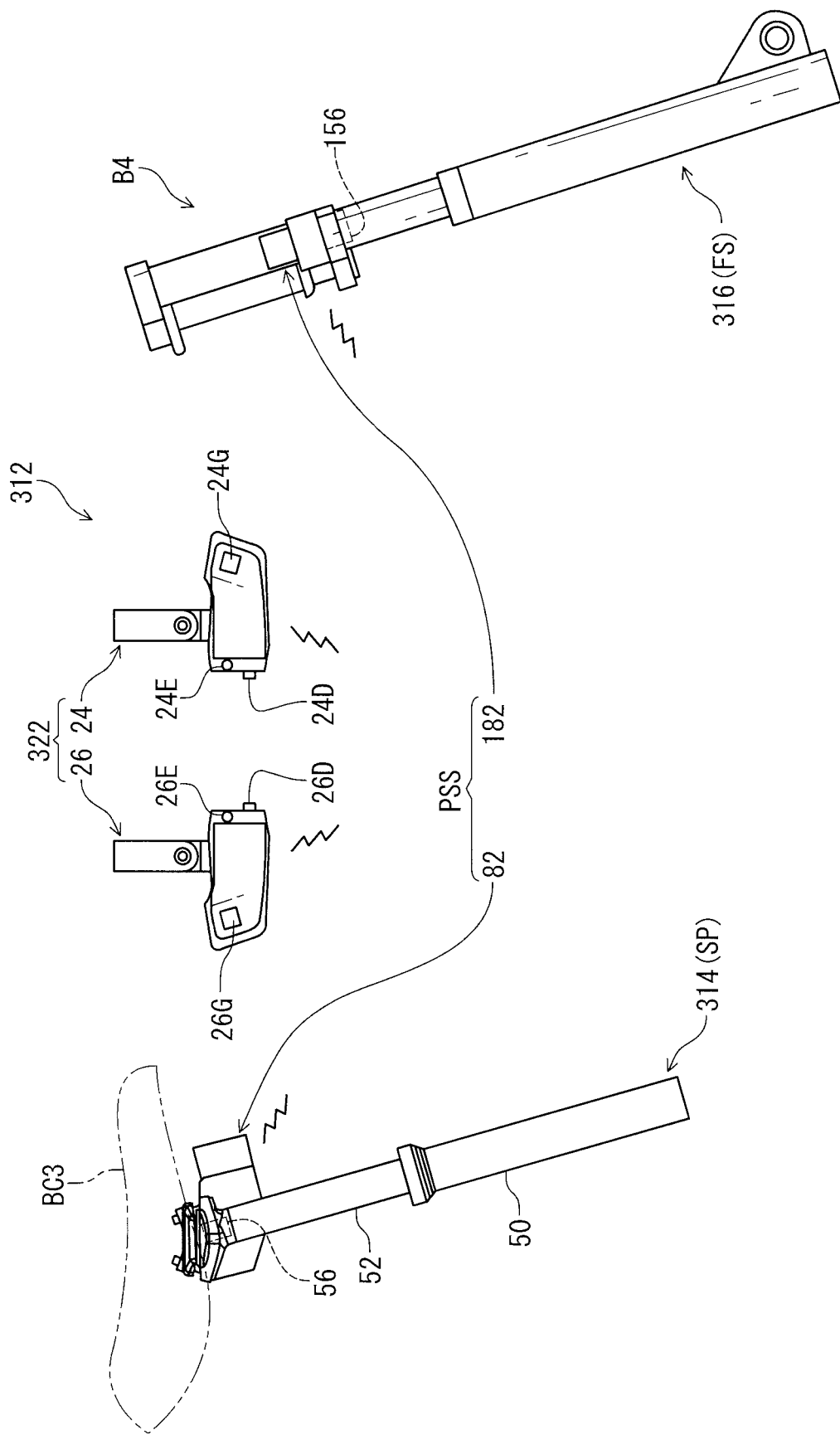
FIG. 18 is a diagrammatic view of a bicycle wireless control system in accordance with a third embodiment.

As seen in FIG. 18, the bicycle wireless control system 312 comprises a bicycle electric device 314, at least one electric telescopic apparatus 316, and a bicycle electric operating device 322. In this embodiment, the bicycle electric device 314 includes the bicycle electric seatpost assembly SP instead of the electric rear derailleur RD. The at least one electric telescopic apparatus 316 includes the bicycle electric suspension FS. The bicycle electric seatpost assembly SP has substantially the same configuration as that of the bicycle electric device 14 (the electric rear derailleur RD) of the first embodiment. The first electrical switch 24A and the second electrical switch 246A are omitted in the bicycle electric operating device 322.

Figure 19:
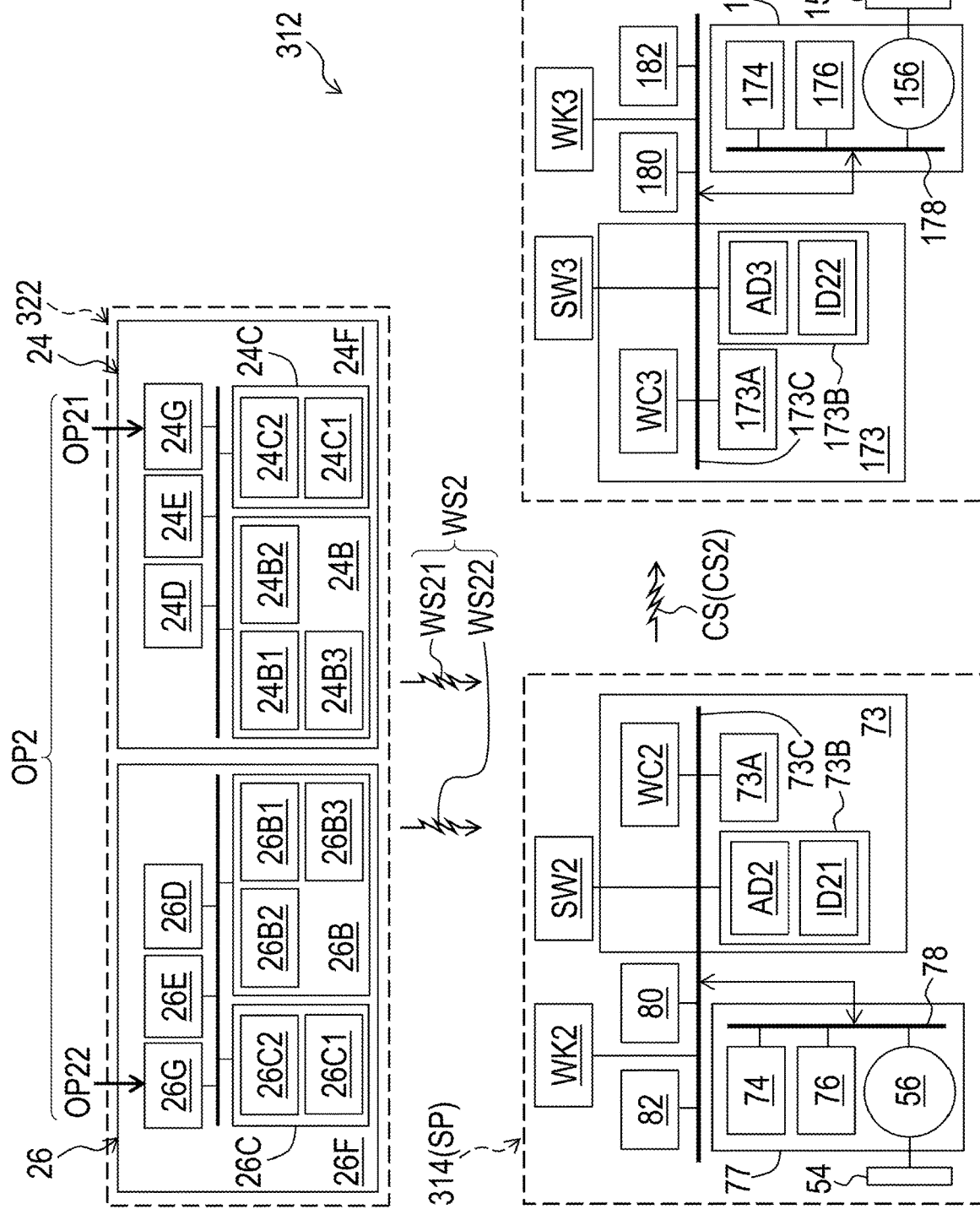
FIG. 19 is a schematic block diagram of the bicycle wireless control system illustrated in FIG. 18 (control mode).

As seen in FIG. 19, the electric actuator 56 of the bicycle electric device 314 is configured to be operated in response to an operation of the bicycle electric operating device 322. The controller 73 has substantially the same configuration as that of the controller 34 of the first embodiment. In this embodiment, the controller 73 is configured to control the electric actuator 56 to actuate the flow control part 62 between the closed position P11 and the open position P12 based on the telescopic operation signal WS2 (e.g., the first telescopic operation signal WS21) wirelessly transmitted from the bicycle electric operating device 322 (e.g., the first operating device 24). The controller 73 is configured to wirelessly transmit the control signal CS to the at least one electric telescopic apparatus 316 based on the telescopic operation signal WS2 wirelessly transmitted from the bicycle electric operating device 322. The controller 73 is configured to wirelessly transmit the control signal CS (e.g., the second control signal CS2) to the at least one electric telescopic apparatus 316 based on the telescopic operation signal WS2 (e.g., the second telescopic operation signal WS22) wirelessly transmitted from the bicycle electric operating device 322 (e.g., the second operating device 26).

Figure 20:
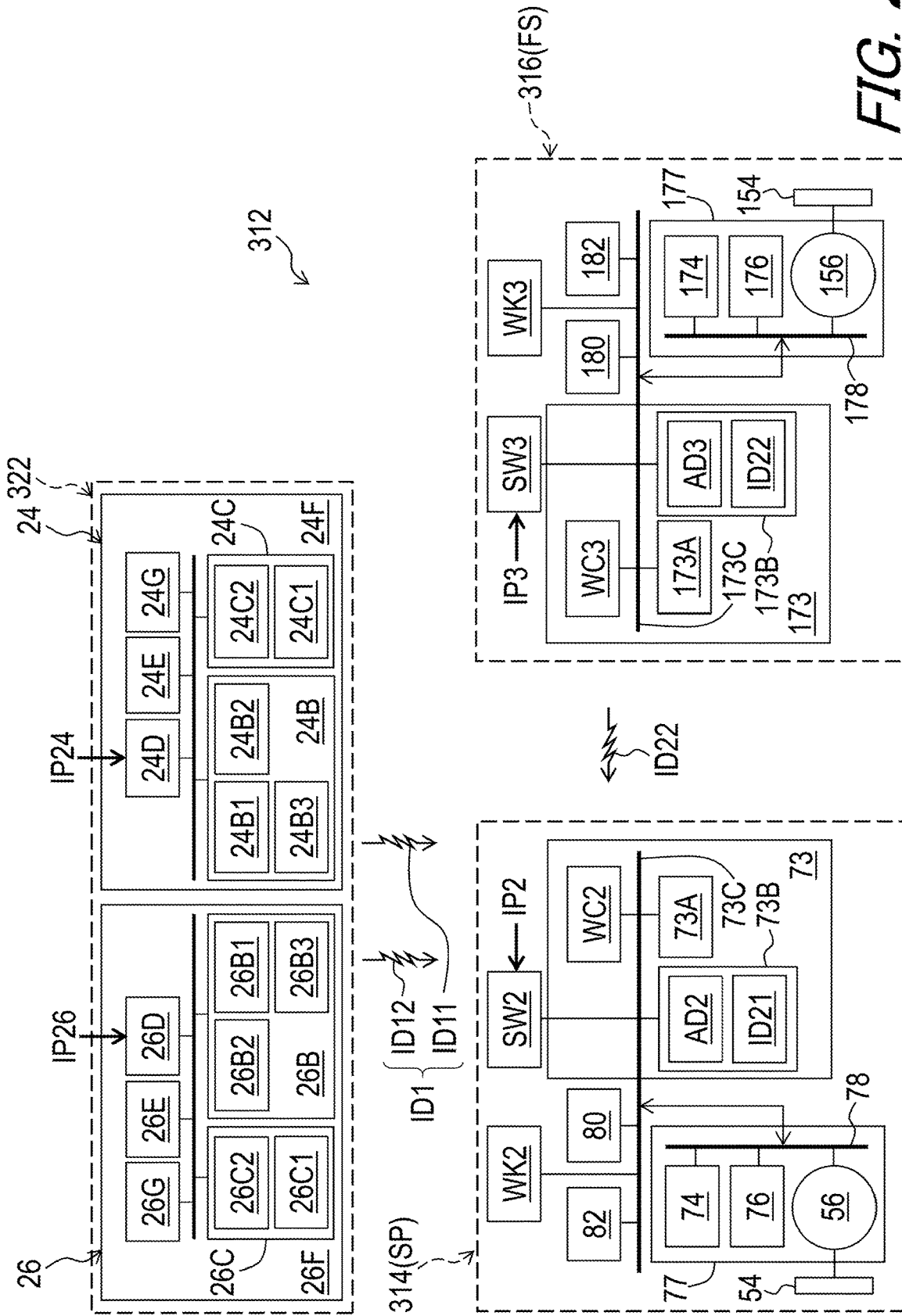
FIG. 20 is a schematic block diagram of the bicycle wireless control system illustrated in FIG. 18 (pairing mode).

As seen in FIG. 20, the switch SW2 has substantially the same configuration as that of the switch SW1 of the first embodiment. The controller 73 has a pairing mode in which the controller 73 receives the identification information ID22 of the at least one electric telescopic apparatus 316. The switch SW2 is electrically connected to the controller 73 to set the controller 73 to the pairing mode based on the user input IP2 received by the switch SW2. Thus, the bicycle electric suspension FS is wirelessly operated through the bicycle electric seatpost assembly SP.

In a modification of this embodiment, the bicycle electric device 314 can include the bicycle electric suspension FS instead of the bicycle electric seatpost assembly SP, and the at least one electric telescopic apparatus 316 can include the bicycle electric seatpost assembly SP instead of the bicycle electric suspension FS.

Modifications

Figure 21:
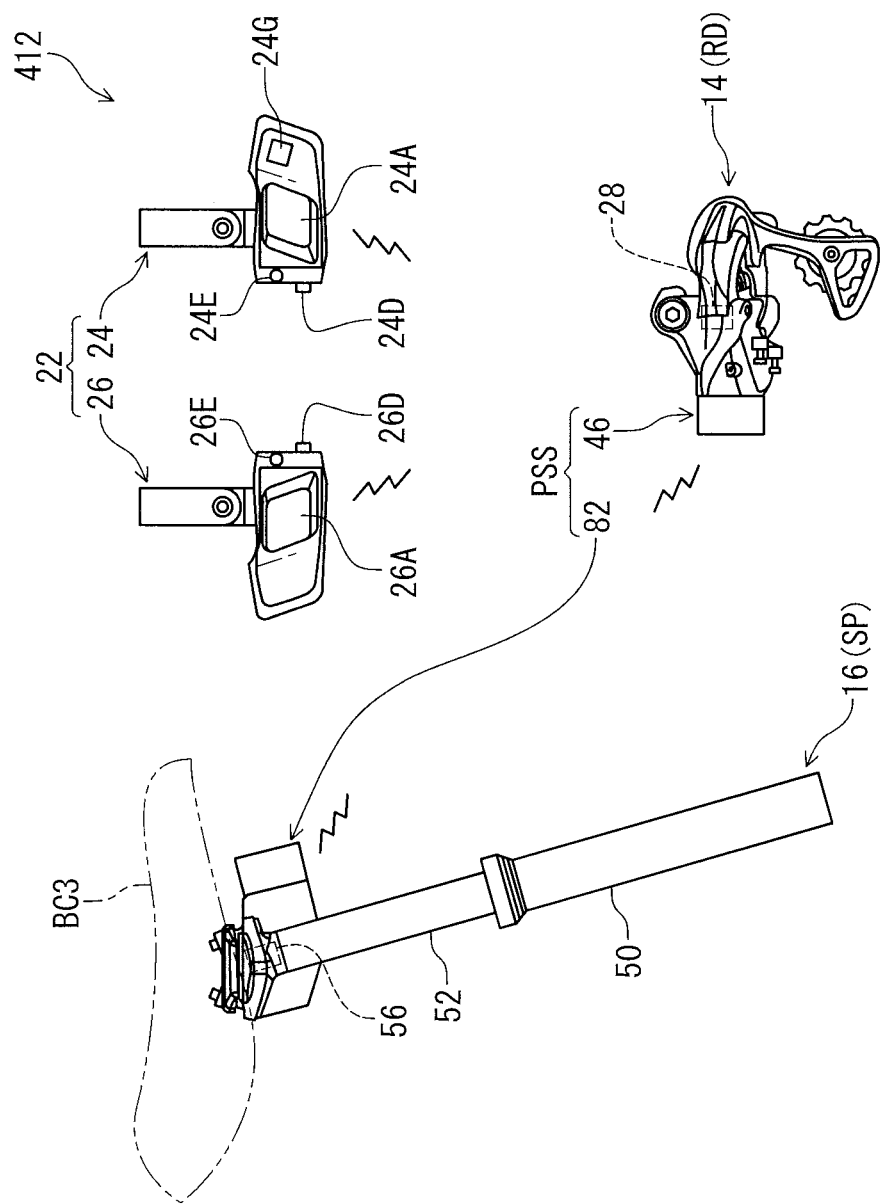
FIG. 21 is a diagrammatic view of a bicycle wireless control system in accordance with a first modification.

As seen in a bicycle wireless control system 412 illustrated in FIG. 21, the bicycle electric suspension FS can be omitted from the bicycle wireless control system 12 or 212 of the first or second embodiment while the at least one electric telescopic apparatus 16 or 216 includes the bicycle electric seatpost assembly SP. In such a modification of the bicycle wireless control system 12, for example, the second additional electrical switch 26G can be omitted from the bicycle electric operating device 22.

Figure 22:
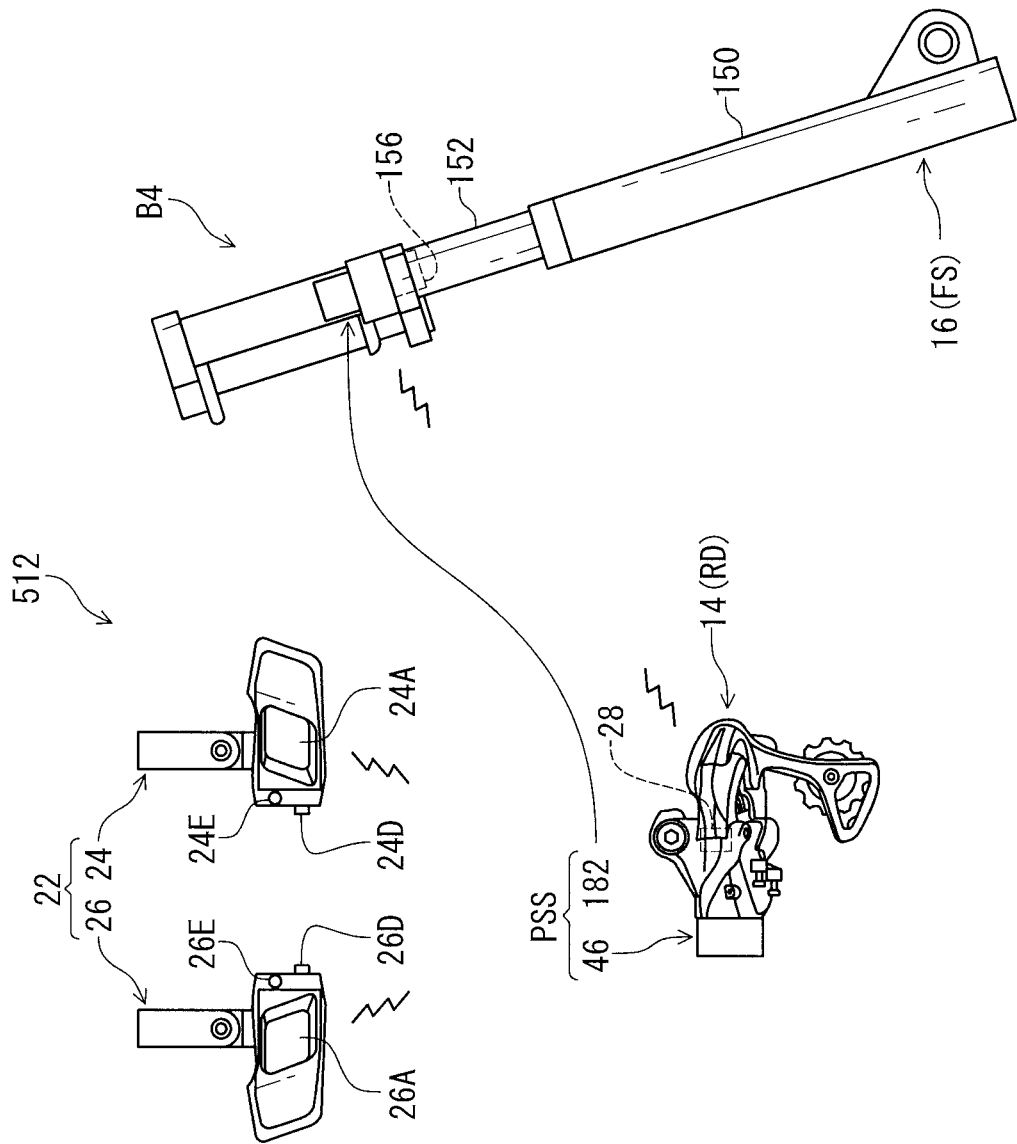
FIG. 22 is a diagrammatic view of a bicycle wireless control system in accordance with a second modification.

As seen in a bicycle wireless control system 512 illustrated in FIG. 22, the bicycle electric seatpost assembly SP can be omitted from the bicycle wireless control system 12 or 212 of the first or second embodiment while the at least one electric telescopic apparatus 16 or 216 includes the bicycle electric suspension FS. In such a modification of the bicycle wireless control system 12, for example, the first additional electrical switch 24G can be omitted from the bicycle electric operating device 22.

Figure 23:
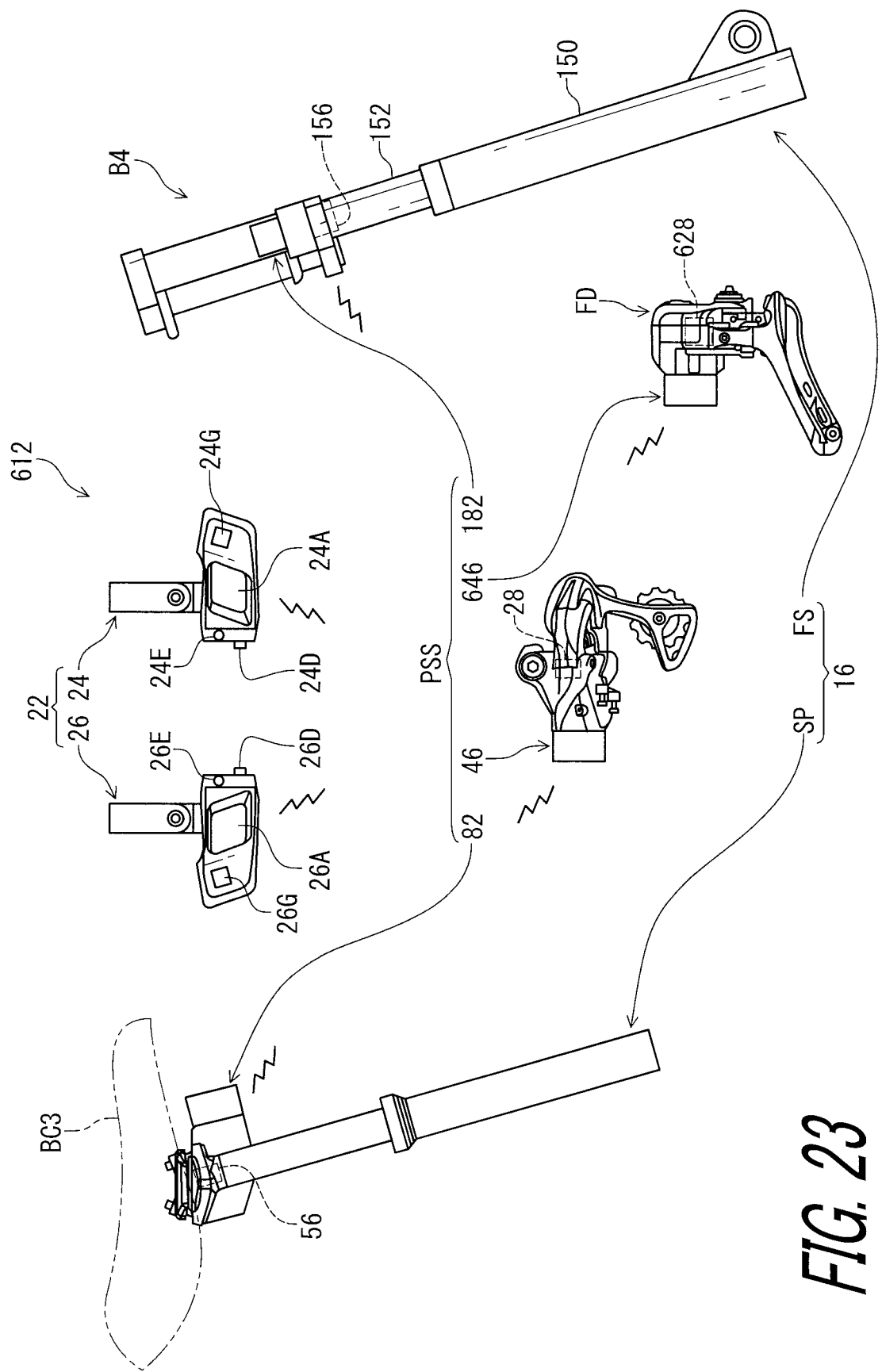
FIG. 23 is a diagrammatic view of a bicycle wireless control system in accordance with a third modification.

As seen in a bicycle wireless control system 612 illustrated in FIG. 23, an electric front derailleur FD can be added to the bicycle wireless control system 12, 212, or 312 of the first, second, or third embodiment instead of or in addition to the bicycle electric suspension FS. In such a modification of the bicycle wireless control system 12, for example, the bicycle electric operating device 22, 222, or 322 can include an additional electrical switch to operate the electric front derailleur FD. The electric front derailleur FD includes a power supply 646 having substantially the same structure as that of the power supply 46 of the electric rear derailleur RD. The power supply 646 is configured to supply electricity to a bicycle electric actuator 628 of the electric component. In this modification, the electric component includes the bicycle electric telescopic apparatuses SP and FS and the bicycle electric transmissions RD and FD.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle electric telescopic apparatus comprising:
   a first tube having a center axis;
   a second tube telescopically received in the first tube;
   a positioning structure configured to relatively position the first tube and the second tube in a telescopic direction extending along the center axis of the first tube;
   an electric positioning actuator configured to actuate the positioning structure;
   a power supply to supply electricity to the electric positioning actuator, the power supply being configured to be detachably connected to an electric bicycle component other than the bicycle electric telescopic apparatus;
   a connecting structure configured to be detachably connected to the power supply to electrically connect the power supply to the electric positioning actuator, the connecting structure being provided at an upper end of the second tube in a mounting state where the bicycle electric telescopic apparatus is mounted to a bicycle frame; and
   a controller configured to control the electric positioning actuator based on a wireless signal, a distance defined between the connecting structure and the controller being longer than a distance defined between the connecting structure and the upper end of the second tube.

2. The bicycle electric telescopic apparatus according to claim 1, wherein
   the bicycle electric telescopic apparatus includes an electric seatpost assembly comprising:
      the first tube;
      the second tube;
      the positioning structure;
      the electric positioning actuator;
      the power supply; and
      the connecting structure.

3. The bicycle electric telescopic apparatus according to claim 1, wherein
   the connecting structure is provided on a front side of the second tube in the mounting state where the bicycle electric telescopic apparatus is mounted to the bicycle frame.

4. The bicycle electric telescopic apparatus according to claim 1, wherein
   the connecting structure includes a lock structure, and
   the lock structure has
      a lock state where the power supply is secured to the connecting structure with the lock structure, and
      a release state where the power supply is detachable from the connecting structure.

5. The bicycle electric telescopic apparatus according to claim 4, wherein
   the lock structure includes a latch structure.

6. The bicycle electric telescopic apparatus according to claim 4, wherein
   the connecting structure electrically connects the power supply to the electric positioning actuator in the lock state.

7. The bicycle electric telescopic apparatus according to claim 6, wherein
   the connecting structure includes a first electric contact, and
   the power supply includes a second electric contact contactable with the first electric contact in the lock state.

8. The bicycle electric telescopic apparatus according to claim 4, further comprising
   a protecting cover detachably attached to the connecting structure to protect the power supply in the lock state.

9. The bicycle electric telescopic apparatus according to claim 1, further comprising
   a cover attachable to the connecting structure to cover the connecting structure in a state where the power supply is detached from the connecting structure.

10. The bicycle electric telescopic apparatus according to claim 1, further comprising:
    a wake-up sensor, wherein;
    the controller has
       a control mode in which the controller controls the electric positioning actuator to actuate the positioning structure, and
       a sleep mode in which a power consumption of the controller is lower than a power consumption of the controller in the control mode, and
    the controller is configured to change a mode of the controller between the control mode and the sleep mode based on a detection result of the wake-up sensor.

11. The bicycle electric telescopic apparatus according to claim 1, wherein
    the controller includes a wireless receiver configured to wirelessly receive the wireless signal, and
    a distance defined between the connecting structure and the wireless receiver is longer than the distance defined between the connecting structure and the upper end of the second tube.

12. The bicycle electric telescopic apparatus according to claim 11, wherein
    the wireless receiver is provided on a rear side of one of the first tube and the second tube.

13. The bicycle electric telescopic apparatus according to claim 1, further comprising
    a manual operating member coupled to the positioning structure to manually actuate the positioning structure without electricity of the power supply.

14. The bicycle electric telescopic apparatus according to claim 1, wherein the connecting structure is configured to be detachably connected to an alternative power supply configured to supply electricity to a bicycle electric rear derailleur provided as the electric bicycle component.

15. The bicycle electric telescopic apparatus according to claim 1, wherein
the connecting structure is configured to be detachably connected to an alternative power supply configured to supply electricity to a bicycle electric suspension provided as the electric bicycle component.

16. The bicycle electric telescopic apparatus according to claim 1, wherein
the connecting structure is provided between the power supply and the upper end of the second tube in a state where the power supply is detachably connected to the connecting structure.

17. The bicycle electric telescopic apparatus according to claim 1, wherein
the connecting structure includes an attachment surface configured to face the power supply in a state where the power supply is detachably connected to the connecting structure, and
the attachment surface faces away from the upper end of the second tube.

18. The bicycle electric telescopic apparatus according to claim 1, wherein
the electric positioning actuator is provided at the upper end of the second tube in the mounting state where the bicycle electric telescopic apparatus is mounted to the bicycle frame.

19. The bicycle electric telescopic apparatus according to claim 18, wherein
the connecting structure is provided between the power supply and the electric positioning actuator in a state where the power supply is detachably connected to the connecting structure.

20. The bicycle electric telescopic apparatus according to claim 18, wherein
the connecting structure includes an attachment surface configured to face the power supply in a state where the power supply is detachably connected to the connecting structure, and
the attachment surface faces away from the electric positioning actuator.

21. The bicycle electric telescopic apparatus according to claim 1, wherein
the center axis of the first tube is provided between the connecting structure and the controller.

22. The bicycle electric telescopic apparatus according to claim 1, further comprising
an indicator electrically connected to the controller to inform a user of a status of the controller, wherein
a distance defined between the indicator and the controller is longer than a distance defined between the indicator and the upper end of the second tube.

23. The bicycle electric telescopic apparatus according to claim 22, wherein
the center axis of the first tube is provided between the indicator and the controller.

24. The bicycle electric telescopic apparatus according to claim 1, further comprising
a switch electrically connected to the controller to set the controller to a pairing mode based on a user input received by the switch, wherein
a distance defined between the switch and the controller is longer than a distance defined between the switch and the upper end of the second tube.

25. The bicycle electric telescopic apparatus according to claim 24, wherein
the center axis of the first tube is provided between the switch and the controller.

26. A bicycle electric telescopic apparatus comprising:
a first tube having a center axis;
a second tube telescopically received in the first tube;
a positioning structure configured to relatively position the first tube and the second tube in a telescopic direction extending along the center axis of the first tube;
an electric positioning actuator configured to actuate the positioning structure;
a power supply to supply electricity to the electric positioning actuator;
a connecting structure configured to be detachably connected to the power supply to electrically connect the power supply to the electric positioning actuator, the connecting structure being configured to be detachably connected to an alternative power supply that is configured to be detachably connected to an electric bicycle component other than the bicycle electric telescopic apparatus, the connecting structure being provided at an upper end of the second tube in a mounting state where the bicycle electric telescopic apparatus is mounted to a bicycle frame; and
a controller configured to control the electric positioning actuator based on a wireless signal, a distance defined between the connecting structure and the controller being longer than a distance defined between the connecting structure and the upper end of the second tube.

27. A bicycle electric component system comprising:
a bicycle electric transmission comprising:
a base member;
a movable member movable with respect to the base member to change a gear stage;
a first electric actuator configured to move the movable member with respect to the base member;
a first power supply to supply electricity to the first electric actuator; and
a first connecting structure configured to be detachably connected to the first power supply to electrically connect the first power supply to the first electric actuator; and
a bicycle electric telescopic apparatus comprising:
a first tube having a center axis;
a second tube telescopically received in the first tube;
a positioning structure configured to relatively position the first tube and the second tube in a telescopic direction extending along the center axis of the first tube;
a second electric actuator configured to actuate the positioning structure;
a second power supply to supply electricity to the second electric actuator;
a second connecting structure configured to be detachably connected to the second power supply to electrically connect the second power supply to the second electric actuator; and
a controller configured to control the second electric actuator based on a wireless signal,
at least one of the first power supply and the second power supply being configured to be detachably and alternatively connected to the first connecting structure and the second connecting structure, the second connecting structure being provided at an upper end of the second tube in a mounting state where the bicycle electric telescopic apparatus is mounted to a bicycle frame, and a distance defined between the second connecting structure and the controller being longer than a distance defined between the second connecting structure and the upper end of the second tube.

28. The bicycle electric component system according to claim 27, wherein the first power supply is configured to be detachably connected to the second connecting structure, and the second power supply is configured to be detachably connected to the first connecting structure.

* * * * *